(12) United States Patent
Kawamura

(10) Patent No.: US 8,899,760 B2
(45) Date of Patent: Dec. 2, 2014

(54) LIGHT PROJECTION APPARATUS AND LIGHTING APPARATUS

(75) Inventor: Ryo Kawamura, Katsushikaku (JP)

(73) Assignee: Panasonic Corporation, Osaka (JP)

(*) Notice: Subject to any disclaimer, the term of this patent is extended or adjusted under 35 U.S.C. 154(b) by 621 days.

(21) Appl. No.: 12/867,576

(22) PCT Filed: Feb. 16, 2009

(86) PCT No.: PCT/JP2009/052533
§ 371 (c)(1),
(2), (4) Date: Aug. 13, 2010

(87) PCT Pub. No.: WO2009/104550
PCT Pub. Date: Aug. 27, 2009

(65) Prior Publication Data
US 2010/0315825 A1 Dec. 16, 2010

(30) Foreign Application Priority Data
Feb. 22, 2008 (JP) .................... 2008-042019

(51) Int. Cl.
*G03B 21/26* (2006.01)
*H04N 9/31* (2006.01)

(52) U.S. Cl.
CPC ........... *H04N 9/3185* (2013.01); *H04N 9/3194* (2013.01); *H04N 9/3197* (2013.01)
USPC ............... 353/94; 353/97; 362/458

(58) Field of Classification Search
CPC .......... G02B 26/00; G02B 26/08; G02B 7/02; G09G 5/10; G09G 5/00; G05G 5/02; G06T 11/00; F21S 8/00; G03B 21/26
USPC ................. 353/69, 70, 94; 362/458
See application file for complete search history.

(56) References Cited

U.S. PATENT DOCUMENTS 6,386,711 B1 * 5/2002 Petruchik et al. ............. 353/122
6,554,431 B1 4/2003 Binsted et al.
(Continued)

FOREIGN PATENT DOCUMENTS

CN 1460919 12/2003
JP 05-249428 9/1993
(Continued)

OTHER PUBLICATIONS

"About Gobo", Egghouse Co., printed from http://www.egghouse.com/gobo/about.htm on Jul, 8, 2010, pp. 1-4, with translation.
(Continued)

*Primary Examiner* — Francis M Legasse, Jr.
*Assistant Examiner* — Jerry Brooks
(74) *Attorney, Agent, or Firm* — Greenblum & Bernstein, P.L.C.

(57) ABSTRACT

A light projection apparatus that projects light onto an arbitrary space and an object set in the space, comprising: projection light data generating means for generating projection light data for specifying the projection light; projection range setting means for setting a projection range onto which the light is projected and a non-projection range onto which the light is not projected in accordance with an operation of a user; projection data correcting means for correcting the projection light data so as to project the light onto the projection range set by the projection range setting means; projection light correction data drawing means for performing drawing processing for projection light correction data obtained by correcting the projection light data by the projection data correcting means; and light projecting means for projecting the light by using projection light drawing data generated by the projection light data drawing means. Accordingly, by a simple operation, the light can be projected with the shape desired by the user.

18 Claims, 41 Drawing Sheets

(56) References Cited

U.S. PATENT DOCUMENTS

| | | | |
|---|---|---|---|
| 6,771,411 B2* | 8/2004 | Hewlett | 359/298 |
| 7,605,776 B2* | 10/2009 | Satoh et al. | 345/9 |
| 7,948,448 B2* | 5/2011 | Hutchinson et al. | 345/1.1 |
| 2003/0025649 A1* | 2/2003 | Wynne Willson | 345/6 |
| 2004/0036813 A1 | 2/2004 | Matsuda | |
| 2004/0227911 A1* | 11/2004 | Salvatori et al. | 353/122 |
| 2005/0068500 A1* | 3/2005 | Tamura et al. | 353/28 |
| 2006/0266135 A1 | 11/2006 | Nishikawa et al. | |
| 2007/0195270 A1 | 8/2007 | Hull et al. | |
| 2008/0024514 A1 | 1/2008 | Matsuda | |
| 2008/0095468 A1 | 4/2008 | Klemmer et al. | |
| 2008/0137040 A1* | 6/2008 | Rodriguez et al. | 353/79 |
| 2009/0268095 A1 | 10/2009 | Hoshino et al. | |

FOREIGN PATENT DOCUMENTS

| | | |
|---|---|---|
| JP | 2000-352761 | 12/2000 |
| JP | 2003-283964 | 10/2003 |
| JP | 2005-258162 | 9/2005 |
| JP | 2005-352172 | 12/2005 |
| JP | 2006-338181 | 12/2006 |
| JP | 2007-271771 | 10/2007 |
| WO | 2006/024254 | 3/2006 |

OTHER PUBLICATIONS

"DL.2 Digital Light", Ushio Lighting, Inc., printed from http://www.ushiolighting.cojp/productimage/pdf/dl2.pdf; pp. 1-2, with translation.

Japanese Office action dated Mar. 6, 2012.

China Office action, dated Mar. 4, 2013 along with an english translation thereof.

Search report from E.P.O., mail date is Jun. 2, 2014.

* cited by examiner

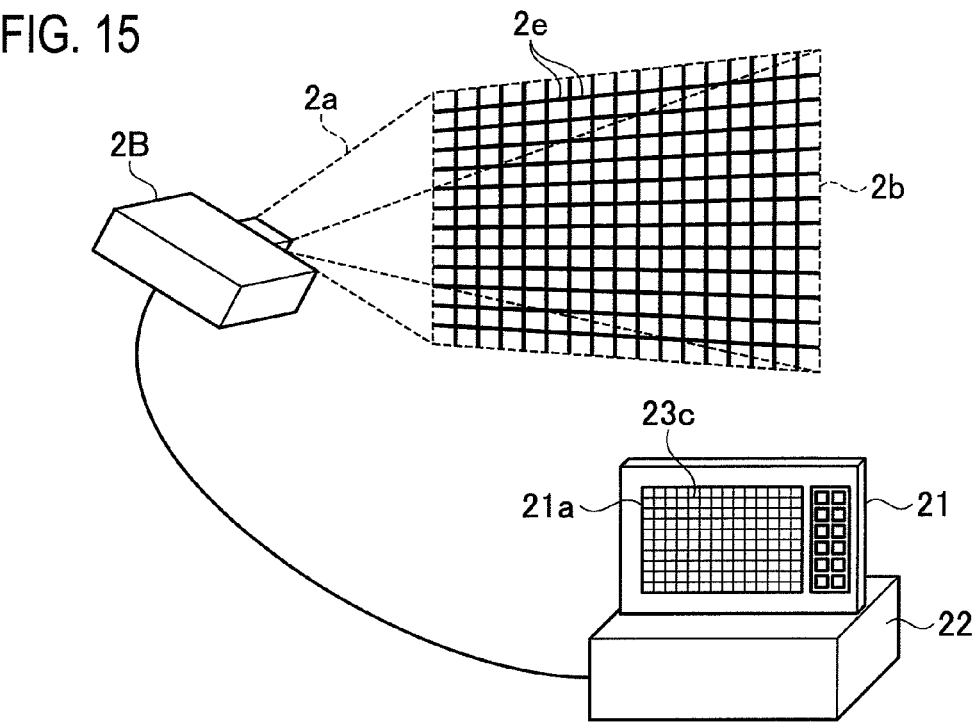
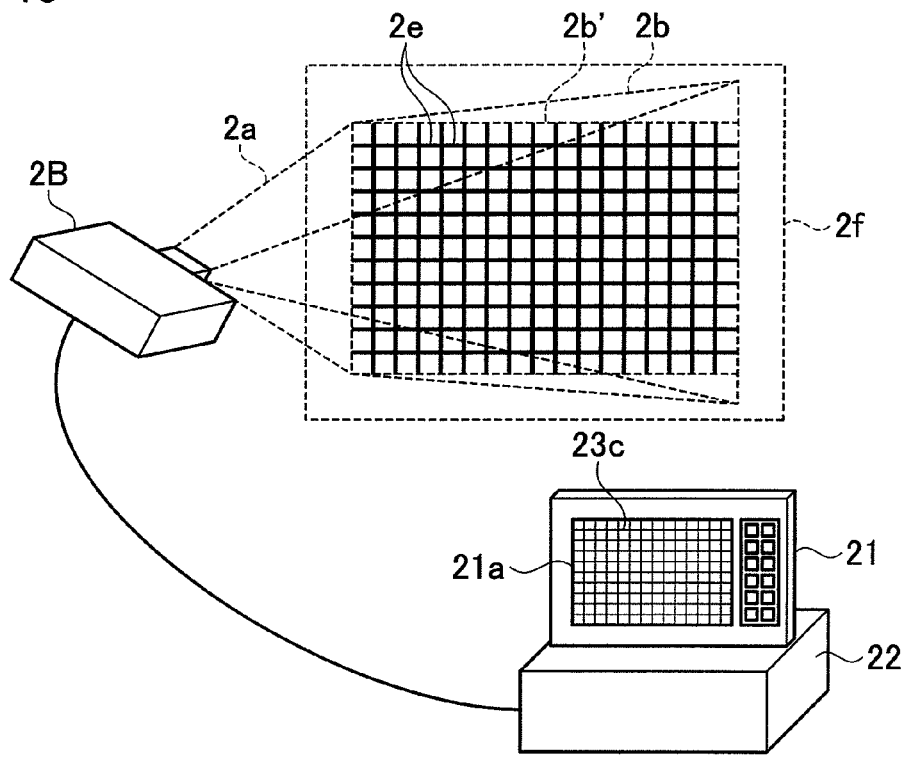

(a)

(b)

LIGHT PROJECTION APPARATUS AND LIGHTING APPARATUS

TECHNICAL FIELD

The present invention relates to a light projection apparatus and a lighting apparatus, which project light only onto a place onto which a user desires to project the light.

BACKGROUND ART

Heretofore, as described in the following Non-Patent Literature 1, in a lighting apparatus that changes a shape of projection light, a filter called a gobo or a mask is installed to a projection instrument, and a projection portion onto which the projection light is emitted from the projection instrument is shaded. In such a way, the projection light that has passed through the filter turns to a state of being clipped into a specific shape. Specifically, in a conventional lighting system, a filter (such as the gobo) clipped into a base shape composed of a circle, a triangle, a square or the like is attached to the projection instrument, and a shape is given to an outline of the projection light.

Moreover, in the conventional lighting system, in the case where the light is desired to be projected along the specific shape, after a projection position of the projection light emitted from the projection instrument is aligned to a place having the specific shape, a rough matching operation for the projection light having the specific shape is performed by a diaphragm function and zoom function of the projection instrument.

Furthermore, heretofore, there is a lighting system that performs space direction by using a projector, which is the projection instrument, in place of a lighting appliance (a light). A lighting appliance for use in this lighting system is also called a moving projector. This moving projector emits video light as the projection light. Therefore, the moving projector is capable of freely setting the shape and color of the projection light, and changing the projection light as a moving picture.

However, even in this lighting system, in the case of giving the shape to the projection light, in a similar way to the conventional lighting system, there is adopted a technique for roughly matching an outline of the projection light with a shape of an object as a projection target by using the base shape.

Still further, heretofore, a technology described in the following Patent Literature 1 is known as a stereoscopic display apparatus capable of effectively expressing a surface texture of an object on a three-dimensional shape mode.

LITERATURES OF PRIOR ART

Non-Patent Literature

[Non-Patent Literature 1] http://www.egghouse.com/gobo/about.htm
[Non-Patent Literature 2] http://www.ushiolighting.co.jp/product/productimage/pdf/d12.pdf

Patent Literature

[Patent Literature 1] Japanese Patent Laid-Open Publication No. 2006-338181

DISCLOSURE OF THE INVENTION

However, in the above-mentioned conventional lighting system, a shape filter, a diaphragm and a zoom, which are prepared in advance, are used, and accordingly, the shape of the projection light can only be roughly matched with the object as the projection target. Moreover, in the mask processing for superimposing the base shape on the video, the base shape is formed in conformity with the shape of the object as the projection target, whereby highly accurate shape matching is possible. However, the base shape is formed into a two-dimensional shape. Therefore, in the case of viewing the object as the projection target having an arbitrary shape in different directions, it is necessary to use different base shapes, and it is difficult to divert the mask processing to a technology for simultaneously projecting plural pieces of the projection light toward the object as the projection target by a plurality of the projection instruments installed at different positions.

In this connection, the present invention has been proposed in consideration of the above-mentioned actual circumstances. It is an object of the present invention to provide a light projection apparatus and a lighting apparatus, which are capable of projecting the light in a shape desired by the user.

In order to solve the above-mentioned problems, a light projection apparatus according to the present invention is a light projection apparatus that projects light onto an arbitrary space and an object set in the space, including: projection light data generating means for generating projection light data for specifying the projection light; projection range setting means for setting a projection range onto which the light is projected and a non-projection range onto which the light is not projected in accordance with an operation of a user; projection data correcting means for correcting the projection light data so as to project the light onto the projection range set by the projection range setting means; projection light correction data drawing means for performing drawing processing for projection light correction data obtained by correcting the projection light data by the projection data correcting means; and light projecting means for projecting the light by using projection light drawing data generated by the projection light data drawing means.

In the present invention, the projection light data generating means may specify elements including illuminance, brightness, luminosity, luminous flux, color temperature and color rendering of the projection light.

In the present invention, the projection light data generating means may further divide the projection range set by the projection range setting means, and may designate characteristics of the light for each of the divided projection ranges.

The light projection apparatus according to the present invention may further include: shape drawing/inputting means for drawing and inputting an arbitrary shape in accordance with the operation of the user, wherein the projection range setting means may define, as the projection range, the shape inputted by the shape drawing/inputting means.

The light projection apparatus according to the present invention may further include: reference image data generating means for generating reference image data for generating a reference image formed into a grid shape; reference image drawing means for performing drawing processing for the reference image data generated by the reference image data generating means; reference image projecting means for projecting the light by using reference image drawing data drawn by the reference image drawing means; and displaying means for displaying the reference image drawing data drawn by the reference image drawing means, wherein the reference image may be projected onto the space and the object, which are light projection targets.

The light projection apparatus according to the present invention may further include: reference image projection parameter inputting means for inputting a parameter including a position, attitude and specifications of the reference image projecting means; operation position parameter inputting means for inputting a parameter including an operation position of the user who sets the projection range by the projection range setting means; virtual plane parameter inputting means for, in order to grasp a display state of the reference image projected from the reference image projecting means, receiving a parameter including a position, attitude and size of a virtual planar region virtually set on a projection region of the reference image projecting means; and reference image distortion correcting means for correcting, based on the parameter including the position, attitude and specifications of the reference image projecting means, the parameter including the operation position and the parameter including the position, attitude and size of the virtual planar region, the reference image data so as to distort the reference image, which is projected from the reference image projecting means, in order to allow the reference image to be observed free from distortion in a case where the user visually recognizes the reference image.

The light projection apparatus according to the present invention may further include: a flat screen for displaying the reference image projected from the reference image projecting means; photographing means for photographing the reference image displayed on the flat screen; and reference image distortion correcting means for distorting the reference image, which is projected from the reference image projecting means, so as to make coincidence between photographic data photographed by the photographing means and the reference image generated by the reference image data generating means.

The light projection apparatus according to the present invention may further include: projection range identification condition setting means for receiving conditions for specifying the projection range; and projection range identifying means for identifying the projection range in accordance with the conditions received by the projection range identification condition setting means, wherein the projection light data may be corrected so as to correspond to the projection range identified by the projection range identifying means, and the light may be projected from the light projecting means.

The light projection apparatus according to the present invention may further include: photographing means for photographing, as a photographic range, a space including the projection range of the light projecting means; photographic data displaying means for displaying the photographic data photographed by the photographing means; photographic parameter inputting means for inputting a parameter including a position, attitude and specifications of the photographing means; light projection parameter inputting means for inputting a parameter including a position, attitude and specifications of the light projecting means; virtual plane inputting means for inputting a parameter including a position, attitude and size of a virtually set virtual planar region in order to grasp a state of the projection range of the light projecting means; and projection light data correcting means for correcting the projection light data so as to allow the projection light to coincide with the photographic range of the photographing means on the virtual plane based on the parameter including the position, attitude and specifications of the photographing means, the parameter including the position attitude and specifications of the light projecting means and the parameter including the position, attitude and size of the virtual planar region.

The light projection apparatus according to the present invention may further include: projection range extraction setting means for setting conditions for extracting the projection range; and classifying means for classifying the projection range and the non-projection range other than the projection range with each other by analyzing the photographic data, which is generated by the photographing means, in accordance with the conditions set by the projection range extraction setting means, wherein the projection light data correcting means may correct the projection light data based on the projection range and the non-projection range, which are classified with each other by the classifying means.

The light projection apparatus according to the present invention may further include: projection range revising means for revising a boundary of the projection range in accordance with the operation of the user.

The light projection apparatus according to the present invention may further include: projection light data storing means for storing the projection light data; projection light data output setting means for setting at least either of an output order and output condition of the projection light data stored in the projection light data storing means; and projection light data updating means for outputting the projection light data, which is stored in the projection light data storing means, in accordance with the at least either of the output order and the output condition, the at least either one being set by the projection light data output setting means.

The light projection apparatus according to the present invention may further include: projection range parameter storing means for storing a projection range parameter for correcting the projection light data by the projection light data correcting means; projection range output setting means for setting at least either of an output order and output condition of the projection range parameter stored in the projection range parameter storing means; and projection range parameter updating means for outputting the projection range parameter, which is stored in the projection range parameter storing means, in accordance with the at least either of the output order and the output condition, the at least either one being set by the projection range output setting means.

The light projection apparatus according to the present invention may further include: projection light correction data storing means for storing the projection light correction data corrected by the projection light data correcting means; projection light correction light data output setting means for setting at least either of an output order and output condition of the projection light data stored in the projection light correction data storing means; and projection light data updating means for outputting the projection light data, which is stored in the projection light correction data storing means, in accordance with the at least either of the output order and the output condition, the at least either one being set by the projection light correction data output setting means.

The light projection apparatus according to the present invention may further include: reference image data storing means for storing the reference image data; reference image data output setting means for setting at least either of an output order and output condition of the reference image data stored in the reference image data storing means; and reference image updating means for outputting the reference image data, which is stored in the reference image data storing means, in accordance with the at least either of the output order and the output condition, the at least either one being set by the reference image data output setting means.

The light projection apparatus according to the present invention may further include: projection light drawing data storing means for storing the projection light drawing data generated by the projection light correction data drawing means; and external recording means for recording the projection light drawing data, which is stored in the projection light drawing data storing means, in an external recording medium, and outputting the projection light drawing data, which is recorded in the external recording medium, to the light projecting means.

In the light projection apparatus according to the present invention, plural pieces of the light projecting means may be provided.

In the light projection apparatus according to the present invention, the projection light data may be video data indicating a video, the projection range setting means may set a video projection range onto which the video is projected, and may set a non-projection range, the projection light data correcting means may correct the video data so as to project the video onto the video projection range, the projection light correction data drawing means may perform drawing processing for the corrected video data, and the light projecting means may project the video onto the video projection range.

The present invention may be a lighting apparatus, wherein the configuration according to any of the above is provided.

Advantageous Effects of the Invention

In accordance with the light projection apparatus according to the present invention, among the projection range onto which the projection light is projected, the projection range onto which the projection light is projected and the non-projection range are set in accordance with the operation of the user. Accordingly, by a simple operation, the light can be projected with the shape desired by the user.

BRIEF DESCRIPTION OF THE DRAWINGS

FIG. 15 is a view showing a state where distortion occurs in a projection range in the lighting system shown as the fifth embodiment of the present invention.

FIG. 16 is a view showing a state of correcting the distortion of the projection range in the lighting system shown as the fifth embodiment of the present invention.

FIG. 19(a) shows a positional relationship between the eye-point position and points on the flat object; and FIG. 19(b) shows a grid-like two-dimensional video.

FIG. 21(a) shows a relationship among the eye-point position and viewing field of the user, a position of the flat object, and the projection position and projection image angle of the projector; and FIG. 21(b) shows a distorted two-dimensional video.

FIG. 22(a) shows a relationship between the dome-like object as the projection target and the eye-point position of the user when the object as the projection target is the dome-like object; and FIG. 22(b) shows grid-like projection light.

FIG. 23(a) shows a relationship among the eye-point position and viewing field of the user, the position of the flat object, and the projection position and projection image angle of the projector; and FIG. 23(b) shows a distorted two-dimensional video.

BEST MODE FOR CARRYING OUT THE INVENTION

A description is made below of embodiments of the present invention with reference to the drawings.

First Embodiment

Figure 1:
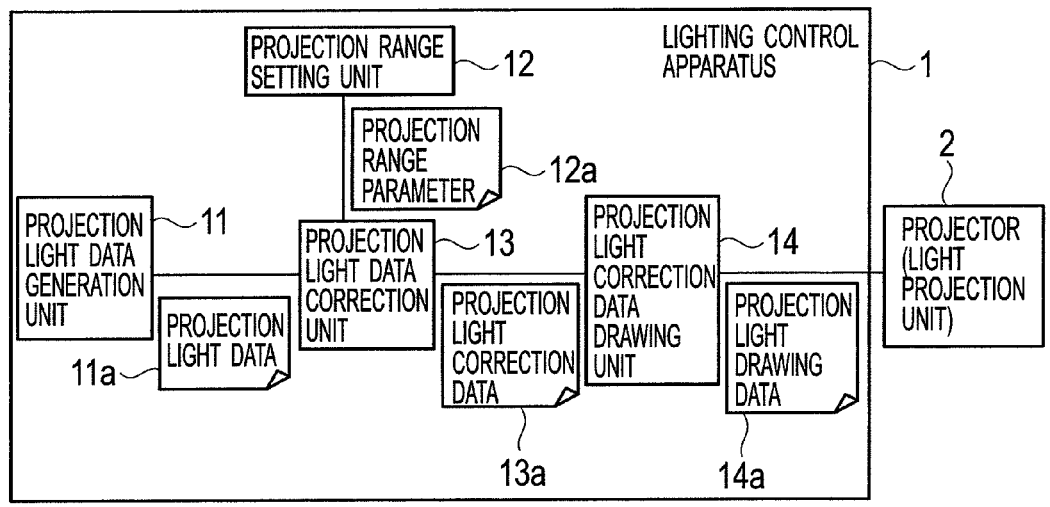
FIG. 1 is a block diagram showing a functional configuration of a lighting system shown as a first embodiment of the present invention.
Figure 2:
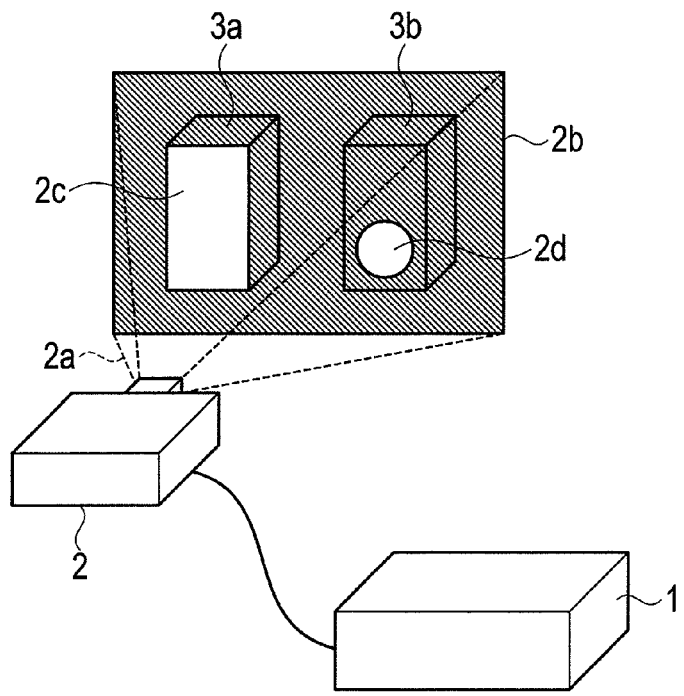
FIG. 2 is a perspective view showing a specific configuration of the lighting system shown as the first embodiment of the present invention.
Figure 3:
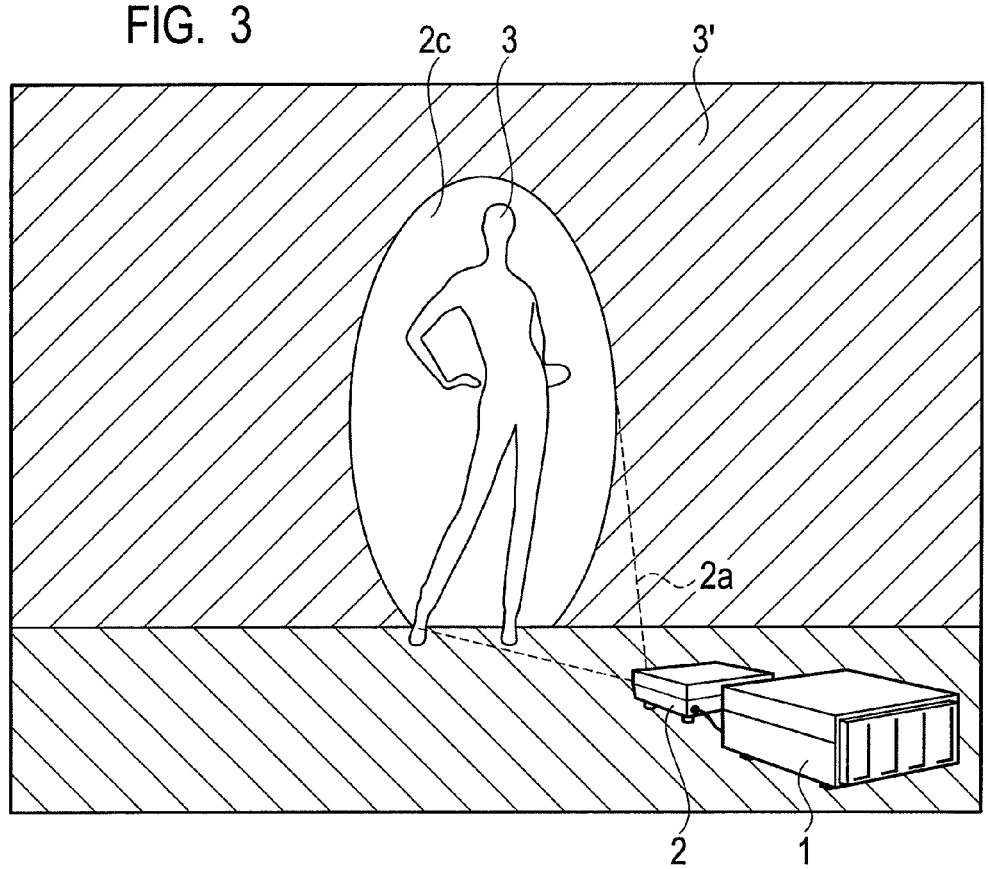
FIG. 3 is a perspective view showing a specific operation state of the lighting system shown as the first embodiment of the present invention.

For example, the present invention is applied to a lighting system shown as a first embodiment, which is configured as shown in FIG. 1 to FIG. 3. This lighting system is composed of: a lighting control apparatus 1; and a projector 2 that operates under control of the lighting control apparatus 1. This lighting system projects light from the projector 2 only onto specific object and space only by a simple operation of a user.

Specifically, as shown in FIG. 2, the lighting system can project projection light 2a with a projection-enabled range 2b from the projector 2, and can brightly lighten specific projection ranges 2c and 2d (hereinafter, also simply called projection ranges 2c in the case of being generically referred to) of projection target objects 3a and 3b (hereinafter, also simply called projection target objects 3 in the case of being generically referred to). Note that, in the following, the description is made on the assumption that the projection light 2a includes projection light that brightly lightens the projection ranges 2c and 2d and non-projection light projected toward a background.

The lighting control apparatus 1 includes: a projection light data generation unit 11 as projection light data generating means for generating projection light data for specifying the projection light 2a (projection light data); a projection range setting unit 12 as projection range setting means for setting the projection ranges 2c and 2d and a non-projection range among the projection-enabled range 2b onto which the projection light 2a is projected in accordance with an operation of the user; a projection light data correction unit 13 as projection light data correcting means for correcting the projection light data, which is inputted thereto by the projection light data generation unit 11, so as to project the projection light onto the projection ranges 2c and 2d set by the projection range setting unit 12; and a projection light correction data drawing unit 14 as projection light data drawing means for performing drawing processing for projection light correction data obtained by correcting the projection light data by trimming (correction) processing by the projection light data correction unit 13.

Moreover, the projector 2 functions as light projecting means for generating projection light, which is for use in projecting the projection light onto the projection range, by using projection light drawing data generated by the projection light correction data drawing unit 14.

The projection light data generation unit 11 is composed of a playback device that plays back a DVD, a hard disk device that stores a variety of projection light data 11a therein, or the like. The projection light data generation unit 11 supplies the projection light data 11a to the projection light data correction unit 13 in accordance with the operation of the user, and the like.

Moreover, the projection light data generation unit 11 sets characteristic information for specifying the projection light projected onto the projection ranges 2c and 2d and the non-projection light projected onto the non-projection range, the projection light and the non-projection light being included in the projection light 2a. Specifically, as this characteristic information, there are elements including illuminance, brightness, luminosity, luminous flux, color temperature and color rendering of the projection light, and the respective elements can be specified. Then, the projection light data generation unit 11 generates the projection light data 11a specified by the characteristic information, and outputs the projection light data 11a to the projection light data correction unit 13.

The projection range setting unit 12 is composed of a memory that stores therein a projection range parameter 12a for specifying the projection range and the non-projection range, and the like. This projection range parameter 12a is data representing the projection range 2c or the non-projection range, onto which the light is projected, by coordinates on the projection-enabled range 2b of the projector 2. The projection range setting unit 12 supplies the projection range parameter, which is generated in advance, to the projection light data correction unit 13 according to needs.

The projection light data correction unit 13 sets the projection range 2c by using the projection range parameter 12a, which is supplied from the projection range setting unit 12, for the projection light data 11a supplied from the projection light data generation unit 11. The projection range 2c is set, whereby the projection light data correction unit 13 can set the non-projection range.

In order to set the projection range 2c, the projection light data correction unit 13 performs the trimming processing for the projection light data 11a. Specifically, the projection light data correction unit 13 decides the range of the projection light that lightens the projection range 2c from among the projection light 2a. Then, only a portion of the projection light 2a, which is equivalent to the projection range 2c, is set at the color and brightness of the projection light, which are decided by the projection light data generation unit 11. Meanwhile, the projection light data correction unit 13 sets a portion of the projection light 2a, which is equivalent to the non-projection range other than the projection range 2c, at the color and brightness of the non-projection light, which are decided by the projection light data generation unit 11. The correction data of the projection light data 11a, which is generated as described above, is supplied as projection light correction data 13a to the projection light correction data drawing unit 14.

The projection light correction data drawing unit 14 performs the drawing processing by using the projection light correction data 13a supplied from the projection light data correction unit 13, and outputs projection light drawing data to the projector 2. In such a way, the lighting control apparatus 1 drives the projector 2 based on the projection light drawing data 14a.

In accordance with the lighting system as described above, the projection range 2c to be brightly lightened is only decided in advance, whereby the projection light 2a in which only the desired projection ranges 2c and 2d are emphasized among the projection-enabled range 2b can be projected. Specifically, as shown in FIG. 3, a periphery of a projection target object 3 can be defined as the projection range 2c, and a wall surface 3' can be defined as the non-projection range.

In other words, in the existing trimming lighting, the trimming of the projection light (correction of the projection range 2c) has been realized by placing a mask (gobo), which is fabricated in advance, in front of a projection lens of the projector 2, or by image correction (masking) using a mask shape designated in advance; however, the projection range 2c can be set only by preparing the projection range parameter 12a in advance, and setting work and projection operation of the projection light trimmed in real time can be realized.

Second Embodiment

Figure 4:
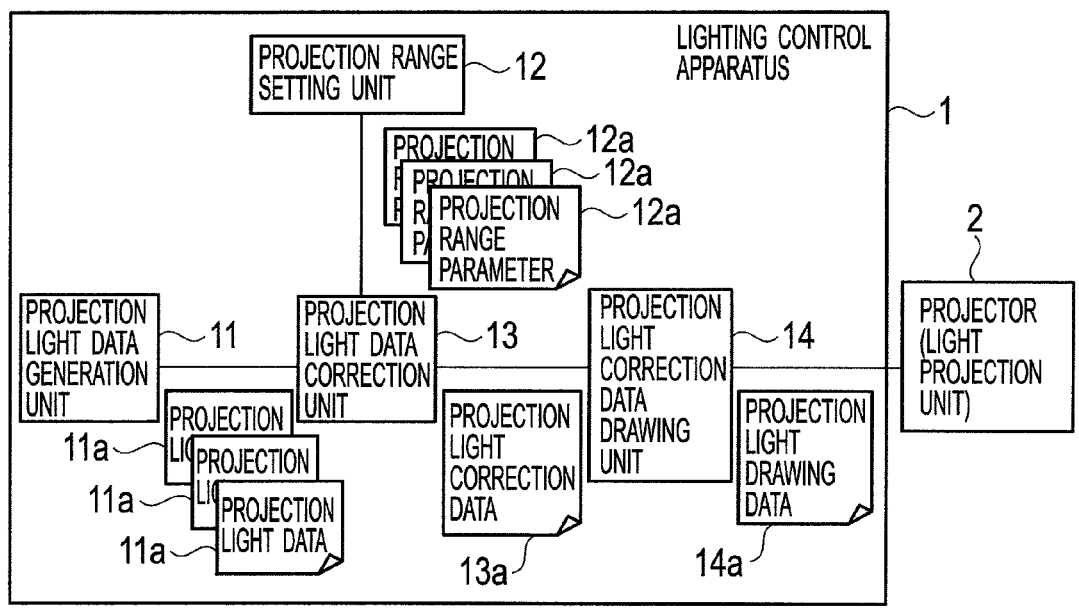
FIG. 4 is a block diagram showing a functional configuration of a lighting system shown as a second embodiment of the present invention.
Figure 5:
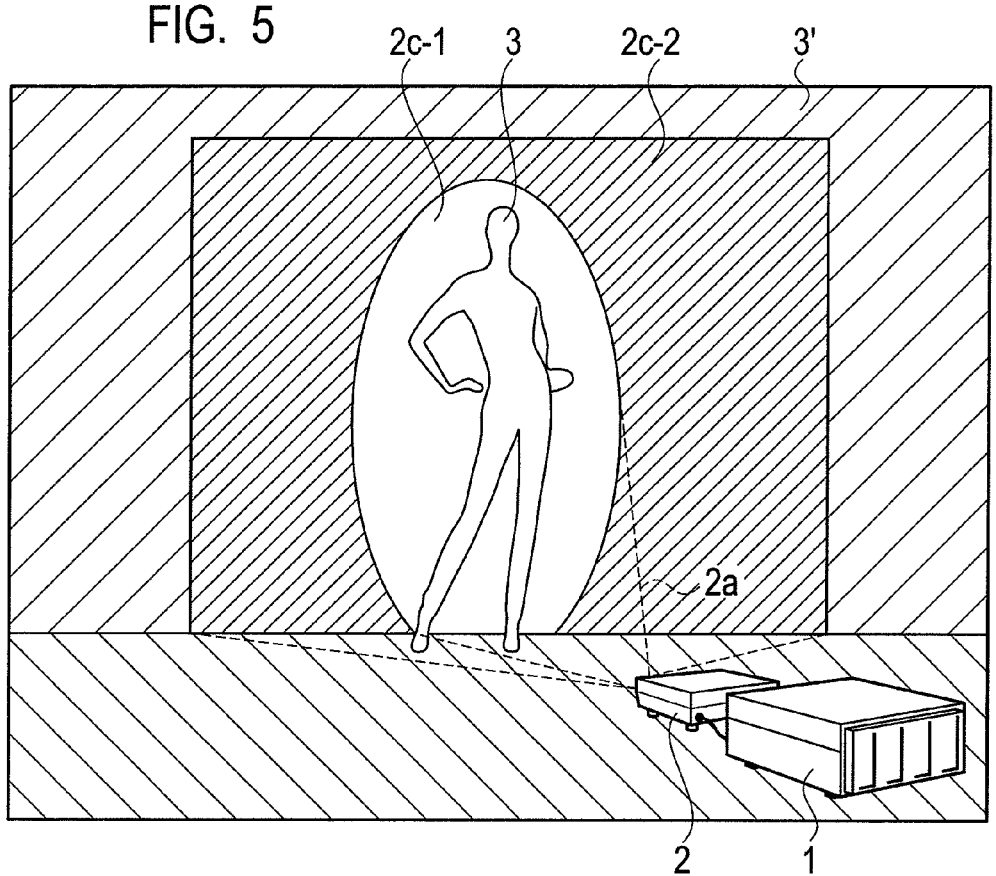
FIG. 5 is a perspective view showing a specific operation state of the lighting system shown as the second embodiment of the present invention.

Next, a description is made of a lighting system, which is shown as a second embodiment of the present invention, with reference to FIG. 4 and FIG. 5. Note that the same reference numerals are assigned to similar portions to those of the above-mentioned lighting system, whereby a detailed description thereof is omitted.

In the lighting system shown as the second embodiment, the projection light data generation unit 11 further divides the projection range 2c set by the projection range setting unit 12, and designates the characteristics of the light for each of the divided projection ranges 2c.

As shown in FIG. 4, in this lighting system, the projection light data generation unit 11 outputs projection light data 11a for each range obtained by dividing the projection range 2c in the projection-enabled range 2b. The projection light data generation unit 11 outputs a plurality of the projection light data 11a different in element including the illuminance, the brightness, the luminosity, the luminous flux, the color temperature and the color rendering of the projection light, which are the respective characteristics of the light. The plurality of projection light data 11a different in characteristics may be those stored in advance, or may be those generated by changing the characteristics by image processing of the projection light data generation unit 11.

The projection range setting unit 12 supplies projection range parameters 12a, which indicate the respective ranges obtained by dividing the projection range 2c, to the projection light data correction unit 13.

The projection light data correction unit 13 corrects the projection light data generation unit 11 so that different pieces of light can be individually projected onto the plurality of projection ranges 2c divided by the projection range parameters 12a, and thereby generates projection light correction data 13a.

Specifically, as shown in FIG. 5, bright light is projected onto a projection range 2c-1 on the periphery of the projection target object 3, and darker light than the light projected onto the projection range 2c-1 is projected onto a projection range 2c-2 on the periphery of the projection range 2c-1. In this case, the projection light data 11a is composed of the projection light data 11a for the light projected onto the projection range 2c-1, and of the projection light data 11a for the light projected onto the projection range 2c-2. At the same time, the projection range parameter 12a is composed of the projection range parameter 12a indicating the projection range 2c-1 among the projection-enabled range 2b by coordinate data, and of the projection range parameter 12a indicating the projection range 2c-2 among the projection-enabled range 2b by coordinate data.

In accordance with the lighting system as described above, the projection light data 11a is only prepared in advance for each of the divided projection ranges 2c, whereby the desired projection light 2a can be projected onto the plurality of projection ranges 2c among the projection-enabled range 2b.

Third Embodiment

Figure 6:
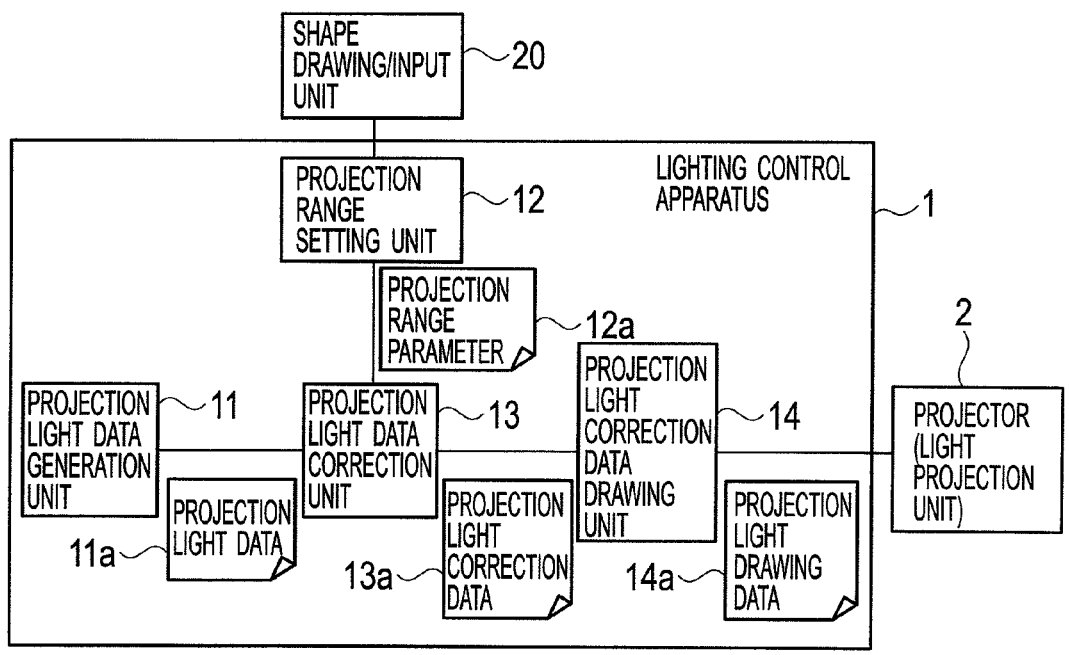
FIG. 6 is a block diagram showing a functional configuration of a lighting system shown as a third embodiment of the present invention.
Figure 7:
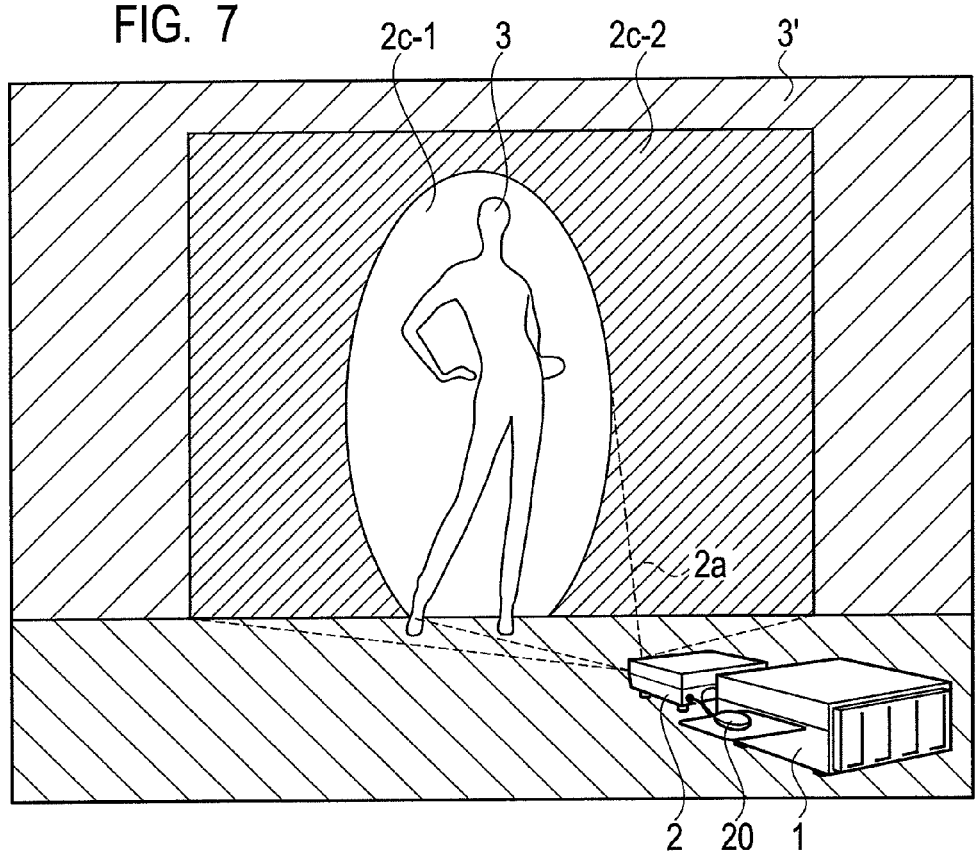
FIG. 7 is a perspective view showing a specific operation state of the lighting system shown as the third embodiment of the present invention.

Next, a description is made of a lighting system, which is shown as a third embodiment of the present invention, with reference to FIG. 6 and FIG. 7. Note that the same reference numerals are assigned to similar portions to those of the above-mentioned lighting systems, whereby a detailed description thereof is omitted.

As shown in FIG. 6, the lighting system according to the third embodiment includes a shape drawing/input unit 20 that draws and inputs an arbitrary shape in accordance with the operation of the user, in which the shape inputted to the projection range setting unit 12 by the shape drawing/input unit 20 is defined as the projection range 2c.

The shape drawing/input unit 20 is composed of a pen tablet system formed of a pointing device such as a mouse, a liquid crystal panel configured as a display unit of a monitor device 21, and a pen operated of the user. Here, it is desirable that the entire screen of the liquid crystal panel correspond to the entire range of the projection-enabled range 2b.

In the case of being composed of the pen tablet system, the shape drawing/input unit 20 generates orbit information of writing pressure applied to the liquid crystal panel by the pen. This orbit information of the writing pressure is converted into a projection range parameter 12a indicating an outline of the projection range 2c (trimming region) by the projector 2. This projection range parameter 12a is supplied to the projection light data correction unit 13 from the projection range setting unit 12, and the projection light data 11a is corrected based on the projection range parameter 12a by the projection light data correction unit 13, whereby the projection range 2c can be changed.

FIG. 7 shows a state where, in the case where the shape drawing/input unit 20 is the mouse, and the projection light 2a is actually projected onto the projection target object 3 to thereby form the projection range 2c-1 and the projection range 2c-2, the projection range 2c-1 can be changed while moving the mouse.

In accordance with the lighting system as described above, only by such an operation in which the user operates the shape drawing/input unit 20 to thereby designate the outline of the desired projection range 2c, the projection light 2a in which only the desired projection range 2c among the projection-enabled range 2b is emphasized can be projected.

In other words, in the existing trimming lighting, the trimming of the projection light (correction of the projection range 2c) has been realized by placing the mask (gobo), which is fabricated in advance, in front of the projection lens of the projector 2, or by the image correction (masking) using the mask shape designated in advance; however, in accordance with the lighting system to which the present invention is applied, the projection range 2c can be set like drawing a picture on the spot while actually looking at the projection target object 3, and the setting work, projection operation and revision work of the projection range 2c can be realized in real time.

Note that, in the case of using the pen tablet system in this lighting system, it is considered that the projection range setting unit 12 is allowed to adopt a mode of directly writing the outline of the projection range 2c on the liquid crystal panel; however, the mode thus adopted is not limited to this. For example, the projection range 2c may be set by arranging a base shape (circle, ellipsoid, quadrangle, polygon, star, or the like), which is generated in advance, on an arbitrary place, or the projection range 2c may be set by enlarging, reducing or changing the base shape. As an example of changing the base shape, there are mentioned modification between the circle and the ellipsoid and modification between a square and a rectangle.

Moreover, in this lighting system, when the user designates the projection range 2c by the shape drawing/input unit 20, a manual exploratory point may be displayed on the liquid crystal panel in response to the operation to the shape drawing/input unit 20, or light corresponding to the manual exploratory point may be emitted by the projector 2. For example, in the case where an upper left end portion of the projection target object 3 is desired to be designated accurately, the projector 2 is operated so as to irradiate a position in the projection-enabled range 2b, which corresponds to an arbitrarily touched point on the shape drawing/input unit 20, when the user arbitrarily touches the shape drawing/input unit

20. In such a way, the lighting system can allow an operation of more easily designating the projection range 2c.

Fourth Embodiment

Next, a description is made of a lighting system, which is shown as a fourth embodiment of the present invention, with reference to FIG. 8 to FIG. 13. Note that the same reference numerals are assigned to similar portions to those of the above-mentioned lighting systems, whereby a detailed description thereof is omitted.

Figure 8:
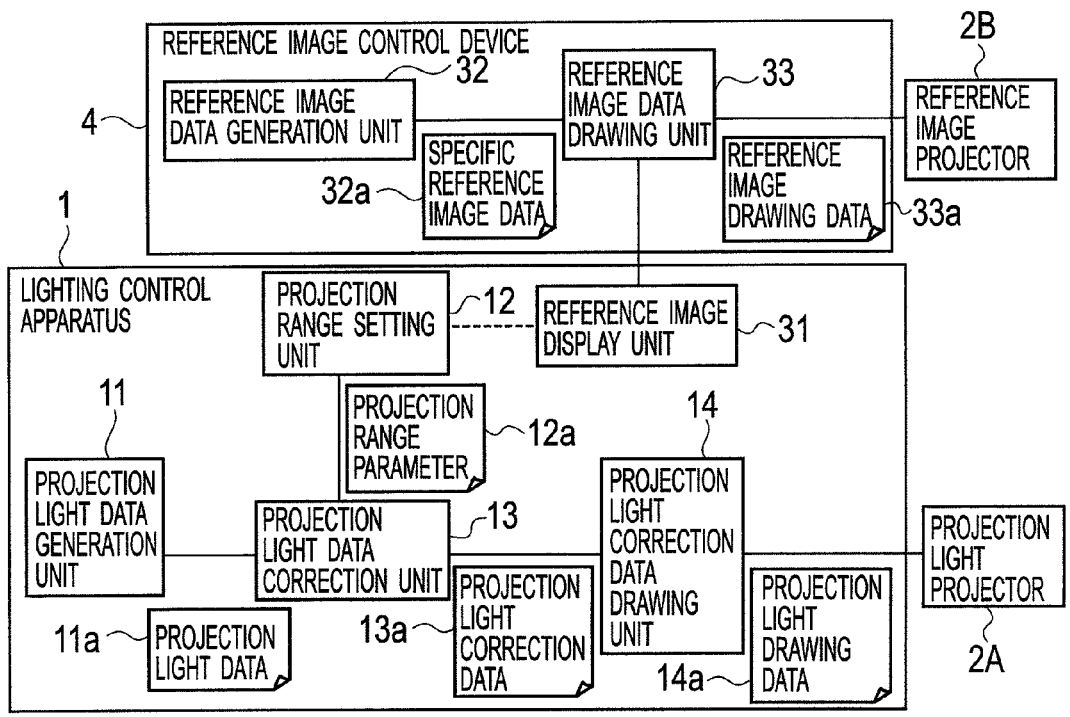
FIG. 8 is a block diagram showing a functional configuration of a lighting system shown as a fourth embodiment of the present invention.

As shown in FIG. 8, in addition to the components of the above-mentioned lighting system, this lighting system includes a reference image control device 4 that projects a reference image serving as a reference for projecting the projection light. Specifically, in the reference image control device 4, the lighting system includes: a reference image data generation unit 32 as reference image data generating means for generating reference image data for projecting the reference image; and a reference image data drawing unit 33 as reference image drawing means for performing drawing processing for the reference image data generated by the reference image data generation unit 32. Moreover, in order to project the reference image separately from the projection light 2a, the lighting system includes a reference image projector 2B as reference image projecting means.

Note that, in the following description, the projector that projects the projection light 2a and the projector that projects the reference image are referred to as a "projection light projector 2A" and the "reference image projector 2B", respectively in the case of being distinguished from each other.

Moreover, in this lighting system, the lighting control apparatus 1 includes a reference image display unit 31 as displaying means for displaying the reference image. This reference image display unit 31 is composed of a liquid crystal panel or the like.

In the event where the user sets the projection ranges 2c and 2d, the lighting system as described above generates specific reference image data 32a composed of grid points, grid lines or the like by the reference image data generation unit 32. This reference image just needs to be such an image that allows the user to visually recognize the coordinates in the projection-enabled range 2b of the projection light projector 2A.

The reference image data drawing unit 33 performs the drawing processing using the reference image data 32a supplied from the reference image data generation unit 32, and outputs reference image drawing data 33a to the reference image projector 2B. Moreover, the reference image data drawing unit 33 supplies the reference image drawing data 33a to the reference image display unit 31 of the lighting control apparatus 1 in order to allow the reference image display unit 31 to display the reference image.

In the case where the projection range setting unit 12 includes a liquid crystal panel, the reference image display unit 31 is composed of a display device shared therewith. This reference image display unit 31 drives a liquid crystal mechanism in accordance with the reference image drawing data 33a, and allows the liquid crystal mechanism to display the reference image.

Figure 9:
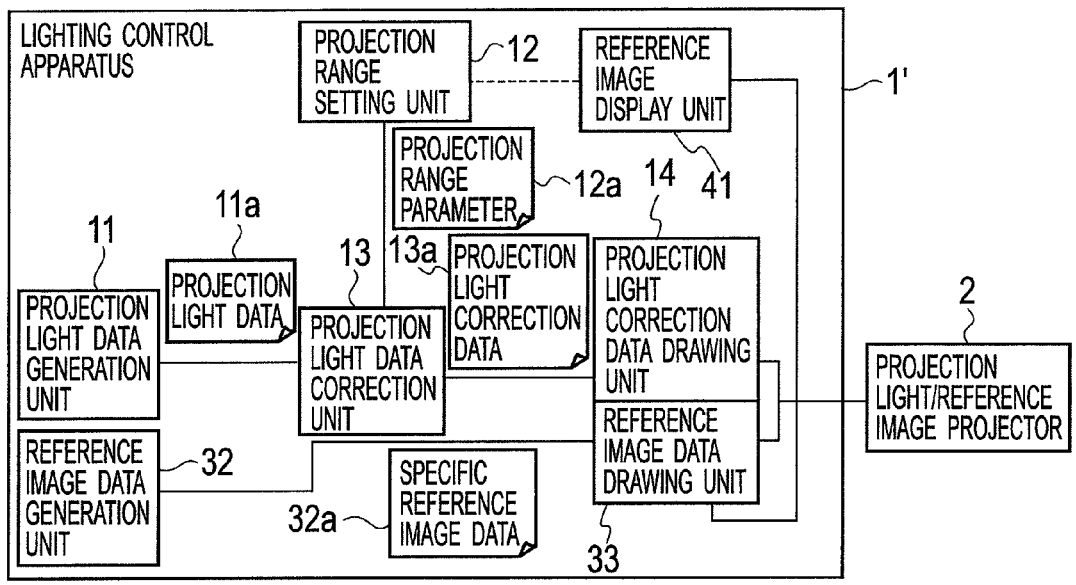
FIG. 9 is a block diagram showing another functional configuration of the lighting system shown as the fourth embodiment of the present invention.

Note that, as shown in FIG. 9, in the lighting control apparatus 1, this lighting system may include: a reference image display unit 41; the reference image data generation unit 32; and the reference image data drawing unit 33, and may project the reference image and the projection light 2a by the single projector 2. In such a way, the lighting system can be composed of the single projector and a personal computer.

Figure 10:
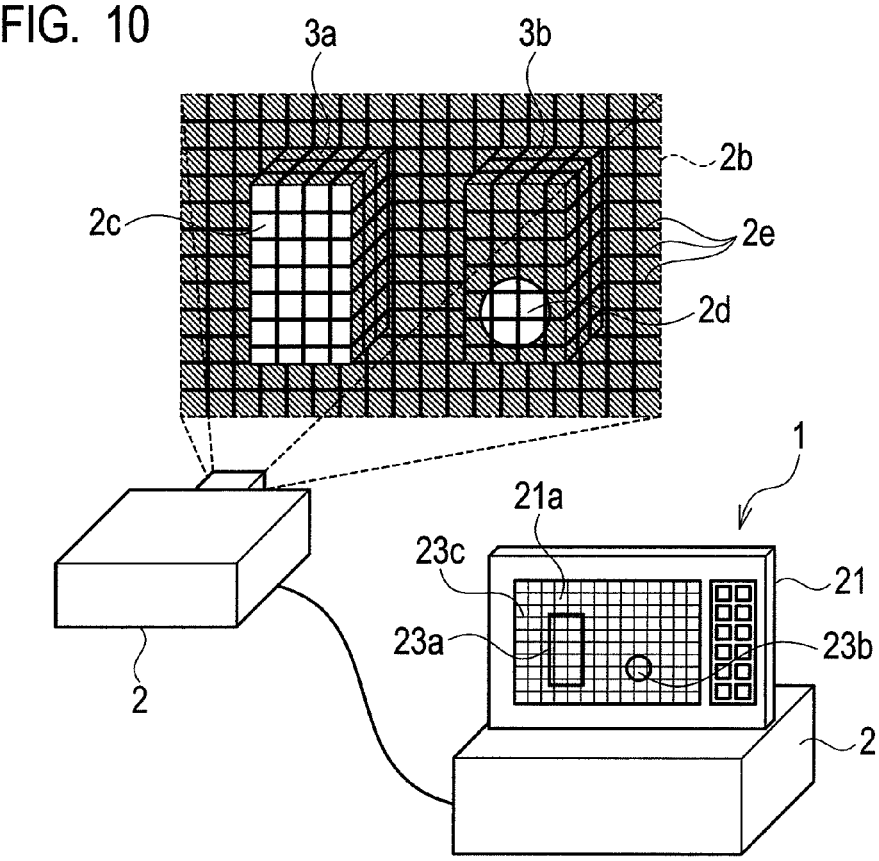
FIG. 10 is a perspective view showing a specific operation state of the lighting system shown as the fourth embodiment of the present invention.

As shown in FIG. 10, the lighting control apparatus 1 as described above displays a reference image 23c on a liquid crystal panel 21a as the monitor device 21, and then can also display outline images 23a and 23b as operation results of a pen 21b. Moreover, onto an inside of the projection-enabled range 2b by the projector 2, the lighting control apparatus 1 can project a reference image 2e corresponding to the reference image 23c, and further, can project the projection light 2a including the projection ranges 2c and 2d corresponding to the outline images 23a and 23b.

Figure 11:
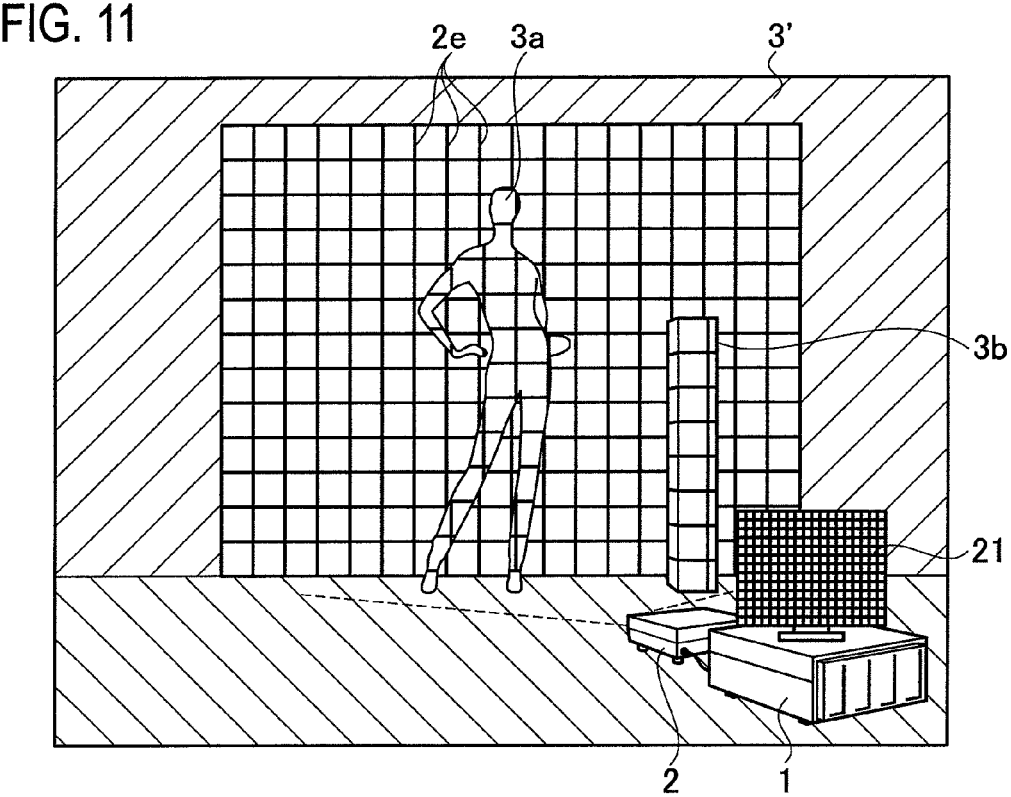
FIG. 11 is a perspective view showing a specific operation state of the lighting system shown as the fourth embodiment of the present invention.
Figure 12:
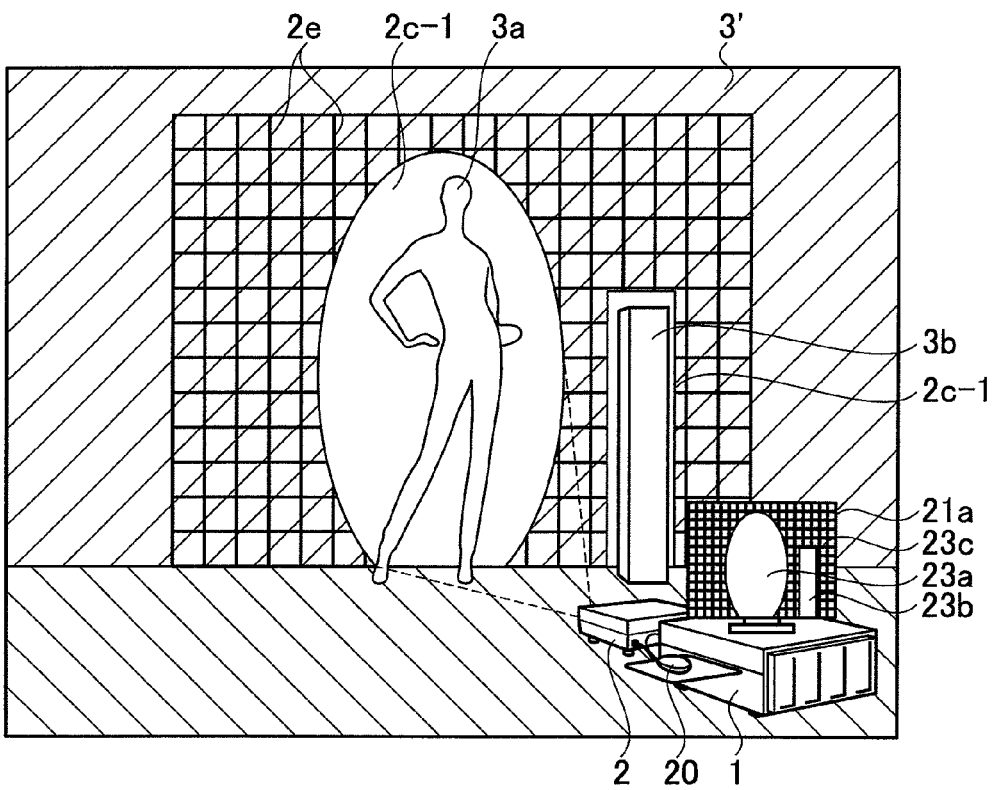
FIG. 12 is a perspective view showing a specific operation state of the lighting system shown as the fourth embodiment of the present invention.
Figure 13:
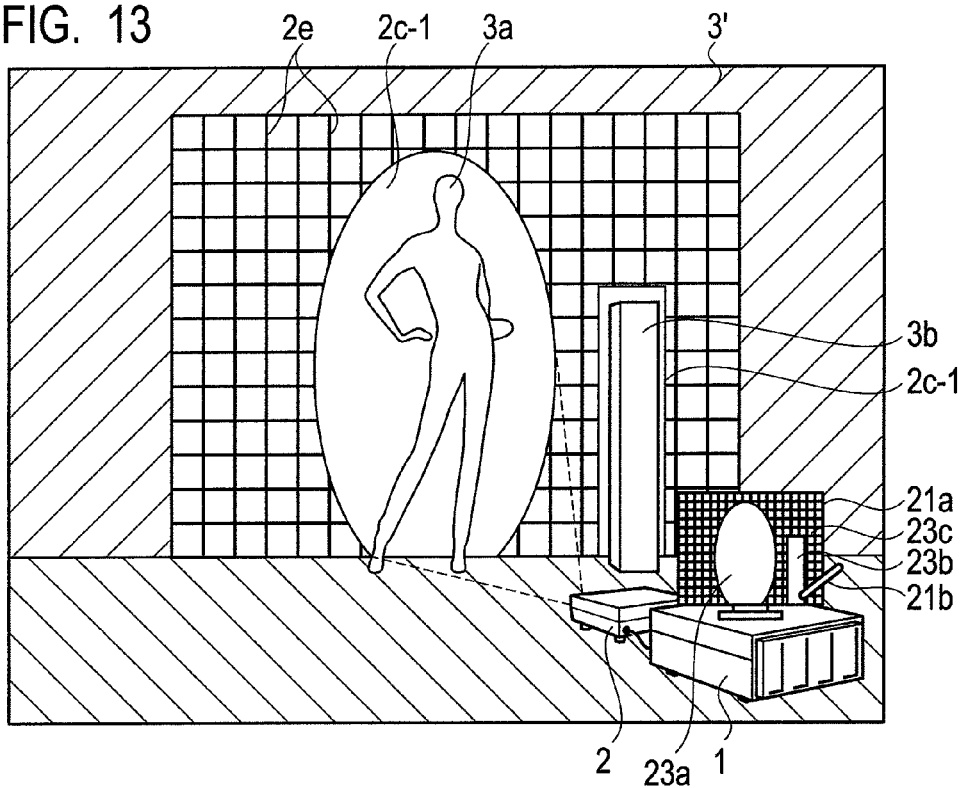
FIG. 13 is a perspective view showing a specific operation state of the lighting system shown as the fourth embodiment of the present invention.

More specifically, as shown in FIG. 11, the reference image 2e is first projected onto the projection target objects 3a and 3b and the wall surface 3'. In this state, as shown in FIG. 12, the reference image 23c is displayed on the liquid crystal panel 21a, and the outline images 23a and 23b are set by using the shape drawing/input unit 20. Then, the projection range parameter 12a is generated. In such a way, in the lighting control apparatus 1, by using the projection range parameter 12a, the projection light data correction unit 13 corrects the projection light data 11a, and performs the drawing processing for the projection light correction data 13a, whereby projection ranges 2c–1 in which the projection target objects 3a and 3b are lightened can be formed from the projector 2. Note that the shape drawing/input unit 20 is not limited to the mouse, and may be the pen 21b that touches the liquid crystal panel 21a as in FIG. 13.

The lighting system as described above can allow the liquid crystal panel 21a to perform such an operation of setting the projection range 2c while allowing the user to visually recognize a correspondence relationship between the reference image 23c displayed on the liquid crystal panel 21a and the reference image 2e projected by the projection light 2a. In such a way, the projection light 2a in which only the desired projection range 2c is emphasized among the projection-enabled range 2b can be projected more easily.

Specifically, in the above-mentioned lighting systems, the projection range 2c can be set by an intuitive operation like drawing a picture; however, the correspondence between the input position to the projection range setting unit 12 and the shape and position of the projection target object 3 is not presented, and accordingly, the projection range 2c must be designated in a manual exploratory state. As opposed to this, in accordance with this lighting system, the projection light 2a can be projected so as to include the reference image 2e in the projection-enabled range 2b including the projection target object 3, and the reference image 23c corresponding to the reference image 2e can be displayed on the liquid crystal panel 21a. In such a way, the user can recognize the reference image 2e on the projection target objects 3a and 3b, and can draw the outline images 23a and 23b in agreement with the reference image 23c on the liquid crystal panel 21a.

Fifth Embodiment

Next, a description is made of still another lighting system, to which the present invention is applied, with reference to FIG. 14 to FIG. 23. Note that the same reference numerals are assigned to similar portions to those of the above-mentioned lighting system, whereby a detailed description thereof is omitted.

This lighting system is different from the above-mentioned lighting systems in correcting distortion of the reference image 2e in the case of projecting the reference image 2e onto the projection-enabled range 2b onto which the projection light 2a is projected from the reference image projector 2B.

Figure 14:
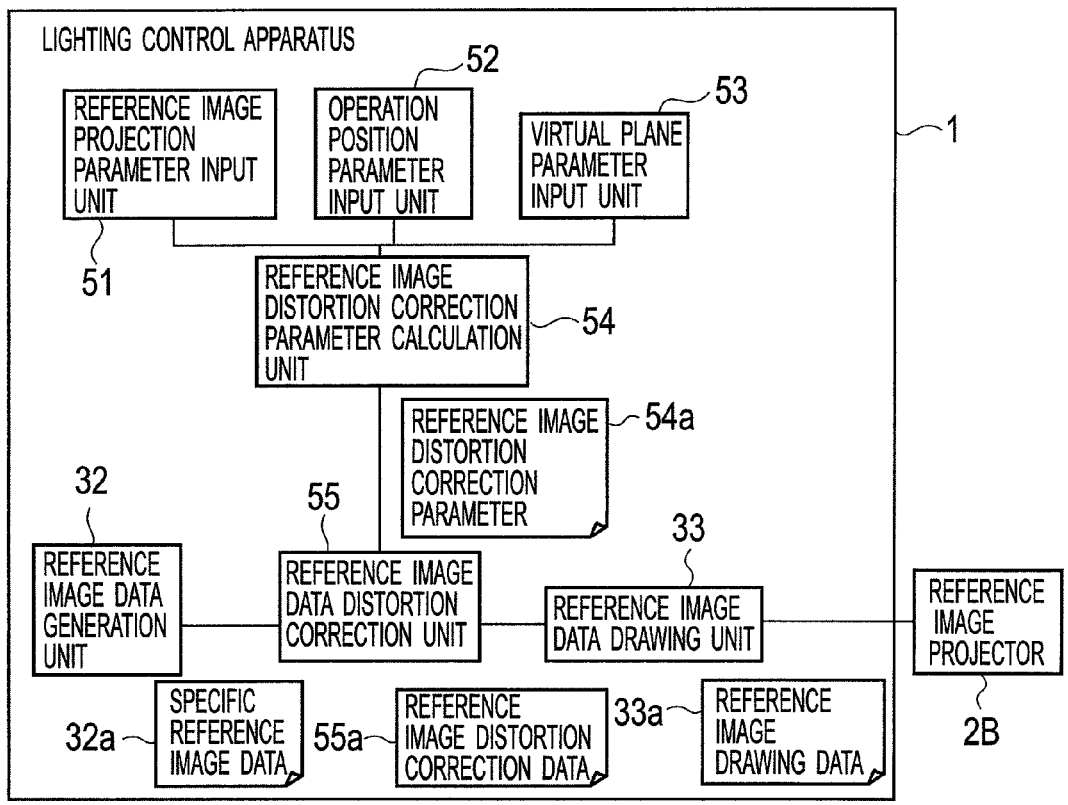
FIG. 14 is a block diagram showing a functional configuration of a lighting system shown as a fifth embodiment of the present invention.

As shown in FIG. 14, this lighting system includes: a reference image projection parameter input unit 51 as reference image projection parameter inputting means for inputting a parameter including a position, attitude and specifications (projection image angle, back focus, specified projection angle) of the reference image projector 2B that projects the reference image 2e; an operation position parameter input unit 52 as operation position parameter inputting means for inputting an operation position parameter indicating an operation position of the user who sets the projection range 2c by the projection range setting unit 12; a virtual plane parameter input unit 53 as virtual plane parameter inputting means for inputting a position, attitude and size of a planar region, which is virtually set on a projection region of the projected reference image 2e, in order to grasp a display state of the reference image 2e; and a reference image distortion-correction parameter calculation unit 54 and a reference image data distortion correction unit 55, which serve as reference image distortion correcting means for correcting, based on the parameter of the reference image projector 2B, the operation position parameter and the virtual plane parameter, the reference image data so as to distort the projection light 2a, which includes the reference image projected from the reference image projector 2B, in order to allow the reference image 2e to be observed free from distortion in the case where the user visually recognizes the reference image 2e.

The reference image projection parameter input unit 51, the operation position parameter input unit 52 and the virtual plane parameter input unit 53 input the parameters which affect the distortion of the reference image 2e. Specifically, these parameter input units are composed of: a keyboard operated by the user and an input interface that recognizes operations to the keyboard; mechanisms which read a recording medium in which a variety of parameters are stored; mechanisms which receive a variety of parameters transmitted from the outside; and the like.

The parameter for the reference image includes, as information affecting a distortion state of the reference image 2e, a position (coordinate information) and attitude (rotation angle information) of the projector 2 with respect to the projection target object 3 as a projection target of the projection light 2a. Moreover, this parameter includes the projection image angle, the back focus, the specified projection angle and the like as the specifications of the reference image projector 2B, which affect the distortion state of the reference image 2e. Note that the parameters of the reference image projector 2B may further include other detailed information as the specifications of the reference image projector 2B.

The operation position parameter indicates the operation position with respect to the projection target object 3 as the projection target of the projection light 2a. This operation position may be a position of the personal computer that composes the reference image control device 4 (lighting control apparatus 1), or may be an eye-point position of the user, which is assumed from the position of the personal computer.

The virtual plane parameter is a parameter for specifying a virtual plane onto which the projection light 2a is projected, and is information of a coordinate group that composes the virtual plane. This virtual plane parameter becomes such information that sets the virtual plane at an installed position of the projection target object 3a, for example, in a usage scene where the projection range 2c is set with respect to the projection target object 3.

The reference image distortion correction parameter calculation unit 54 calculates and outputs a reference image distortion correction parameter 54a from the parameter for the reference image, the operation position parameter and the virtual plane parameter. The distortion occurs on the reference image 2e owing to the position, attitude and specifications of the reference image projector 2B, the operation position, and the position of the virtual plane. However, this reference image distortion correction parameter 54a gives distortion to the reference image data 32a, and thereby can allow the reference image 2e to be visually recognized on the virtual plane free from the distortion. Specifically, the reference image distortion correction parameter 54a indicates a correspondence relationship (correspondence map) between coordinate information of the reference image data 32a as a two-dimensional rectangular image and coordinate information of the corrected reference image data 32a from which the distortion is eliminated, the distortion occurring owing to the actual position, attitude and specifications of the reference image projector 2B, the operation position, and the position of the virtual plane.

The reference image data distortion correction unit 55 performs coordinate conversion processing (texture mapping), which uses the distortion correction parameter 54a supplied from the reference image distortion correction parameter calculation unit 54, for the reference image data 32a supplied from the reference image data generation unit 32. In such a way, the reference image data 32a calculates such reference image distortion correction data 55a that allows the reference image 2e to look like free from the distortion from the user at the time when the reference image 2e is projected by the reference image projector 2B, and then supplies the calculated reference image distortion correction data 55a to the reference image data drawing unit 33.

In the case where the reference image control device 4 as described above does not perform the distortion correction, then as shown in FIG. 15, when the reference image 2e is projected onto the virtual plane, the reference image 2e is projected while being distorted owing to the position, attitude and specifications of the reference image projector 2B, and to the operation position. As opposed to this, the reference image control device 4 generates the reference image distortion correction parameter 54a based on the position, attitude and specifications of the reference image projector 2B, the operation position, and the position of the virtual plane, which cause the distortion of the reference image 2e, and then implements the coordinate conversion as distortion correction processing for the reference image data 32a.

Figure 17:
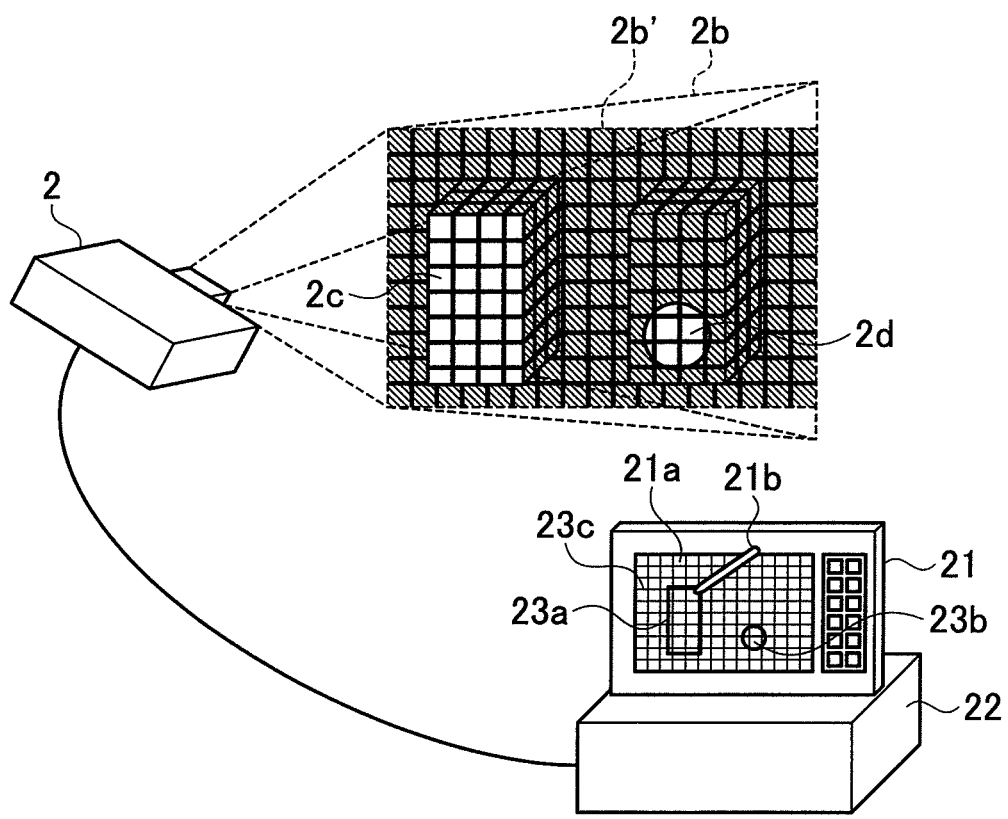
FIG. 17 is a view showing a state where a projection range is formed in the corrected projection range in the lighting system shown as the fifth embodiment of the present invention.

In such a way, as shown in FIG. 16, on a virtual plane 2f, the reference image control device 4 can correct the projection-enabled range 2b for the reference image 2e so that the projection-enabled range 2b can become a new projection-enabled range 2b' for which the distortion correction is done. Hence, in accordance with this lighting system, as shown in FIG. 17, the reference image 23c displayed on the liquid crystal panel 21a and the reference image 2e on the virtual plane 2f can be associated with each other.

Hence, in accordance with this lighting system, even in the case of changing the operation position (observation position) of the user, the placed position of the projection-enabled range 2b, and the projection position of the projection light 2a, the projection ranges 2c and 2d can be set simply by projecting the reference image 2e, which is free from the distortion, onto the projection position concerned.

(Correction Processing for Projection Data)

Here, a description is made of distortion correction processing for light in this lighting system. Note that, in the following, the description is made of processing for allowing the reference image 2e projected onto a projection surface having an arbitrary shape to look free from the distortion by correcting the reference image data 32a by using the reference image distortion correction parameter 54a.

Figure 18:
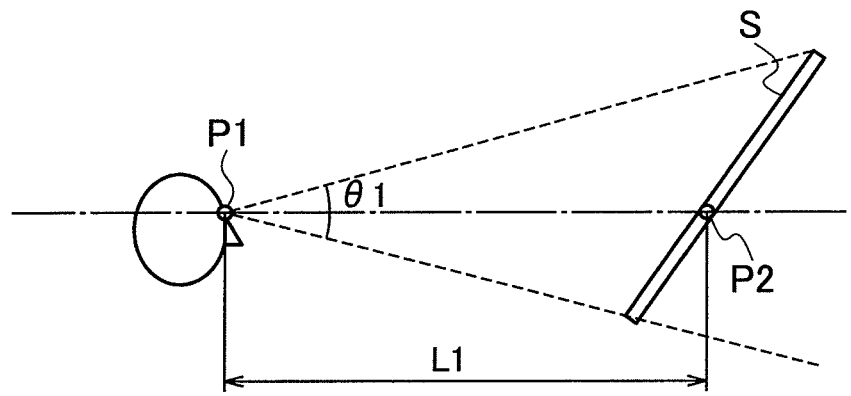
FIG. 18 is a view showing an eye-point position, viewing angle and distance of a user with respect to a flat object as a projection target in the lighting system shown as the fifth embodiment of the present invention.
Figure 19:
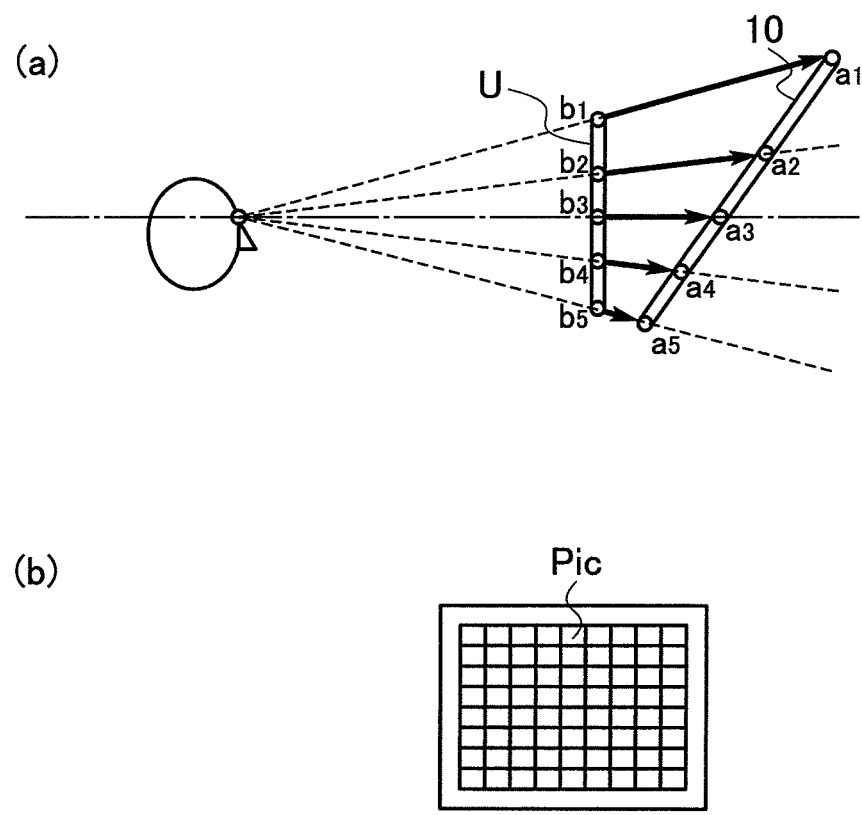
FIGS. 19(a) and 19(b) are views explaining a video visually recognized by the user when the flat object as the projection target is viewed from the user in the lighting system shown as the fifth embodiment of the present invention.

For example as shown in FIG. 18, as an irradiation target object S having the arbitrary shape, a flat object S is considered, which is spaced apart from the user by a distance L, and is arranged so as to be inclined obliquely with respect to the user. This flat object S is visually recognized from an eye-point position P1 of the user at a viewing angle θ1. The user and a point P2 on the flat object S, which intersects a center of a viewing field of the user, are spaced apart from each other by a distance L1.

In a positional relationship between the eye-point position P1 and the point P2 on the flat object S, there is considered the case of viewing a grid-like two-dimensional image Pic (coating light) shown in FIG. 19(b) on the flat object S through a video surface U viewed from the user as shown in FIG. 19(a). In this case, in the case of displaying, on the flat object S, the same video as a video in which the two-dimensional video Pic shown in FIG. 19(b) is displayed on the video surface U, it is necessary to acquire a correspondence relationship between each coordinate on the video surface U and each coordinate on the flat object S. Schematically shown in FIG. 19(a), points b1, b2, b3, b4 and b5 on the video surface U correspond to points a1, a2, a3, a4 and a5 on the flat object S. Hence, videos displayed on the points a1, a2, a3, a4 and a5 on the flat object S are visually recognized as the points b1, b2, b3, b4 and b5 on the video surface U from the user.

Figure 20:
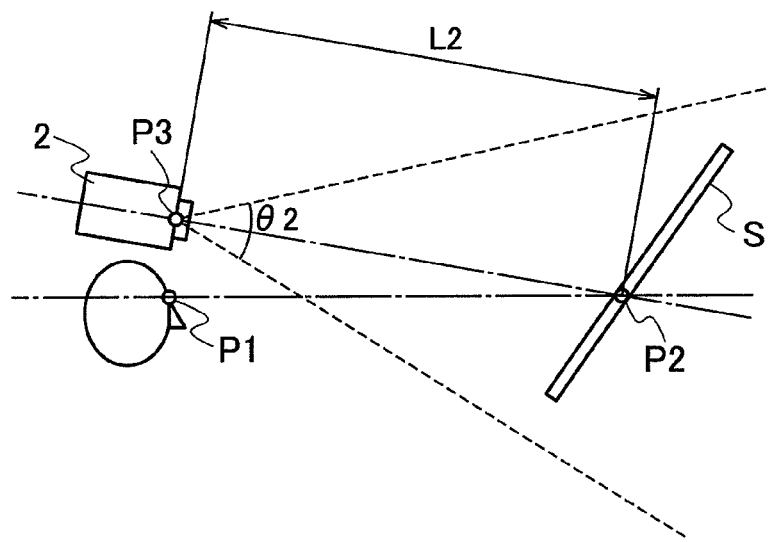
FIG. 20 is a view showing a projection position, projection image angle and distance of an irradiation light projection unit with respect to the flat object as the irradiation target in the lighting system shown as the fifth embodiment of the present invention.

Moreover, as shown in FIG. 20, the point P2 where a line of sight of the user and the flat object S intersect each other and a projection position P3 of the projector 2 are spaced from each other by a distance L2. Moreover, the projector 2 projects the projection light within a range of a predetermined projection angle of view θ2.

Figure 21:
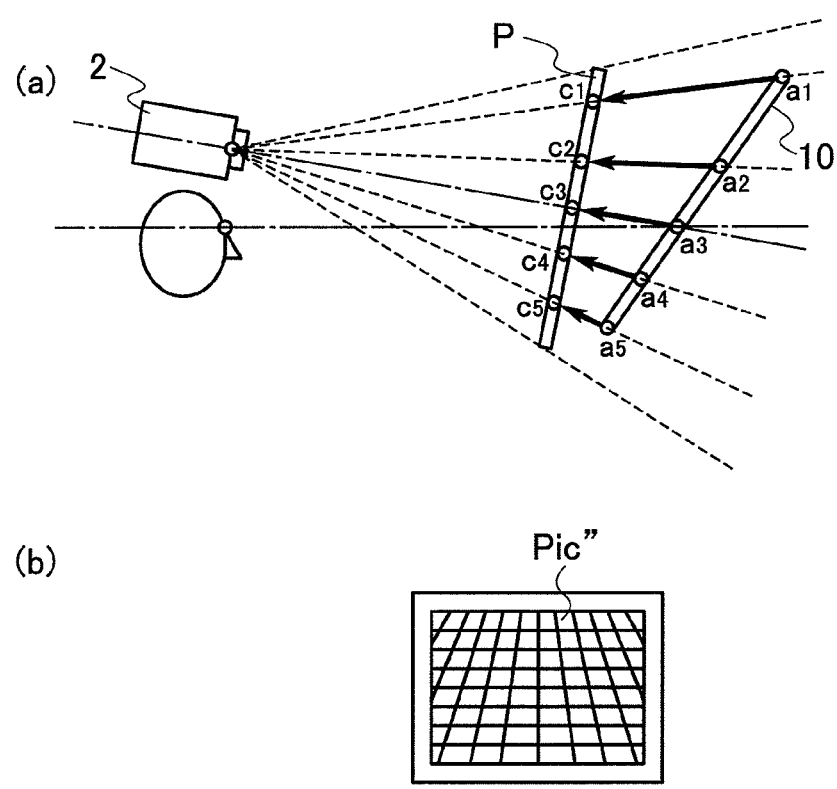
FIGS. 21(a) and 21(b) are views explaining a state of projecting light onto the flat object as the irradiation target in the lighting system shown as the fifth embodiment of the present invention.
Figure 22:
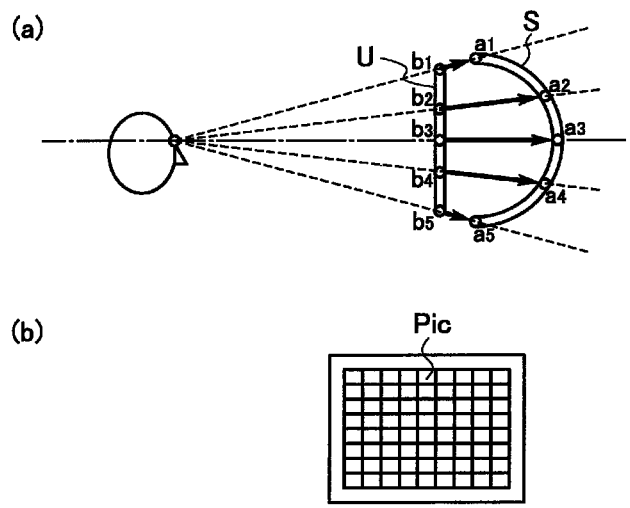
FIGS. 22(a) and 22(b) are views explaining a video visually recognized by the user when a dome-like object as the irradiation target is viewed from the user in the lighting system shown as the fifth embodiment of the present invention.
Figure 23:
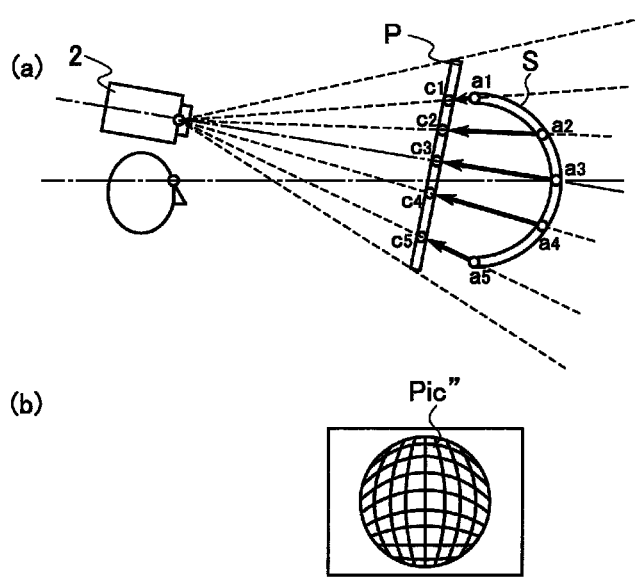
FIGS. 23(a) and 23(b) are views explaining a state of projecting the light onto the dome-like object as the irradiation target from the irradiation light projection unit in the lighting system shown as the fifth embodiment of the present invention.

In this case, with regard to a positional relationship between a video surface P of the projector 2 and the flat object S, as shown in FIG. 21, the points a1, a2, a3, a4 and a5 on the flat object S correspond to points c1, c2, c3, c4 and c5 on the video surface P. In other words, points on straight lines extended from the projection position P3 of the projector 2 through the points c1, c2, c3, c4 and c5 on the video surface P become the points a1, a2, a3, a4 and a5 on the flat object S.

The eye-point position P1 and viewing angle θ1 of the user, the position of the flat object S, and the projection position P3 and projection angle of view θ2 of the projector 2 have the relationships thereamong as described above. Accordingly, when videos are projected onto the points c1, c2, c3, c4 and c5 on the video surface P in the projector 2, which is shown in FIG. 21(a), the videos are projected onto the points a1, a2, a3, a4 and a5 on the flat object S. As a result, the points a1, a2, a3, a4 and a5 on the flat object S are visually recognized as the points b1, b2, b3, b4 and b5 on the video surface U in FIG. 19. Hence, in order to allow the user to visually recognize the two-dimensional video Pic, it is necessary for the projector 2 to project a two-dimensional video Pic", which is distorted as shown in FIG. 21(b), based on a correspondence relationship between each coordinate on the flat object S, which corresponds to each coordinate on the video surface U, and each coordinate on the flat object S, which corresponds to each coordinate on the video surface P.

In order to realize a projection operation of the projection light, which is as described above, as shown in FIG. 18, the lighting system acquires an eye-point position/attitude parameter that indicates an eye-point position indicating the eye-point position P1 of the user and indicates a line-of-sight direction of the user, and acquires a viewing angle parameter that indicates the viewing angle θ1 of the user. These parameters of the user determine the above-mentioned video surface U.

Moreover, the lighting system acquires shape data of the flat object S onto which the projection light emitted from the projector 2 is projected. This shape data is, for example, CAD data. Here, the eye-point position/attitude parameter is the one in which positions on X-, Y- and Z-axes and rotation angles about the axes in a three-dimensional coordinate space are numerically defined. This eye-point position/attitude parameter uniquely determines the distance L1 between the eye-point position P1 and the flat object S, and the attitude of the flat object S with respect to the eye-point position P1. Moreover, the shape data of the flat object S is the one in which a shape region in the three-dimensional coordinate space is defined based on electronic data generated by CAD and the like. This shape data uniquely determines the shape of the flat object S viewed from the eye-point position P1. The shape data of the flat object S, which is as described above, and the parameters of the user determine the correspondence relationship between the coordinate of the video surface U and the coordinate of the flat object S.

Furthermore, for the fact that the projector 2 is installed as shown in FIG. 20, the lighting system acquires a position/attitude parameter that indicates the projection position P3 of the projector 2 and an optical axis direction of the projector 2 concerned, and acquires a projection angle-of-view parameter that indicates the projection angle of view θ2 of the projector 2. These position/attitude parameter and projection angle-of-view parameter of the projector 2 indicate the video surface P projected onto the flat object S by the projector 2. When this video surface P is determined, it is determined onto which coordinate of the flat object S the projection light projected from the projector 2 is projected through the video surface P. In other words, the position/attitude parameter and projection angle-of-view parameter of the projector 2 and the position/attitude parameter and shape data of the flat object S uniquely determine the range of the flat object S covered with the projection light emitted from the projector 2. In the case where the projector 2 is a projector, the projection position P3 is defined by a back focus and specified projection angle thereof, and the projection angle of view θ2 is calculated from a horizontal and vertical projection range located apart from the projection position P3 by a fixed distance.

Then, the lighting system arranges pixels on intersections (c1, c2, c3, c4, c5) between the video surface P and the straight lines which connect the pixels (a1, a2, a3, a4, a5) of the projection light displayed on the flat object S and the projection position P3 of the projector 2 to each other, thereby composes the two-dimensional video Pic", and projects the two-dimensional video Pic" onto the flat object S. Then, the user can be allowed to visually recognize the video free from the distortion through such a route of the points c1, c2, c3, c4 and c5 on the video surface P, the points a1, a2, a3, a4 and a5 on the flat object S, and the points b1, b2, b3, b4 and b5 on the video surface U.

In a similar way, even if the projection target object 3 does not have such a shape of the flat object S but has an arbitrary shape such as a dome shape, the projection light is projected thereonto free from the distortion, whereby the user can be allowed to visually recognize the projection target object 3 concerned. The case is considered, where the projection target object 3 is the dome-like object S as shown in FIG. 22(a), and the user is allowed to visually recognize grid-like projection light as shown in FIG. 22(b). In this case, from the user, visually recognized are points a1, a2, a3, a4 and a5 on the dome-like object S, which are located on extensions of the points b1, b2, b3, b4 and b5 on the video surface U. While the points a1, a2, a3, a4 and a5 are visually recognized as described above, the projector 2 projects the projection light onto the video surface P as shown in FIG. 23(a). The projection light that has passed through the points c1, c2, c3, c4 and c5 on the video surface P is projected onto the points a1, a2, a3, a4 and a5 on the dome-like object S, and is visually recognized as the points b1, b2, b3, b4 and b5 on the video surface U shown in FIG. 22(a). Hence, the projector 2 projects a two-dimensional video Pic", which is distorted as shown in FIG. 23(b), onto the video surface P. While the projector 2 projects the two-dimensional video Pic" as described above, the user can visually recognize a two-dimensional video Pic without the distortion as shown in FIG. 22(b).

Sixth Embodiment

Next, a description is made of a lighting system shown as a sixth embodiment, to which the present invention is applied, with reference to FIG. 24 to FIG. 27. Note that the same reference numerals are assigned to similar portions to those of the above-mentioned lighting systems, whereby a detailed description thereof is omitted.

Figure 24:
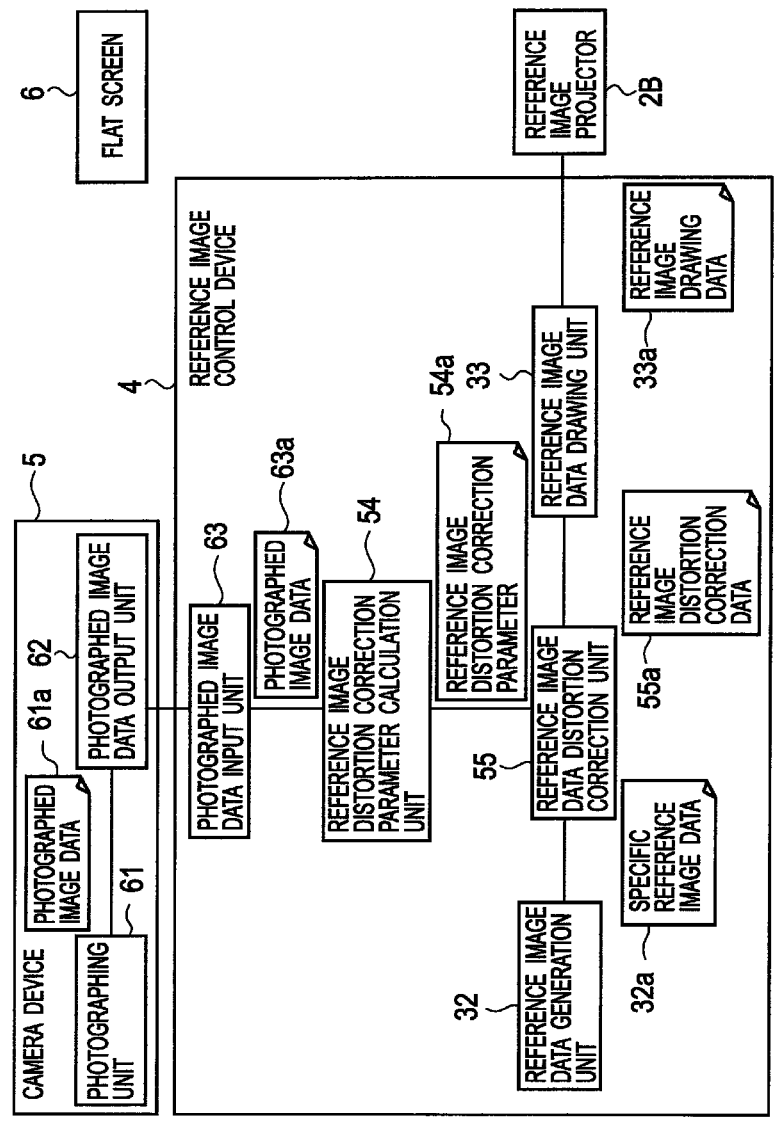
FIG. 24 is a block diagram showing a functional configuration of a lighting system shown as a sixth embodiment of the present invention.

As shown in FIG. 24, this lighting system includes: a flat screen 6 onto which the reference image 2e is projected by the reference image projector 2B; a camera device 5 as photographing means for photographing the reference image 2e projected onto the flat screen 6; and a reference image distortion correction parameter calculation unit 54 and a reference image data distortion correction unit 55, which serve as reference image distortion correcting means for distorting the reference image, which is projected from the reference image projector 2B, so as to make coincidence between the reference image 2e projected onto the flat screen 6, which is acquired by photographic data generated by the camera device 5, and the reference image generated by the reference image data generation unit 32.

Figure 25:
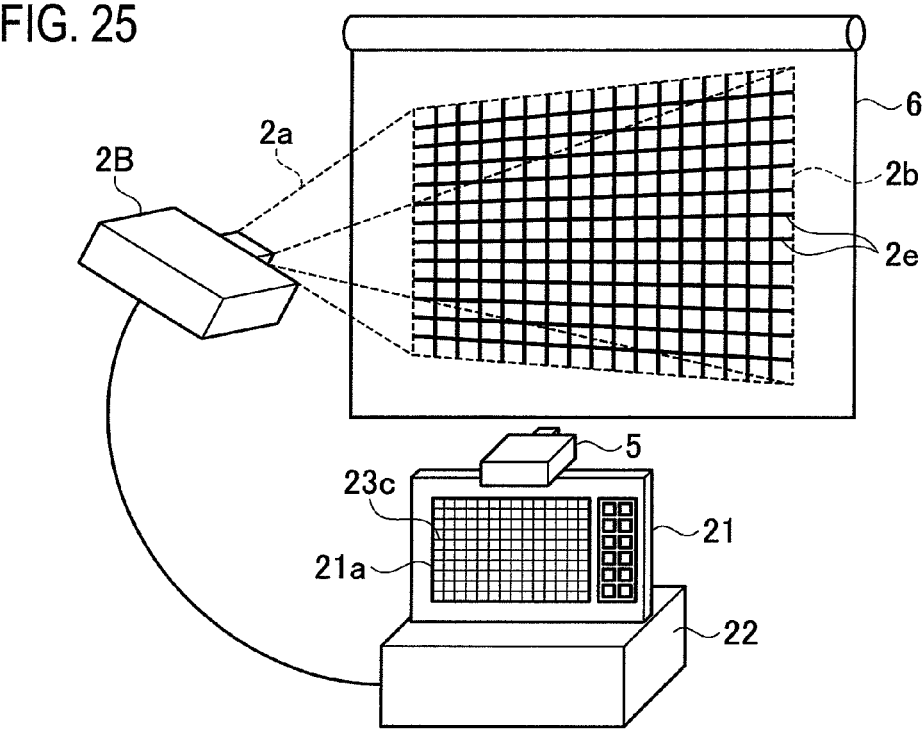
FIG. 25 is a view explaining distortion correction using a flat screen in the lighting system shown as the sixth embodiment of the present invention.

In the lighting system as described above, in the event where the user sets the projection range 2c, the flat screen 6 is installed as shown in FIG. 25. An installed position of this flat screen 6 is set at an installation-scheduled position of the projection target object 3 serving as the projection target of the projection light 2a. Note that, desirably, this flat screen 6 is of a retract mode in consideration of portability.

The camera device 5 includes: a photographing unit 61 composed of a photographing device such as a CCD, optical components, and the like; and a photographed image data output unit 62 that outputs photographed image data 61a, which is photographed by the photographing unit 61, to the reference image control device 4. It is desirable that this camera device 5 be installed in the vicinity of the operation position of the user, and in an example shown in FIG. 25 and the like, the camera device 5 is installed on the monitor device 21. It is not necessary to particularly limit the place where this camera device 5 is installed, and this place may be arbitrarily set as long as the reference image distortion correction parameter can be generated so that the reference image 2e viewed from the user can be projected free from the distortion.

Moreover, the reference image control device 4 includes a photographed image data input unit 63 that inputs the photographed image data 61a outputted from the photographed image data output unit 62. In this reference image control device 4, the reference image distortion correction parameter 54 calculates the reference image distortion correction parameter 54a for the distortion correction of the reference image 2e by using photographed image data 63a outputted from the photographed image data input unit 63. At this time, the reference image distortion correction parameter 54 generates the reference image distortion correction parameter 54a so that the reference image 2e, which is projected onto the flat screen 6 and is acquired by the photographed image data 61a generated by the camera device 5, can be allowed to coincide with the projection-enabled range 2b' having a predetermined shape. In other words, the reference image distortion correction parameter calculation unit 54 allows the distorted reference image 2e displayed on the flat screen 6 to coincide with the reference image generated by the reference image data generation unit 32. In such a way, the reference image distortion correction parameter calculation unit 54 turns the reference image 2e displayed on the flat screen 6 into a non-distortion state similar to that in the reference image 23c displayed on the liquid crystal panel 21a.

Then, the reference image control device 4 performs the coordinate conversion as the distortion correction processing for the reference image data 32a by using the reference image distortion correction parameter 54a, and supplies the reference image distortion correction data 55a to the reference image data drawing unit 33. The projection light in which the distortion is corrected is projected from the reference image projector 2B onto the flat screen 6 in accordance with the reference image drawing data 33a, whereby the reference image 23c displayed on the liquid crystal panel 21a and the reference image 2e displayed on the flat screen 6 can be allowed to coincide with each other in a visual sense of the user who recognizes the reference images.

Specifically, as shown in FIG. 25, first, the reference image 2e is projected from the reference image projector 2B onto the flat screen 6 by using the reference image data 32a that is not still subjected to the distortion correction processing. At this time, when the reference image 2e is distorted to a shape of a trapezoid, the reference image 2e having such distortion is photographed by the camera device 5, and the photographed image data 61a is supplied to the reference image distortion correction parameter calculation unit 54.

Figure 26:
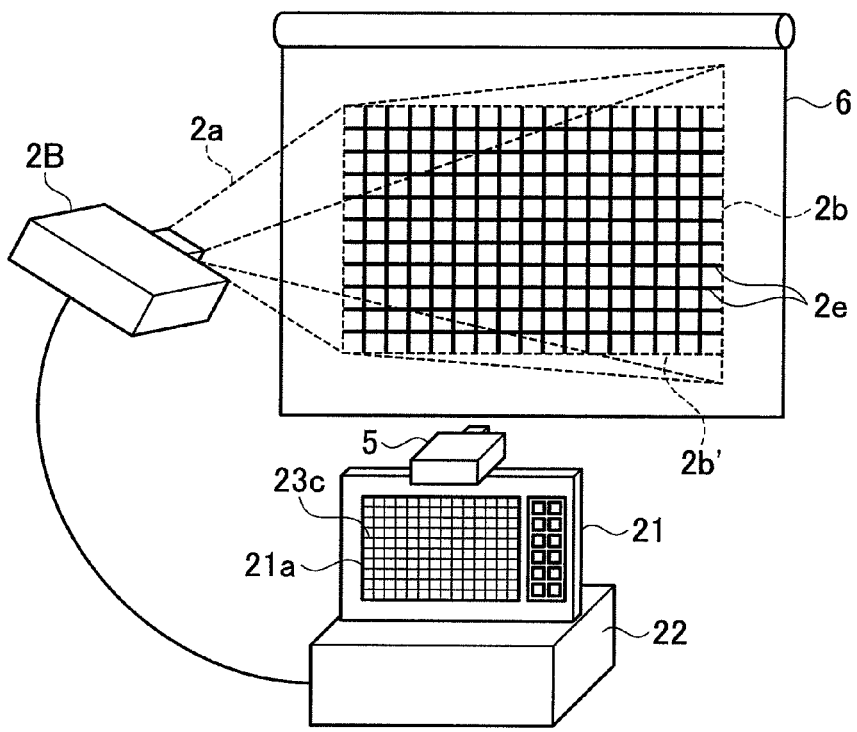
FIG. 26 is a view showing a state where the distortion of the video on the flat screen is corrected in the lighting system shown as the sixth embodiment of the present invention.
Figure 27:
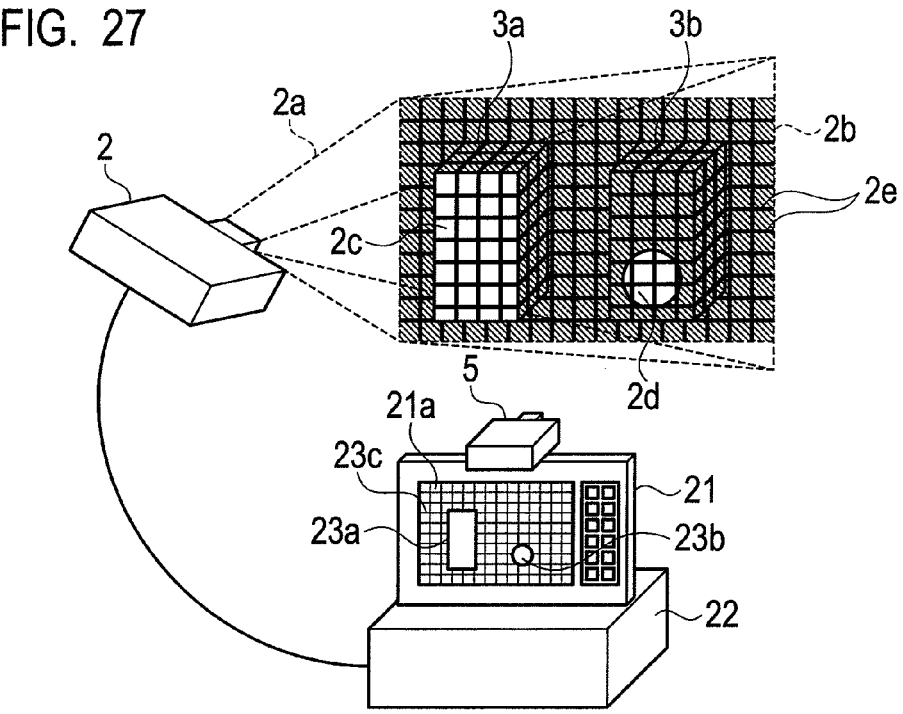
FIG. 27 is a view showing a state where the projection light is projected while excluding the flat screen in the lighting system shown as the sixth embodiment of the present invention.

For this supply, as shown in FIG. 26, this lighting system can revise the projection-enabled range 2b for the reference image 2e on the flat screen 6, which is photographed by the camera device 5, into the new projection-enabled range 2b' for which the distortion correction is done. Hence, in accordance with this lighting system, as shown in FIG. 27, the reference image 23c displayed on the liquid crystal panel 21a and the reference image 2e projected from the reference image projector 2B can be associated with each other.

Hence, in accordance with this lighting system, even in the case of changing the operation position (observation position) of the user, the placed position of the projection-enabled range 2b, and the projection position of the projection light 2a, the projection ranges 2c and 2d can be set simply by projecting the reference image 2e, which is free from the distortion, onto the projection position concerned.

In accordance with the lighting system as described above, before setting the projection ranges 2c and 2d, the flat screen 6 is installed at the installed position of the projection target objects 3a, 3b and the like, and the distortion of the reference image 2e is automatically corrected, and then the projection ranges 2c and 2d can be set by projecting the reference image 2e, whereby the setting of the projection ranges 2c and 2d can be performed more simply.

Moreover, in accordance with this lighting system, in the case where there is distortion on the reference image 2e photographed by the camera device 5, the reference image data 32a can be automatically corrected so as to eliminate the distortion. In such a way, it is possible to omit calibration that must be performed due to an error between the input of the variety of parameters and arrangement accuracy of the reference image projector 2B and the like (that is, a difference between the actual arrangement positions and the input parameters).

Seventh Embodiment

Figure 28:
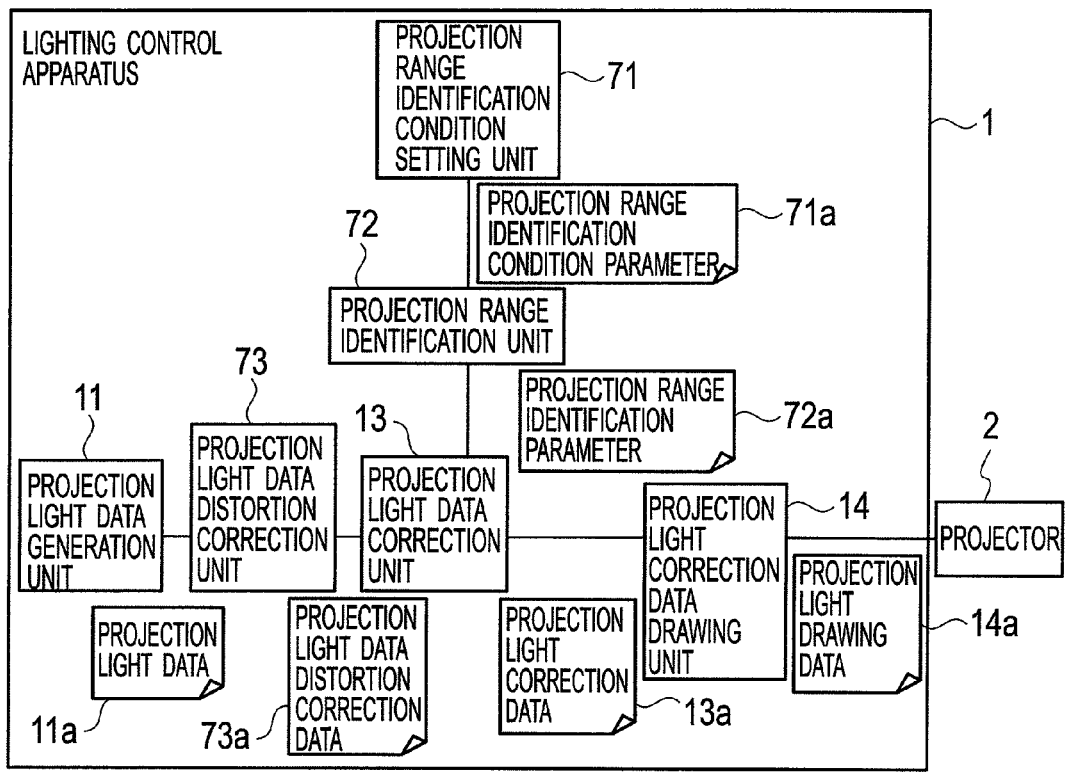
FIG. 28 is a block diagram showing a functional configuration of a lighting system shown as a seventh embodiment of the present invention.
Figure 29:
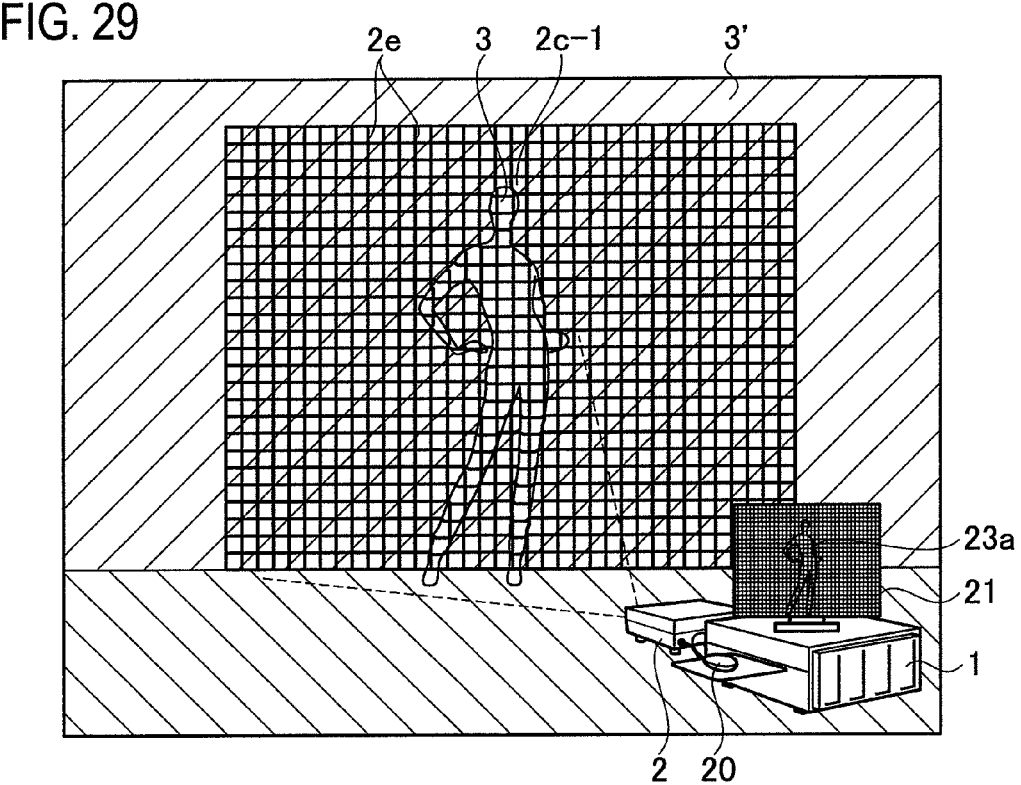
FIG. 29 is a perspective view showing a specific operation state of the lighting system shown as the seventh embodiment of the present invention.
Figure 30:
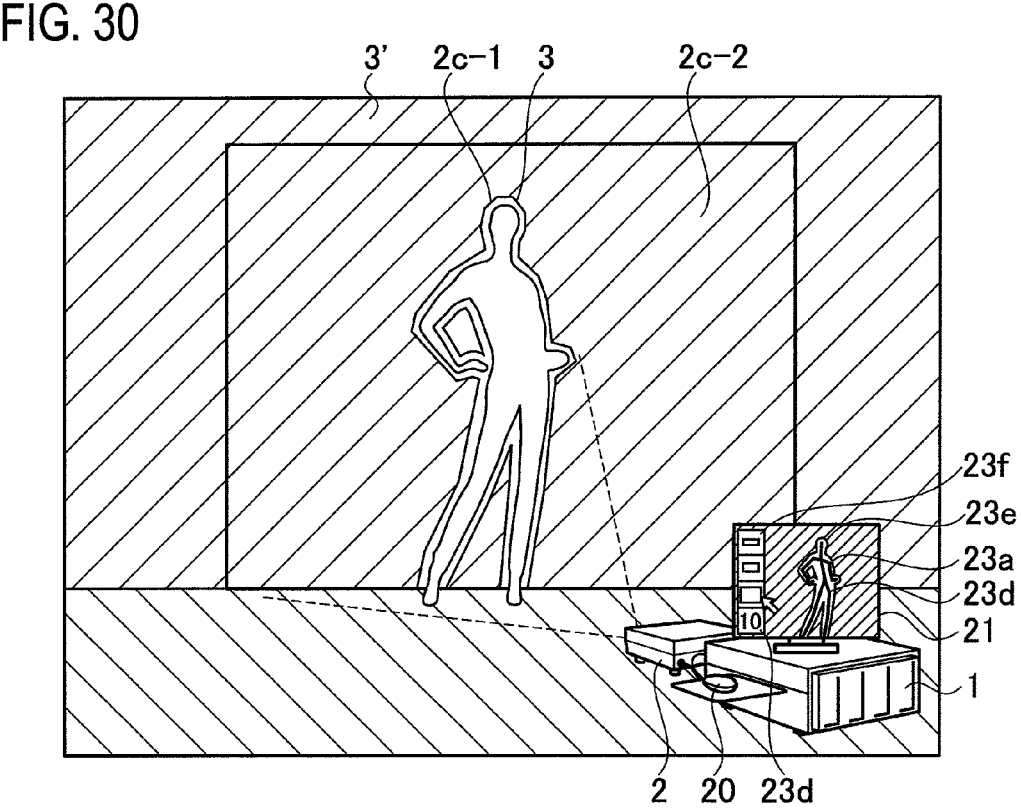
FIG. 30 is a perspective view showing a specific operation state of the lighting system shown as the seventh embodiment of the present invention.

Next, a description is made of a lighting system shown as a seventh embodiment, to which the present invention is applied, with reference to FIG. 28 to FIG. 30. Note that the same reference numerals are assigned to similar portions to those of the above-mentioned lighting systems, whereby a detailed description thereof is omitted.

As shown in FIG. 28, a lighting control apparatus 1 in this lighting system includes: a projection range identification condition setting unit 71 that receives conditions for specifying the projection range 2c; and a projection range identification unit 72 that identifies the projection range 2c in accordance with the conditions received by the projection range identification condition setting unit 71. This lighting control apparatus 1 corrects the projection light data so that the projection light data can correspond to the projection range 2c identified by the projection range identification unit 72, and projects the light from the projector 2. This lighting control apparatus 1 automatically sets the projection range 2c without using the camera device 5 mentioned above.

As shown in FIG. 29, this lighting system divides the projection-enabled range 2b of the projector 2 into squares of a matrix, which have an arbitrary size, designates the respective squares, and thereby sets the projection range 2c. In this example of FIG. 29, in the lighting control apparatus 1, the projection range identification condition setting unit 71 is composed of a mouse similar to the shape drawing/input unit 20, displays the squares on the monitor device 21, and designates the respective squares by a mouse operation. In such a way, the projection range 2c can be set on the projection target object 3 or the space, which corresponds to the squares designated by the mouse. Note that, in the example of FIG. 29, only the squares before the light is projected thereonto are shown.

Moreover, as another example, as shown in FIG. 30, a configuration may be adopted, in which an operation of drawing a skeleton line 23d on the monitor device 21 is performed, thus making it possible to set, as a projection range 23e, a range of a predetermined width from the skeleton line 23d. Here, setting icons 23f are displayed on the monitor device 21, and in response to the mouse operation, there are designated an end point, eye-point and thickness of the skeleton line 23d, a width of the projection range 2c for the skeleton line 23d, and characteristics of the projection light, whereby the projection range 2c can be set on the projection target object 3.

Information in which the projection range 2c is designated by the squares or a predetermined range having the skeleton line taken as a center thereof is supplied as a projection range identification condition parameter 71a to the projection range identification unit 72 by the projection range identification condition setting unit 71. The projection range identification unit 72 identifies a correspondence relationship between positions in the projection-enabled range 2b and a pair of the squares and the predetermined range having the skeleton line taken as the center, which are designated as the projection range 2c, by using the projection range identification condition parameter 71a. In such a way, the lighting system recognizes the actual projection range 2c, generates a projection range identification parameter 72a, and supplies the projection range identification parameter 72a to the projection light data correction unit 13. In a similar way to the projection range parameter 12a, this projection range identification unit 72 is data indicating the projection range 2c, onto which the light is projected, or the non-projection range by the coordinates on the projection-enabled range 2b of the projector 2. In such a way, the projection light data correction unit 13 can correct the projection light data 11a by using the projection range identification parameter 72a, and can correct the projection light correction data 13a.

In accordance with the lighting system as described above, even if the projection target object 3 is not photographed by the camera device 5, the projection range 2c can be set simply by designating the projection range 2c by using the projection range identification condition setting unit 71.

Eighth Embodiment

Next, a description is made of a lighting system shown as an eighth embodiment, to which the present invention is applied, with reference to FIG. 31 to FIG. 35. Note that the same reference numerals are assigned to similar portions to those of the above-mentioned lighting system, whereby a detailed description thereof is omitted.

Figure 31:
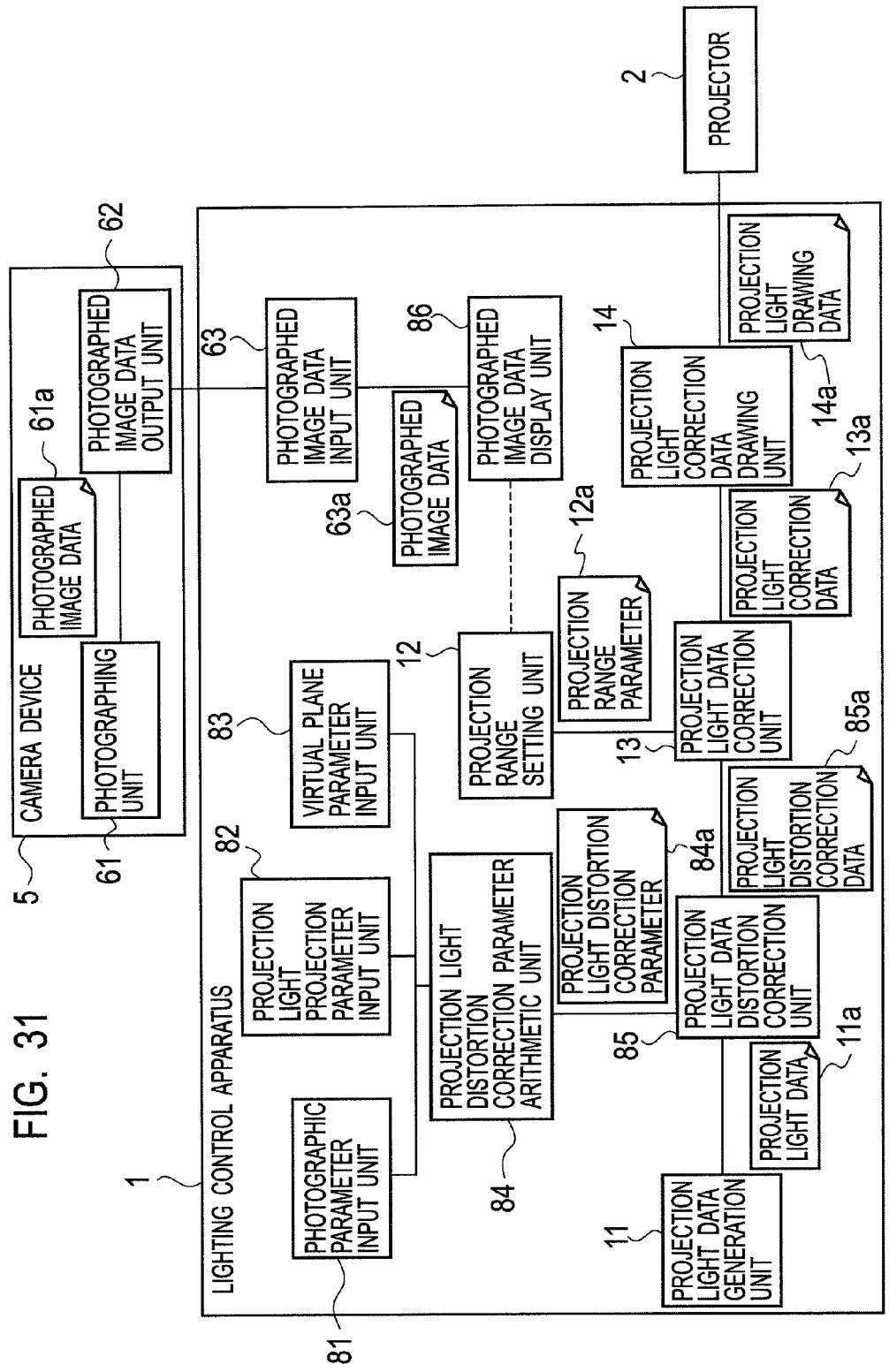
FIG. 31 is a block diagram showing a functional configuration of a lighting system shown as an eighth embodiment of the present invention.

As shown in FIG. 31, this lighting system outputs the photographed image data 61a, which is generated by the camera device 5, to the photographed image data input unit 63 of the lighting control apparatus 1, and performs display, which uses the photographed image data 61a, by a photographed image data display unit 86. Note that this photographed image data display unit 86 is a liquid crystal display that also serves as the liquid crystal panel 21a.

Moreover, this lighting system includes: a photographic parameter input unit 81 as photographic parameter inputting means for inputting a photographic parameter including a position, attitude and specifications of the camera device 5; a projection light projection parameter input unit 82 as projection light projection parameter inputting means for inputting the position, attitude and specifications of the projector 2; a virtual plane parameter input unit 83 as virtual plane parameter inputting means for inputting a virtual plane parameter including the position, attitude and size of the virtually set planar region in order to grasp the state of the projection range 2c of the projector 2; and a projection light distortion correction parameter arithmetic unit 84 and a projection light data distortion correction unit 85, which serve as projection light data correcting means for correcting, based on the photographic parameter, the projection light projection parameter and the virtual plane parameter, the projection light data 11a so as to allow the projection light to coincide with a photographic range of the camera device 5 on the virtual plane.

The photographic parameter input unit 81, the projection light projection parameter input unit 82 and the virtual plane parameter input unit 83 input the parameters which affect the distortion of the projection range 2c projected from the projector 2. Specifically, these parameter input units are composed of: the keyboard operated by the user and the input interface that recognizes the operations to the keyboard; the mechanisms which read the recording medium in which the variety of parameters are stored; the mechanisms which receive the variety of parameters transmitted from the outside; and the like.

The photographic parameter includes a position, attitude and specifications (camera image angle and the like) of the camera device 5 as information affecting the distortion state of the projection range 2c. Note that the photographic parameter may further include other detailed information.

The projection light projection parameter includes, as the information affecting the distortion state of the projection range 2c, the position (coordinate information) and attitude (rotation angle information) of the projector 2 with respect to the projection target object 3 as the projection target of the projection light 2a. Moreover, this projection light projection parameter includes the projection image angle, the back focus, the specified projection angle and the like as the specifications of the projector 2, which affect the distortion state of the projection range 2c. Note that the projection light projection parameter may further include other detailed information as the specifications of the projector 2.

The virtual plane parameter is the parameter for specifying the virtual plane onto which the projection light 2a is projected, and is the information of the coordinate group that composes the virtual plane. This virtual plane parameter becomes such information that sets the virtual plane at a position correctly opposed to the camera device 5, which is also the installed position of the projection target object 3, for example, in the usage scene where the projection range 2c is set with respect to the projection target object 3.

The projection light distortion correction parameter arithmetic unit 84 calculates and outputs a projection light distortion correction parameter 84a from the photographic parameter, the projection light projection parameter and the virtual plane parameter. Although the distortion occurs on the projection range 2c owing to the positions, attitudes and specifications of the camera device 5 and the projector 2, and to the position of the virtual plane, this projection light distortion correction parameter 84a gives the distortion to the projection light data 11a, and thereby corrects the projection light data 11a so that the projection light 2a can coincide with the photographic range of the camera device 5 on the virtual plane.

Figure 32:
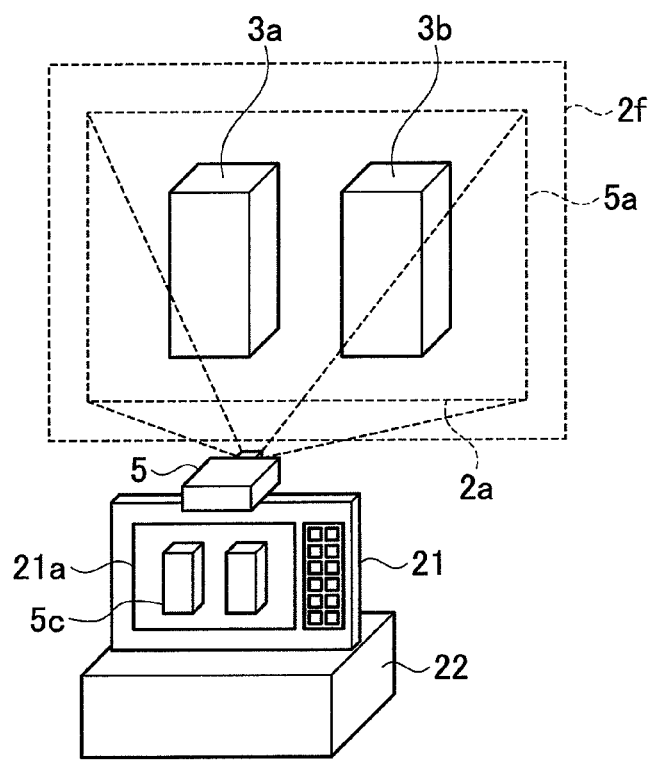
FIG. 32 is a view showing a state where objects as the projection targets are photographed by a camera device in the lighting system shown as the eighth embodiment of the present invention.

Specifically, first, as shown in FIG. 32, the projection light distortion correction parameter arithmetic unit 84 obtains a photographic range 5a of the camera device 5 on the virtual plane from an image angle of the photographing unit 61 in the camera device 5 and from a position of the virtual plane 2f with respect to the camera device 5 by using the virtual plane parameter and the photographic parameter. Then, the projection light distortion correction parameter arithmetic unit 84 arithmetically operates the projection light distortion correction parameter 84a indicating a correspondence relationship between coordinate information of the projection-enabled range 2b on the virtual plane 2f as a rectangular two-dimensional image and coordinate information of such corrected projection-enabled range 2b that coincides with the projection range 5a on the virtual plane 2f.

For the projection light data 11a supplied from the projection light data generation unit 11, the projection light data distortion correction unit 85 performs coordinate conversion using the projection light distortion correction parameter 84a supplied from the projection light distortion correction parameter arithmetic unit 84. In such a way, from the projection light data 11a, there is calculated such projection light distortion correction data 85a that allows the projection of such a projection range 2c that looks like free from the distortion from the user at the time when the projection light 2a is projected by the projector 2. Then, the calculated projection light distortion correction data 85a is supplied to the projection light data correction unit 13.

Figure 33:
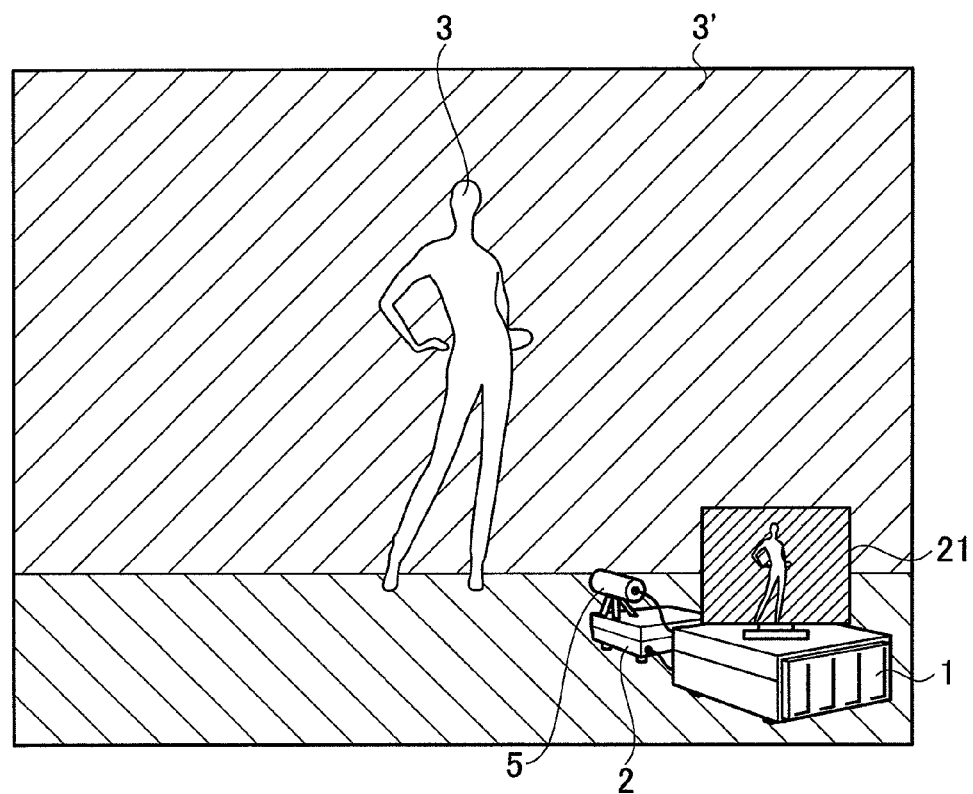
FIG. 33 is a perspective view showing a specific operation state of the lighting system shown as the eighth embodiment of the present invention.
Figure 34:
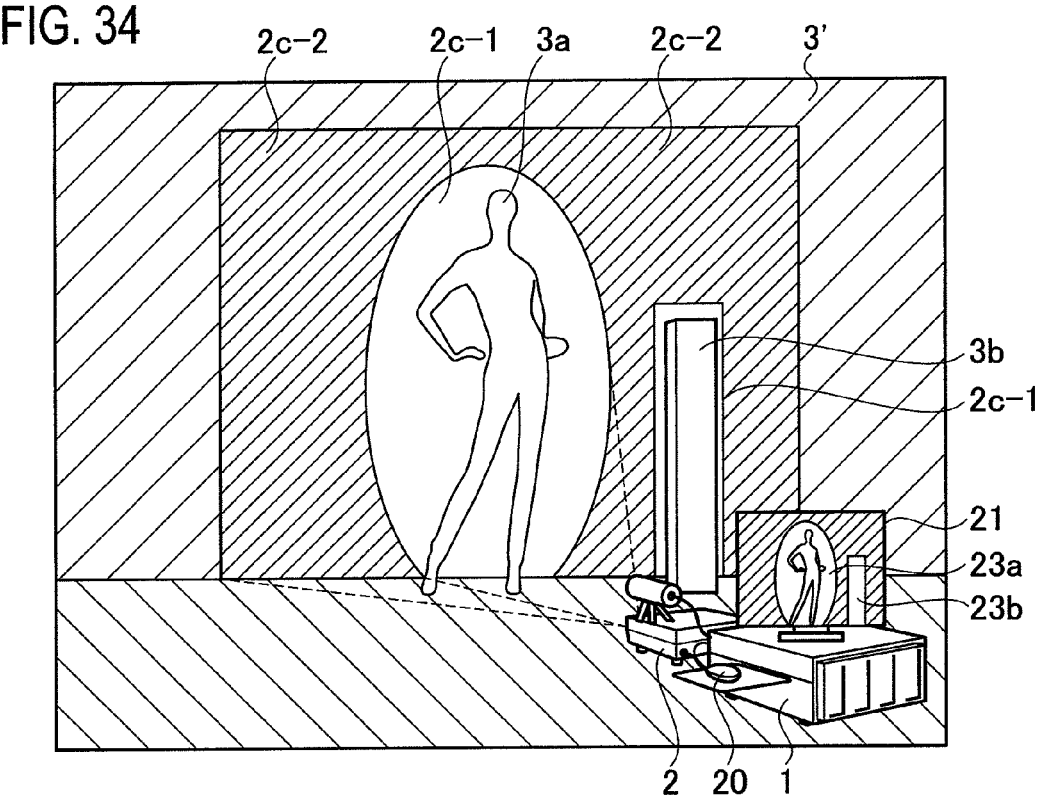
FIG. 34 is a perspective view showing a specific operation state of the lighting system shown as the eighth embodiment of the present invention.
Figure 35:
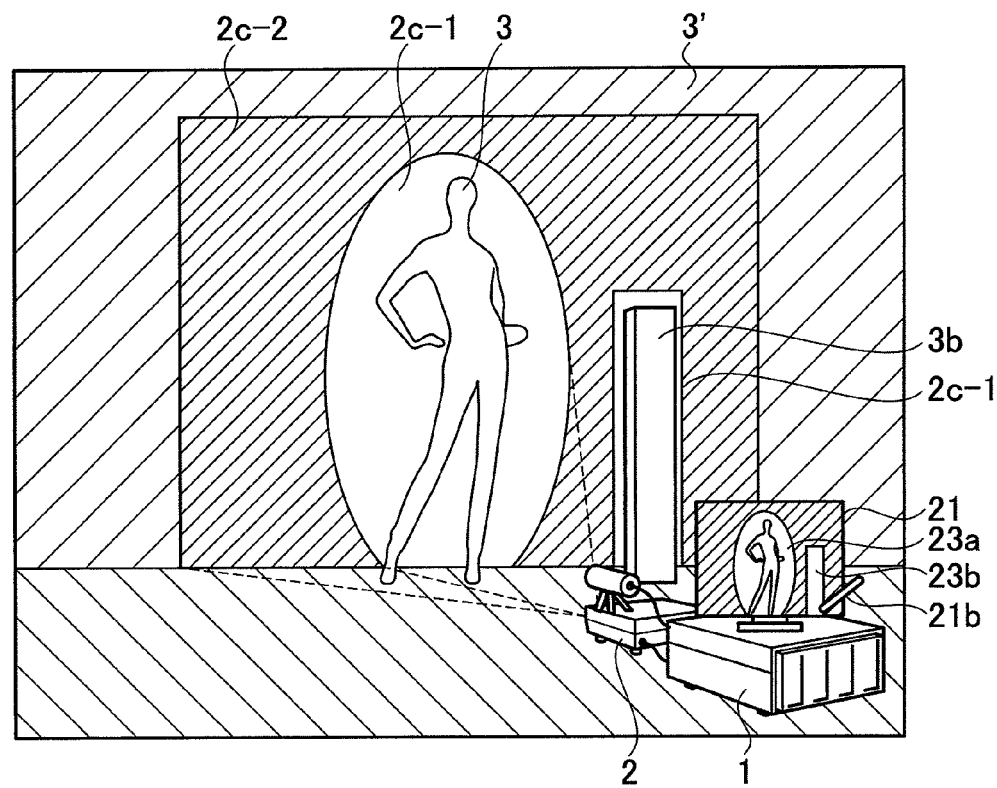
FIG. 35 is a perspective view showing the specific operation state of the lighting system shown as the eighth embodiment of the present invention.

As described above, in the lighting system, even if the photographic range 5a of the camera device 5 on the certain virtual plane 2f is defined, and the projection light 2a is projected from the projector 2, the projection light 2a forms the projection-enabled range 2b distorted to the shape of the trapezoid with respect to the photographic range 5a. As opposed to this, for the projection target object 3 as shown in FIG. 33, the lighting system allows the projection-enabled range 2b and the photographic range 5a to coincide with each other, whereby the distortion can be eliminated from the projection ranges 2c-1 and 2c-2 as shown in FIGS. 34 and 35. Note that FIG. 35 shows an example of using the pen 21b in place of the mouse.

Hence, the outline images 23a and 23b are only designated to the liquid crystal panel 21a by the pen 21b in the state where the photographed image data 61a photographed by the camera device 5 is displayed on the liquid crystal panel 21a, whereby the projection ranges 2c-1 and 2c-2 corresponding to the outline images 23a and 23b concerned can be formed as shown in FIG. 34 and FIG. 35. Specifically, in a state where objects on which the projection ranges 2c-1 and 2c-2 are desired to be actually formed, such as the projection target objects 3a and 3b, are photographed by the camera device 5 and are displayed on the liquid crystal panel 21a, the operation is performed to the liquid crystal panel 21a, whereby accuracy of the correspondence relationship between the outline images 23a and 23b set on the liquid crystal panel 21a and the actual projection ranges 2c-1 and 2c-2 can be enhanced.

Ninth Embodiment

Next, a description is made of a lighting system shown as a ninth embodiment, to which the present invention is applied, with reference to FIG. 36 to FIG. 46. Note that the same reference numerals are assigned to similar portions to those of the above-mentioned lighting systems, whereby a detailed description thereof is omitted.

In addition to the components of the above-mentioned lighting system of FIG. 31, the lighting system shown as the ninth embodiment includes: a projection range extraction setting unit 91 as projection range extraction setting means for setting conditions for extracting the projection range 2c; and a projection range classification unit 92 as classifying means for classifying the projection range 2c and the non-projection range other than the projection range concerned with each other by analyzing the photographic data, which is generated by the camera device 5, in accordance with the conditions set by the projection range extraction setting unit 91. This lighting system corrects the projection light distortion correction data 85a for correcting the projection light data by the projection light data correction unit 13 based on the projection range and the non-projection range, which are classified with each other by the projection range classification unit 92.

The projection range extraction setting unit 91 analyzes the photographed image data 61a photographed by the camera device 5, and as the conditions for extracting the projection range 2c onto which the projection light is projected, sets extraction methods such as an approximate color extraction method of extracting the projection range 2c based on a color, a shape extraction method of extracting the projection range 2c based on a shape, and a lightness extraction method of extracting the projection range 2c based on lightness, and sets threshold values in the extraction methods concerned, and the like.

For example, the projection range extraction setting unit 91 is composed of: the keyboard operated by the user and the input interface that recognizes operations to the keyboard; the mechanism that reads the recording medium in which the variety of parameters are stored; the mechanism that receives the variety of parameters transmitted from the outside; and the like. The extraction conditions of the projection range 2c, which are set by the projection range extraction setting unit 91, are supplied as a projection range extraction parameter 91a to the projection range classification unit 82.

In accordance with the projection range extraction parameter 91a, the projection range classification unit 82 analyzes the photographed image data 63a supplied from the photographed image data input unit 63. As a result of this analysis, the projection range classification unit 82 supplies, to the projection light data correction unit 13, a projection range classification parameter 92a as coordinate information indicating a projection range that has conformed to the projection range extraction parameter 91a. In such a way, by the projection light data correction unit 13, the lighting system can generate projection light correction data 13a for projecting the projection light only onto the projection range 2c that has conformed to the extraction conditions set by the projection range extraction setting unit 91.

Figure 37:
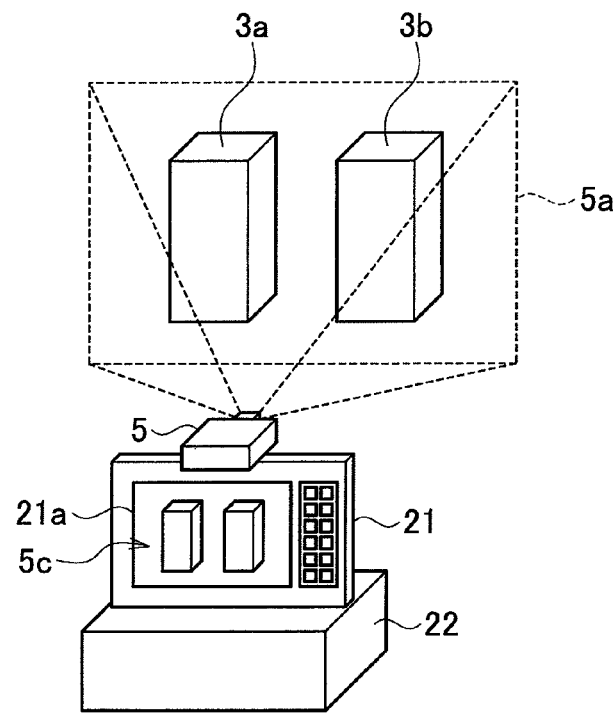
FIG. 37 is a view showing a state where an image photographed by the camera device is displayed on a liquid crystal panel in the lighting system shown as the ninth embodiment of the present invention.

Specifically, in order to set the projection range 2c for the projection target objects 3a and 3b as shown in FIG. 37, the camera device 5 generates the photographed image data 61a including the projection target objects 3a and 3b, and supplies the photographed image data 61a thus generated to the photographed image data input unit 63. Then, by using the photographed image data 63a supplied from the photographed image data input unit 63 to the photographed image data display unit 86, the photographed image data display unit 86 that is allowed to also serve as the liquid crystal panel 21a displays a photographed image that includes an object image 5c showing the projection target objects 3a and 3b. Meanwhile, upon receiving the photographed image data 63a, the projection range classification unit 82 analyzes the photographed image data 63a concerned in accordance with the projection range extraction parameter 91a, and classifies the projection range 2c and the non-projection range with each other.

Here, it is assumed that the projection range extraction parameter 91a, in which the extraction conditions of the projection range 2c are: "shape extraction processing"; and "cubic regions are included into the projection range 2c, and a region other than the cubic regions are set as the non-projection range", is supplied to the projection range classification unit 92.

Under such an environment, the projection range classification unit 92 is supplied with the photographed image data 63a including the object image 5c of the cubes. Then, the projection range classification unit 92 recognizes shape edges, which cover the entirety of the photographed image data 63a, by edge extraction processing, then includes the cubic regions into the projection range 2c, and sets the region other than the cubic regions as the non-projection range.

Figure 38:
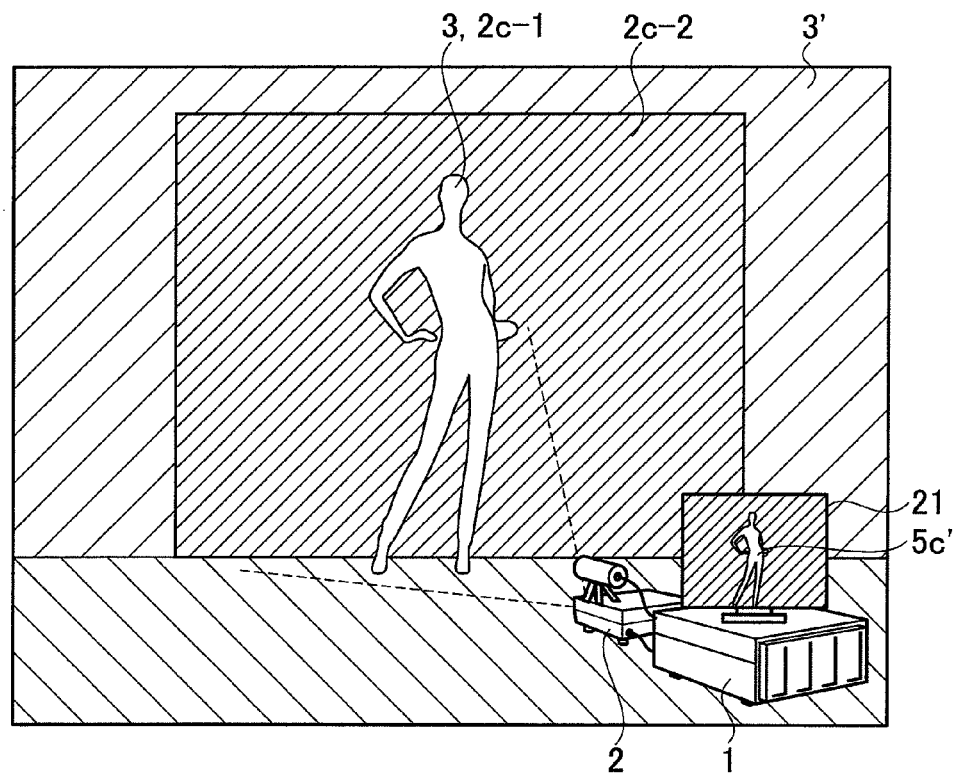
FIG. 38 is a perspective view showing a specific operation state of the lighting system shown as the ninth embodiment of the present invention.

A classification result of the projection range, which is acquired by the projection range classification unit 92 as described above, is displayed as outline information 5c' on the liquid crystal panel 21a as shown in FIG. 38. Moreover, a projection range parameter 82a indicating this classification result is supplied to the projection light data correction unit 13.

In such a way, the lighting system allows the projection light data correction unit 13 to generate the projection light correction data 13a in accordance with the projection range parameter 82a, actuates the projection light correction data drawing unit 14 and the projector 2, and thereby can generate the projection light 2a for projecting the projection light onto the projection range of the cubic regions. As a result of this, on the liquid crystal panel 21a, the projection light can be projected only onto the projection range of the projection target objects 3a and 3b.

Figure 39:
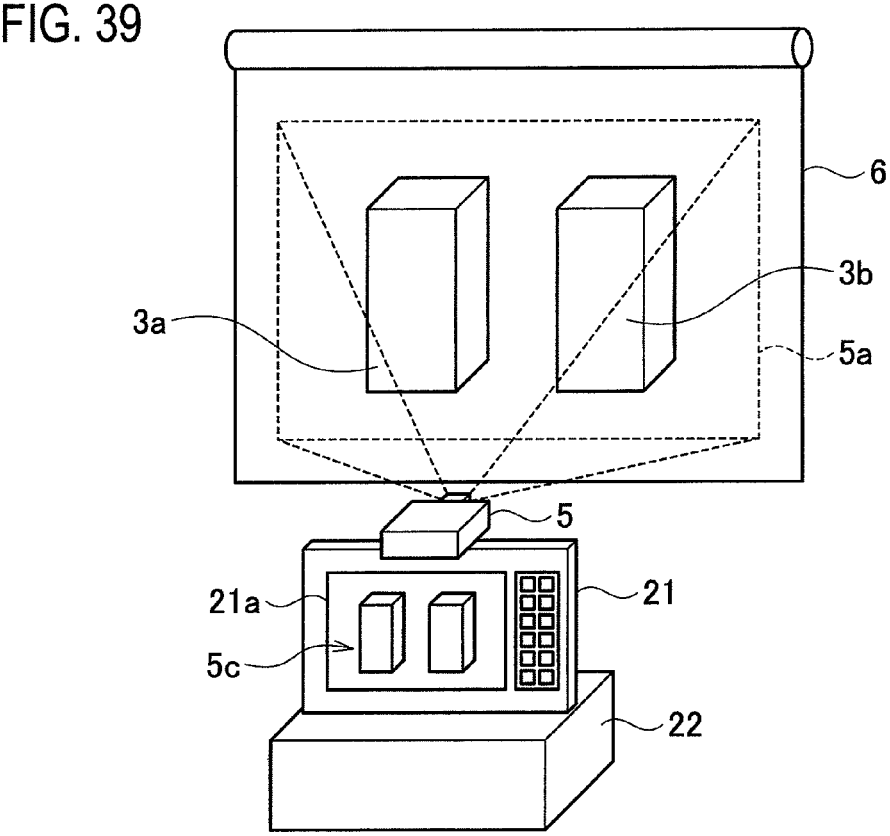
FIG. 39 is a view showing a state where a blue sheet is arranged behind the object as the projection target in the lighting system shown as the ninth embodiment of the present invention.

As shown in FIG. 39, this lighting system may arrange a blue sheet, which is prepared for enhancing extraction accuracy in the color extraction processing, behind the projection target objects 3a and 3b. In this case, the projection range extraction setting unit 91 sets a projection range extraction parameter 91a, in which the extraction conditions of the projection range are: "color extraction processing"; and "a blue region is set as the non-projection range, and a region other than the blue region is set as the projection range 2c", and supplies the set projection range extraction parameter 91a to the projection range classification unit 92. As a result, for the photographed image data 63a, the projection range classification unit 92 implements color extraction processing for classifying the blue region and the region other than the blue region with each other, and can thereby generate the outline information 5c' of the projection target objects 3a and 3b as the projection range parameter 82a.

Figure 40:
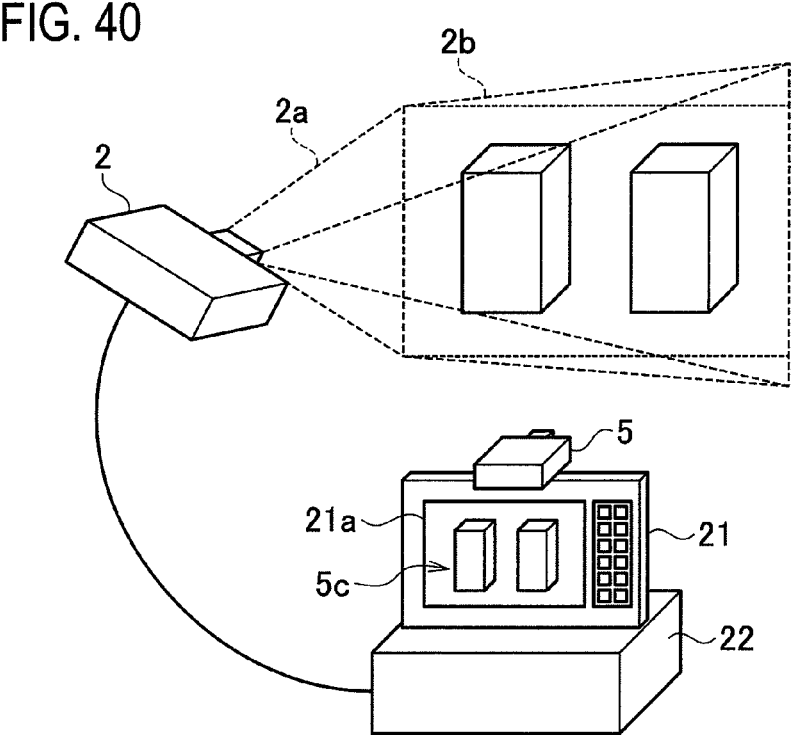
FIG. 40 is a view showing a state where the projection range is matched with a photographic range in the lighting system shown as the ninth embodiment of the present invention.

Moreover, in this lighting system, the projection light correction data 75a is generated by the projection light data distortion correction unit 75 so as to allow the photographic range 5a of the camera device 5, which includes the projection target objects 3a and 3b, and the projection-enabled range 2b of the projector 2 to coincide with each other as shown in FIG. 40. In such a way, on the liquid crystal panel 21a, there can be displayed: a classification result confirmed on the liquid crystal panel 21a concerned; and an image including the object image 5c, which is obtained as a result of projecting the projection light onto the projection range automatically set in accordance with the classification result concerned.

In accordance with the lighting system as described above, by fully using the photographed image data 61a obtained by photographing the projection target objects 3a and 3b as the projection targets, a portion conforming to the specific conditions is extracted by the image processing technology, whereby the region thus extracted can be set as the projection range 2c. In such a way, the setting of the projection range 2c can be automated.

Figure 41:
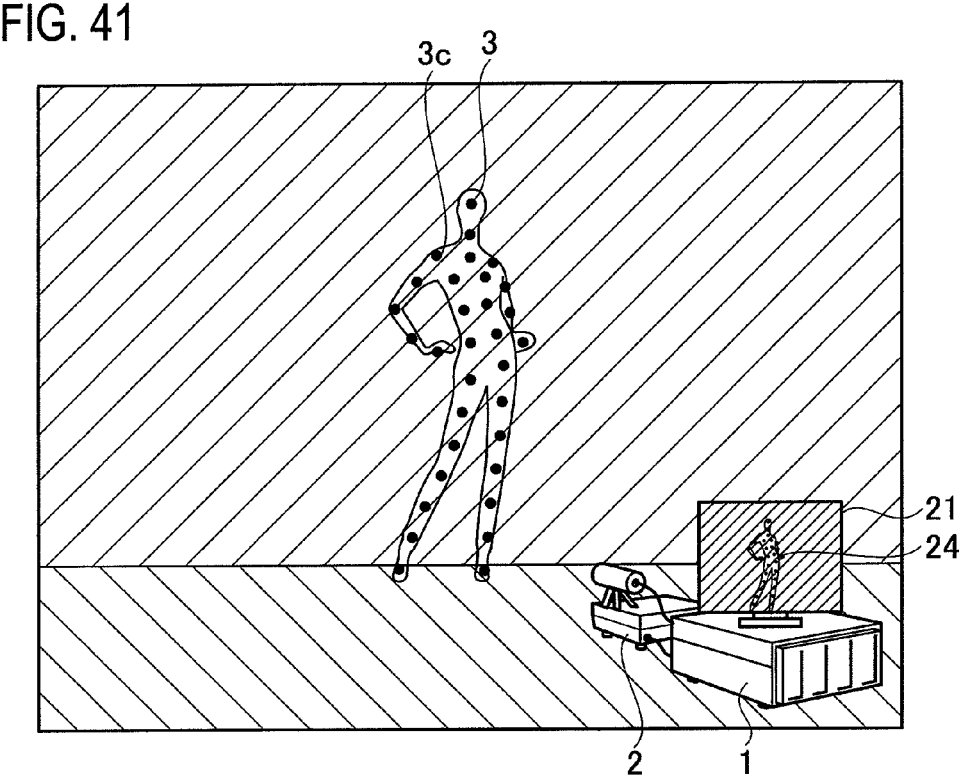
FIG. 41 is a perspective view showing a state where dot-like markers are pasted onto the object as the projection target in the lighting system shown as the ninth embodiment of the present invention.
Figure 42:
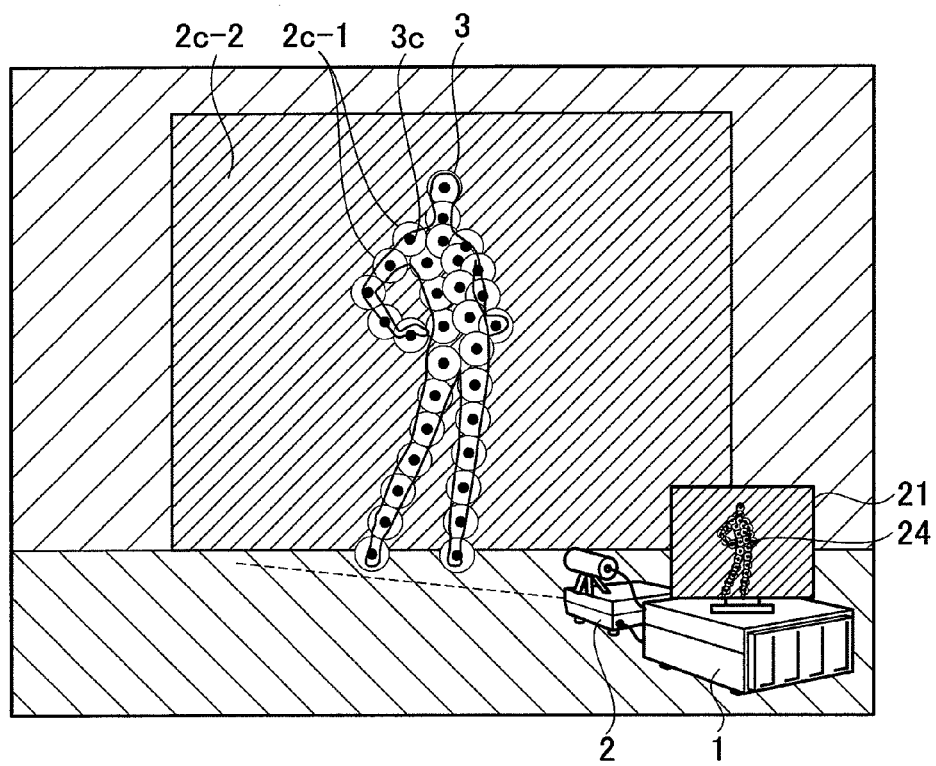
FIG. 42 is a perspective view showing a specific operation state of the lighting system shown as the ninth embodiment of the present invention when each of predetermined ranges defined around the dot-like markers is taken as the projection range.

Moreover, with regard to the conditions for extracting the projection range 2c by the projection range extraction setting unit 91, this lighting system may paste dot-like markers 3c onto the projection target object 3 as shown in FIG. 41, and may set, as the projection range 2c, predetermined ranges having the dot-like markers 3c concerned taken as centers. Then, when the photographed image data 63a is supplied to the projection range classification unit 92 in a state where the projection range extraction parameter 91a indicating this condition is supplied thereto, the projection range classification unit 92 analyzes the photographed image data 63a, and recognizes positions of the dot-like markers 3c. Then, the projection range classification unit 92 generates the projection range classification parameter 92a, in which the predetermined circular ranges having the markers 3c taken as the centers are set as the projection range 2c, and the range other than these circular ranges is set as the non-projection range, and supplies the generated projection range classification parameter 92a to the projection light data correction unit 13. In such a way, as shown in FIG. 42, the predetermined circular ranges including the markers 3c on the projection target object 3 can be set as the projection ranges 2c-1, and the range other than the projection ranges 2c-1 can be set as the projection range 2c-2. Note that, desirably, the ranges of the projection range 2c, which are set for the dot-like markers 3c, can be set at an arbitrary size in response to the operation of the user. Moreover, desirably, the shape of the projection range 2c is not limited to the round shape, and can be set at an arbitrary shape such as a quadrangular shape in response to the operation of the user.

Figure 43:
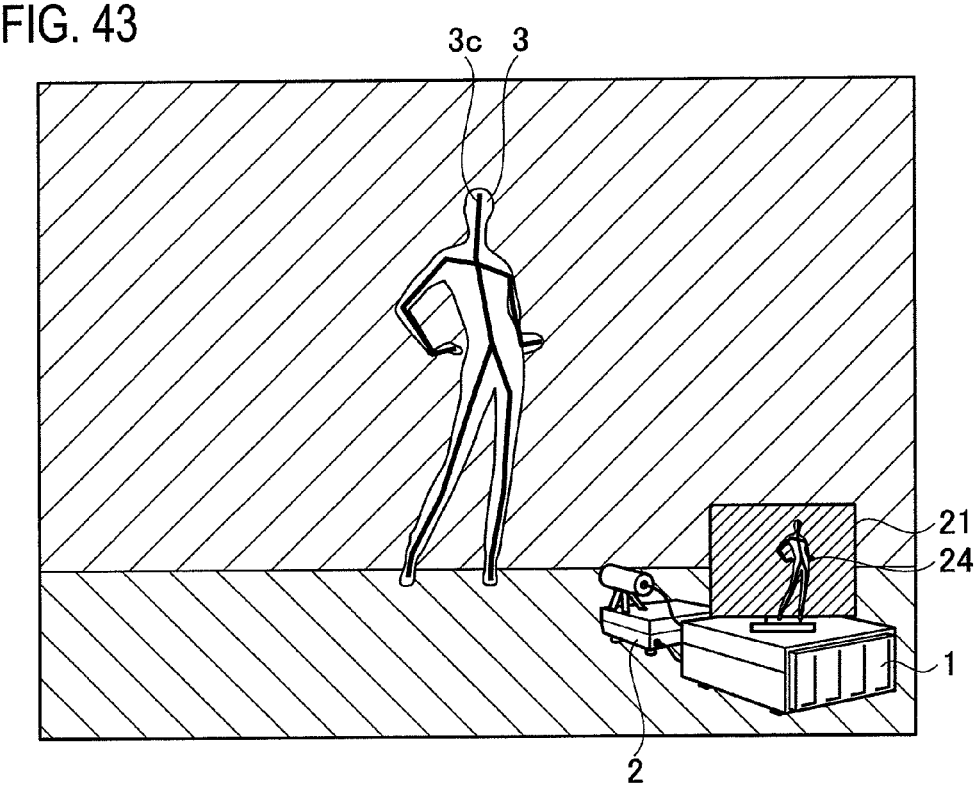
FIG. 43 is a perspective view showing a state where a linear marker is pasted onto the object as the projection target in the lighting system shown as the ninth embodiment of the present invention.
Figure 44:
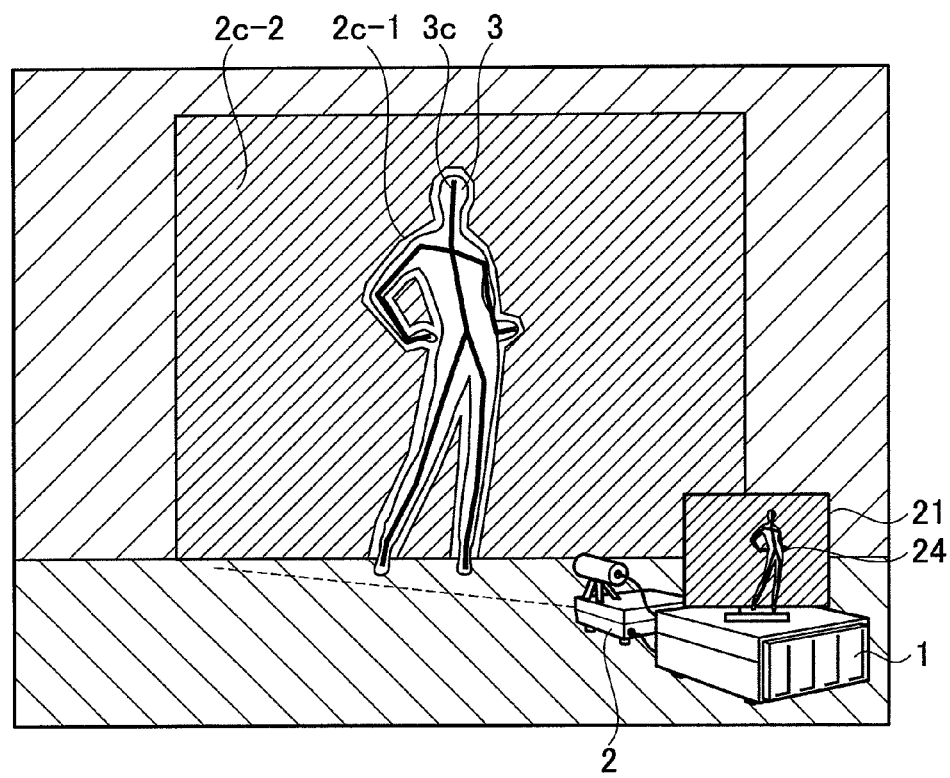
FIG. 44 is a perspective view showing a specific operation state of the lighting system shown as the ninth embodiment of the present invention when a predetermined range defined around the linear marker is taken as the projection range.

Moreover, with regard to the conditions for extracting the projection range 2c by the projection range extraction setting unit 91, this lighting system may paste a linear marker 3c onto the projection target object 3 as shown in FIG. 43, and may set a range of a predetermined width, which uses the marker 3c concerned as a skeleton line, as the projection range 2c. Then, when the photographed image data 63a is supplied to the projection range classification unit 92 in a state where the projection range extraction parameter 91a indicating this condition is supplied thereto, the projection range classification unit 92 analyzes the photographed image data 63a, and recognizes positions (starting point, endpoint, length) of the linear marker 3c. Then, the projection range classification unit 92 generates the projection range classification parameter 92a, in which the range of the predetermined width, which uses the marker 3c as the skeleton line, is set as the projection range 2c, and the range other than the projection range 2c is set as the non-projection range, and supplies the generated projection range classification parameter 92a to the projection light data correction unit 13. In such a way, as shown in FIG. 44, the range of the predetermined width, which includes the marker 3c on the projection target object 3, can be set as the projection range 2c-1, and the range other than the projection range 2c-1 can be set as the projection range 2c-2. Note that, desirably, a width of the projection range 2c set with respect to the linear maker 3c can be set at an arbitrary size in response to the operation of the user.

Figure 45:
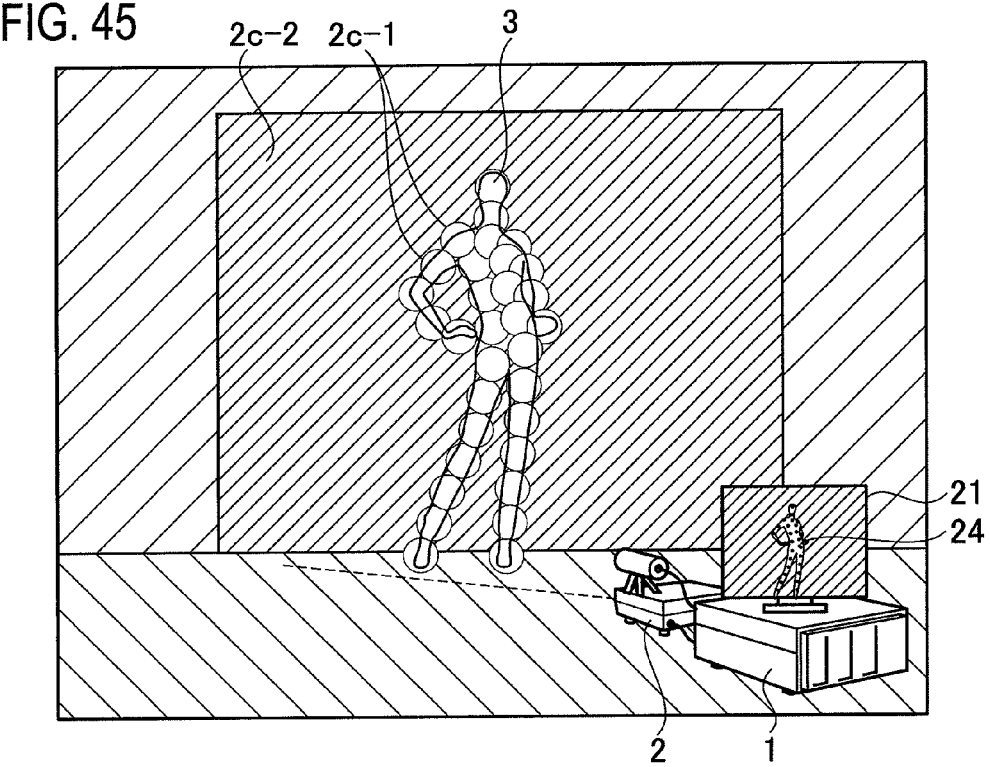
FIG. 45 is a perspective view showing a specific operation state of the lighting system shown as the ninth embodiment of the present invention after the dot-like markers are detached.
Figure 46:
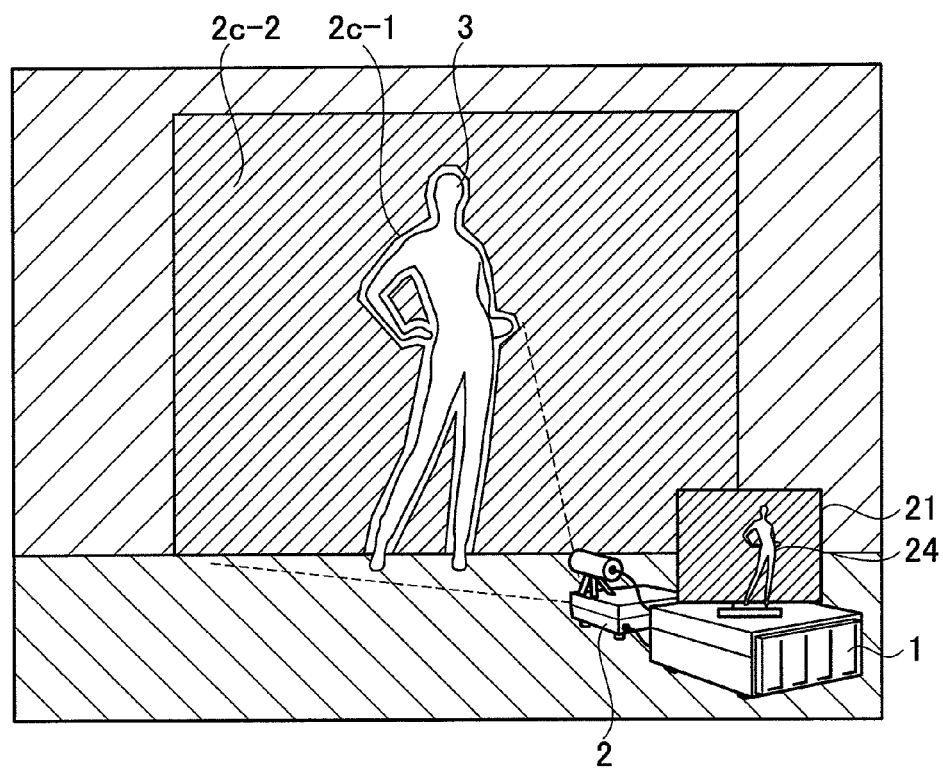
FIG. 46 is a perspective view showing a specific operation state of the lighting system shown as the ninth embodiment of the present invention after the linear marker is detached.

Still further, as shown in FIG. 45 and FIG. 46, the projection range 2c may be made capable of being held based on the markers 3c even if the markers 3c are detached after such a predetermined range having the markers 3c taken as the centers or the skeleton is set as the projection range 2c. For this purpose, it is necessary that the lighting control apparatus 1 include means for recording the projection range classification parameter 92a generated by the projection range classification unit 92.

Still further, such a configuration may be adopted, in which a three-dimensional shape of the projection target object 3 is scanned by using the photographed image data 63a obtained by photographing the projection target object 3 by means of a plurality of the camera devices 5, and the projection range 2c is decided so as to cover the three-dimensional shape of the projection target object 3.

Tenth Embodiment

Next, a description is made of a lighting system shown as a tenth embodiment, to which the present invention is applied, with reference to FIG. 47 to FIG. 52. Note that the same reference numerals are assigned to similar portions to those of the above-mentioned lighting systems, whereby a detailed description thereof is omitted.

Figure 47:
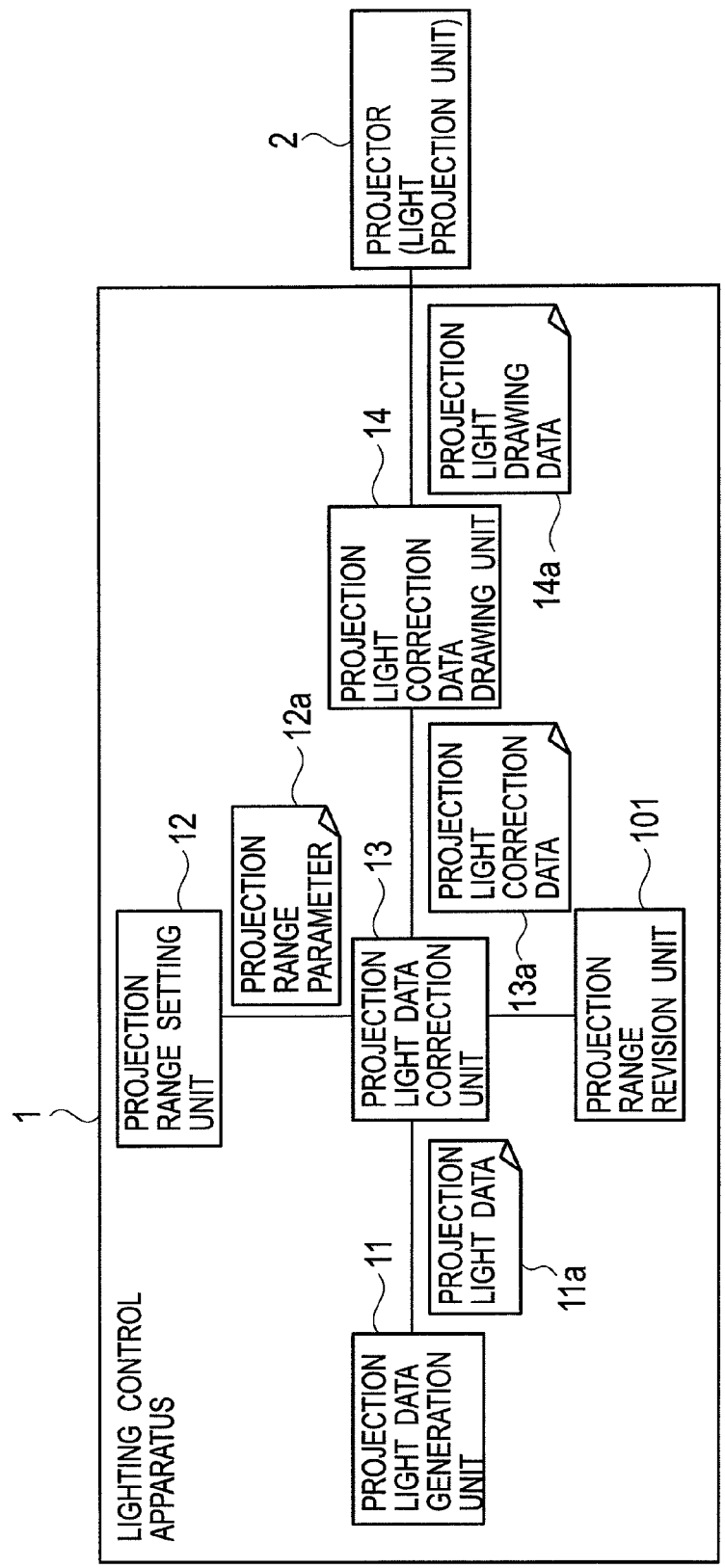
FIG. 47 is a block diagram showing a functional configuration of a lighting system shown as a tenth embodiment of the present invention.

As shown in FIG. 47, a lighting control apparatus 1 of the lighting system shown as the ninth embodiment is different from the lighting control apparatus 1 shown in FIG. 4 in that a projection range revision unit 101 that revises a boundary of the projection range 2c in accordance with the operation of the user is connected to the projection light data correction unit 13.

Figure 36:
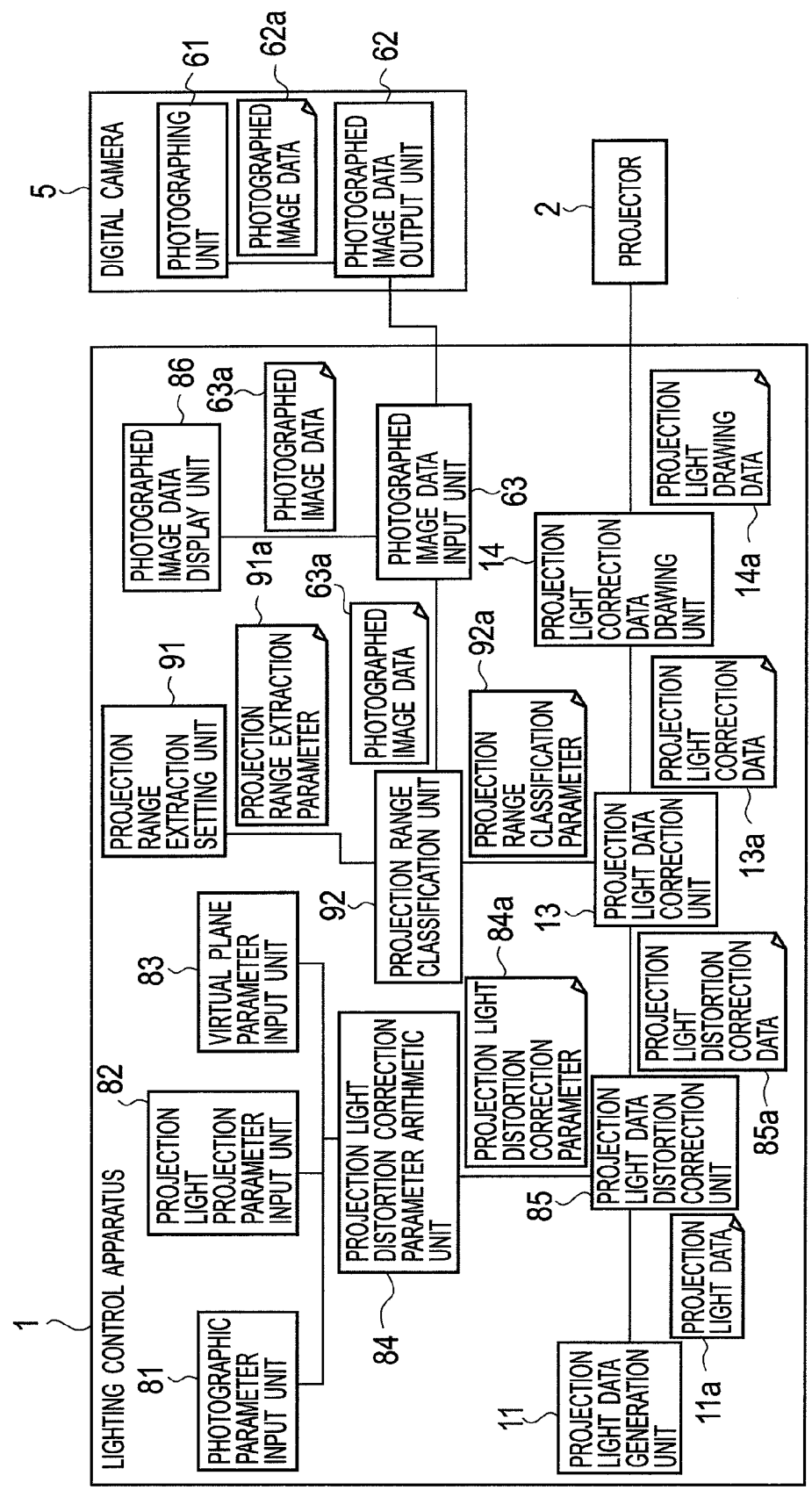
FIG. 36 is a block diagram showing a functional configuration of a lighting system shown as a ninth embodiment of the present invention.
Figure 48:
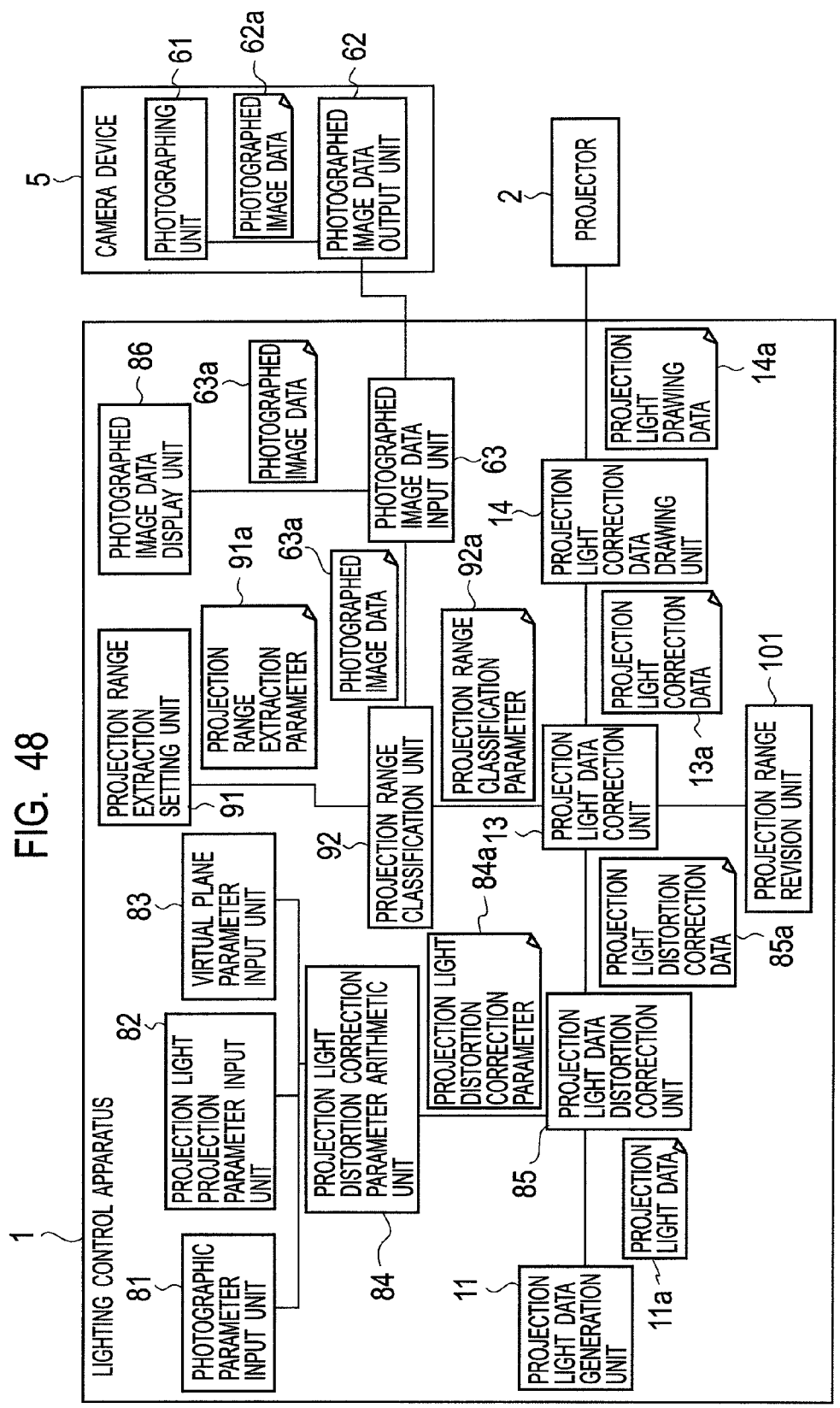
FIG. 48 is a block diagram showing another functional configuration of the lighting system shown as the tenth embodiment of the present invention.

Moreover, as shown in FIG. 48, in addition to the components of the above-mentioned lighting system of FIG. 36, this lighting system may adopt a configuration of including such a projection range revision unit 101 as revising means for revising the projection range and the non-projection range, which are classified with each other by the projection range classification unit 82, in accordance with the operation of the user.

This projection range revision unit 101 is composed of: the pen 21b and the liquid crystal panel 21a; the keyboard operated by the user and the input interface that recognizes the operations to the keyboard; and the like. In the case of revising the projection range 2c by the projection range revision unit 101, the lighting system displays, as the classification result, the projection range 2c and the non-projection range on the liquid crystal panel 21a in accordance with the projection range parameter 82a generated by the projection range classification unit 92. Then, the projection range revision unit 101 recognizes that an operation of changing the projection range 2c or the non-projection range is performed in such a manner that the user operates the pen 21b that composes the projection range revision unit 101. Specifically, the projection range revision unit 101 generates a command to the effect that coordinate information indicating the projection range 2c or the non-projection range is to be changed, and supplies the generated command to the projection light data correction unit 13.

Upon being supplied with the command to change the projection range 2c or the non-projection range, the projection light data correction unit 13 performs revision processing for the projection range parameter 82a. Specifically, the projection light data correction unit 13 converts coordinate information of the still unrevised projection range 2c and non-projection range, which compose the projection range parameter 82a, into coordinate information of the revised projection range 2c and non-projection range. Then, by using the revised projection range parameter 82a, the projection light data correction unit 13 can correct the projection light correction data 85a and can generate the projection light correction data 13a.

As described above, in accordance with the lighting system, the projection range 2c and the non-projection range, which are automatically set by the lighting system shown in FIG. 4 or FIG. 36, can be revised by the projection range revision unit 101 in response to the operation of the user. Hence, in accordance with this lighting system, the projection range 2c among the projection-enabled range 2b can be set more simply.

Figure 49:
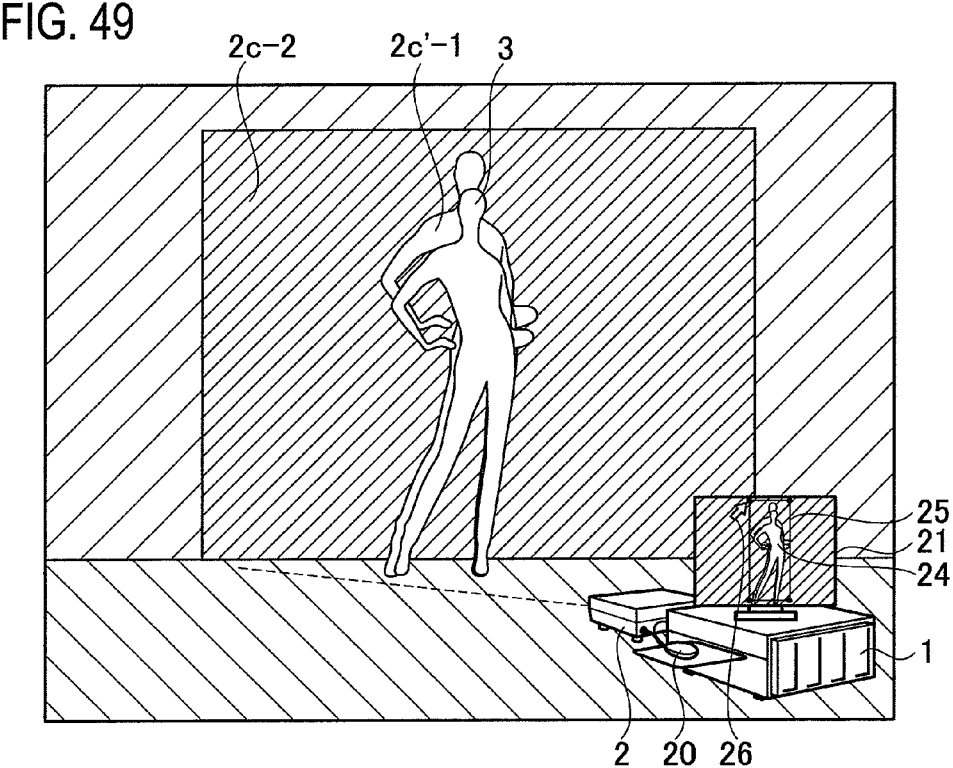
FIG. 49 is a block diagram showing a specific state of the lighting system shown as the tenth embodiment of the present invention.

Specifically, by the projection range revision unit 101, it is detected that, when a projection target object image 24 that becomes the projection range 2c is displayed on the liquid crystal panel 21a as shown in FIG. 49, an operation of moving a pointer 26 is performed to enlarge or reduce a selected region 25 that surrounds the projection target object image 24. In such a way, the projection range revision unit 101 can revise the projection range 2c in response to the operation of the user. For example, in the case where the selected region 25 is enlarged by the operation of the pointer 26, the projection range revision unit 101 can revise the projection range 2c-1, which is projected onto the projection target object 3, into an enlarged projection range 2c'-1.

Figure 50:
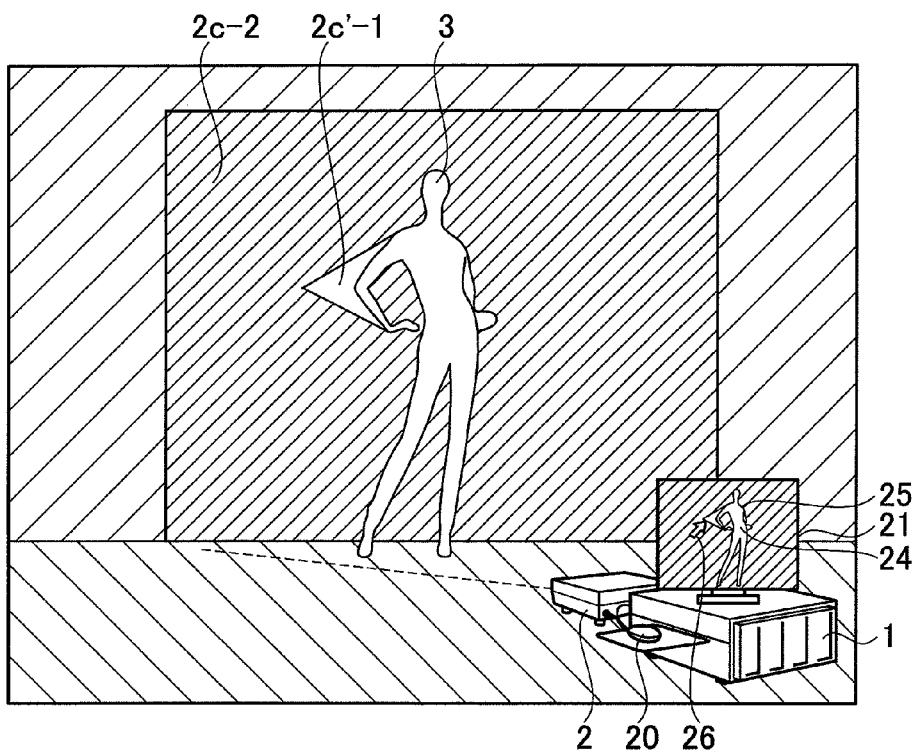
FIG. 50 is a block diagram showing a specific state of the lighting system shown as the tenth embodiment of the present invention.

As another specific example, as shown in FIG. 50, a method may be adopted, in which the selected region 25 going along the projection target object image 24 is set, a part of the selected region 25 concerned is selected by the pointer 26, and the selected region 25 is deformed, whereby the projection range 2c may be revised. For example, in the case of shifting a part of the selected region 25 to a left side of FIG. 50, the projection range revision unit 101 can revise the projection range 2c-1, which corresponds to the part concerned, to a projection range 2c'-1 deformed therefrom.

Figure 51:
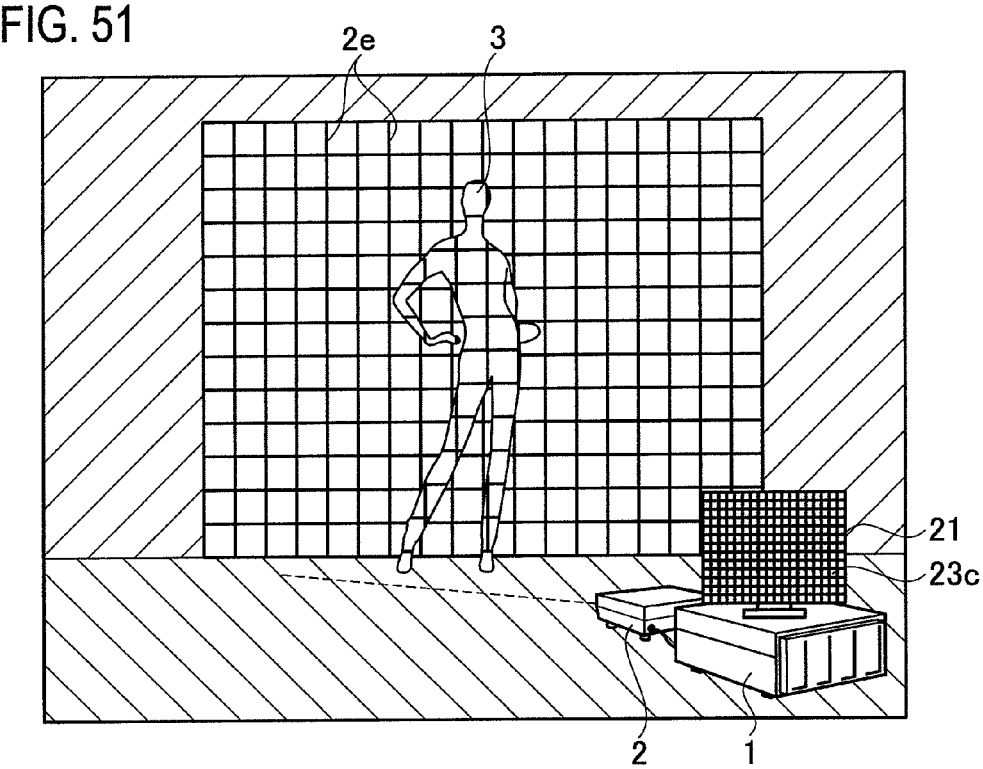
FIG. 51 is a block diagram showing a specific state of the lighting system shown as the tenth embodiment of the present invention.
Figure 52:
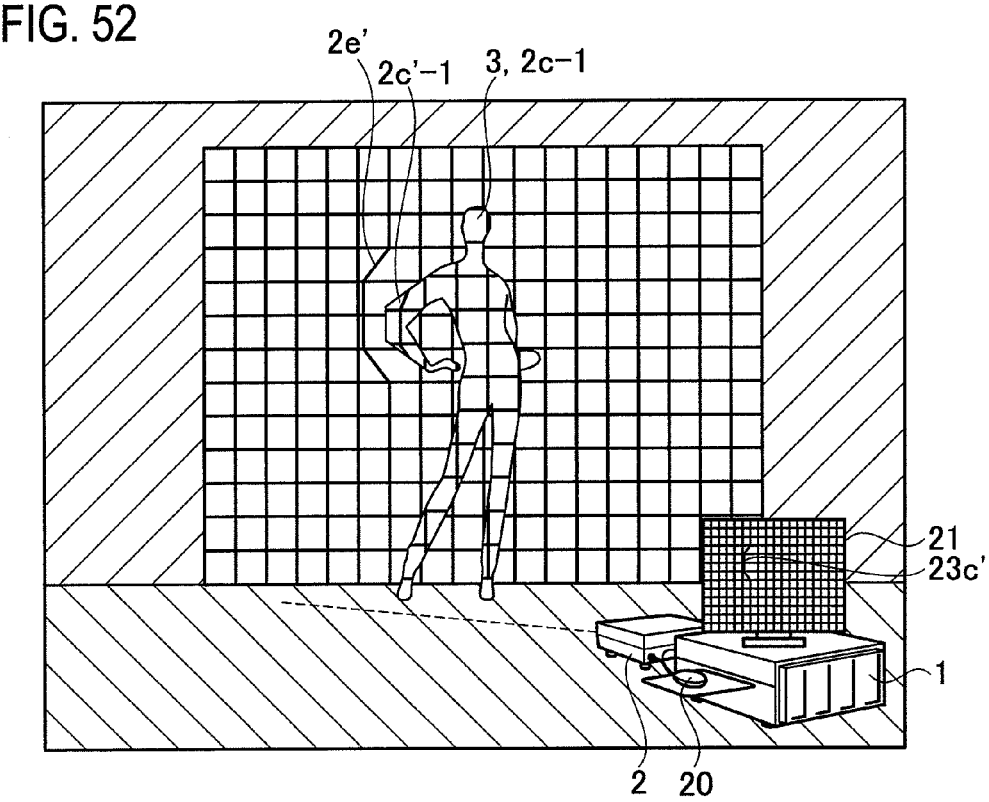
FIG. 52 is a block diagram showing a specific state of the lighting system shown as the tenth embodiment of the present invention.

As another specific example, as shown in FIG. 51, when the reference image 2e is projected onto the projection target object 3, and the reference image 23c is displayed on the liquid crystal panel 21a, then as shown in FIG. 52, it is assumed that the reference image 23c is deformed on the liquid crystal panel 21a by a mouse operation of the user, which is similar to that of the shape drawing/input unit 20. In response to the operation of the user, which is as described above, the projection range revision unit 101 may deform the projection range 2c. In the example of FIG. 52, the projection range revision unit 101 detects an operation of deforming the reference image 23c corresponding to an arm portion of the projection target object 3, and can thereby deform a grid that composes the reference image 2e concerned to then revise the grid into a reference image 2e', and can deform the projection range 2c-1 analogously to a way of distortion of the grid that composes the reference image 2e to then revise the projection range 2c-1 to a projection range 2c'-2.

Eleventh Embodiment

Next, as an eleventh embodiment, a description is made of another embodiment applicable to the above-mentioned lighting systems. Note that the same reference numerals are assigned to similar portions to those of the above-mentioned lighting systems, whereby a detailed description thereof is omitted.

Figure 53:
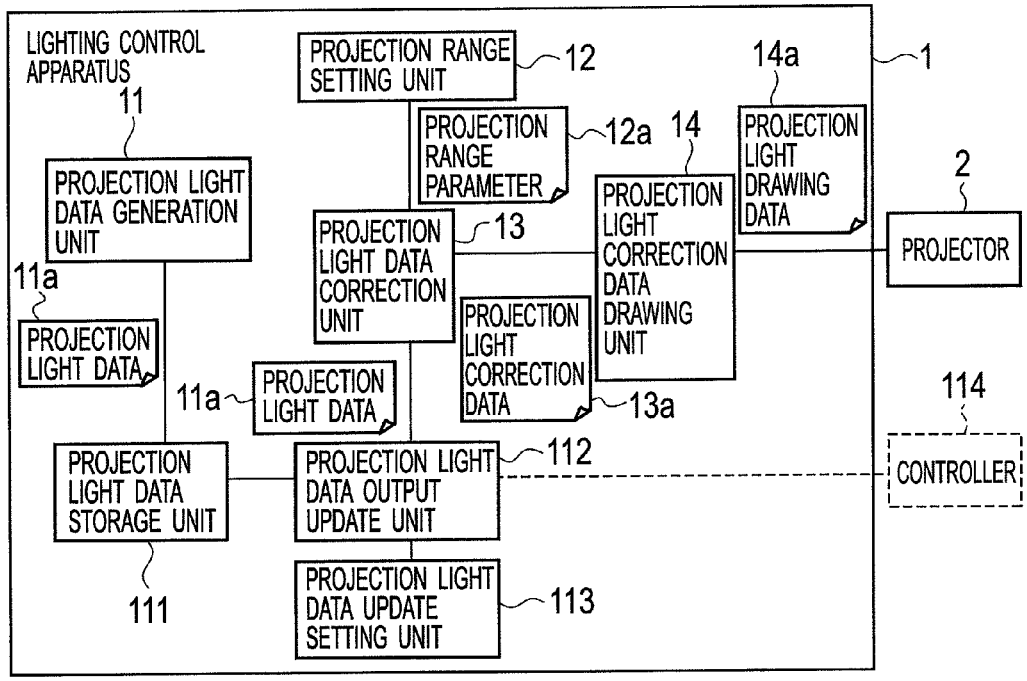
FIG. 53 is a block diagram showing a functional configuration of a lighting system shown as an eleventh embodiment of the present invention.

In the lighting systems described with reference to FIG. 1 to FIG. 52, as shown in FIG. 53, the projection light data 11 is stored in advance, and output control in accordance therewith is performed, whereby the projection light 2a projected from the projector 2 may be updated.

This lighting system includes: a projection light data storage unit 111 as projection light data storing means for storing the projection light data 11a; a projection light data update setting unit 113 as projection light data output setting means for setting at least either of an output order and output condition of the projection light data 11a stored in the projection light data storage unit 111; and a projection light data output update unit 112 as projection light data updating means for outputting the projection light data 11a, which is stored in the projection light data storage unit 111, in accordance with the at least either of the output order and the output condition, which is set by the projection light data update setting unit 113.

The projection light data storage unit 111 is composed of a hard disk device in the personal computer, an external storage device, or the like. This projection light data storage unit 111 is supplied with plural pieces of the projection light data 11a generated by the projection light data generation unit 11. As the plural pieces of projection light data 11a, there are set varieties of colors, brightnesses and contrasts for each of the projection range and the non-projection range.

The projection light data update setting unit 113 sets update information, which indicates the output order and output condition of the projection light 2a, by a keyboard operation of the user to the personal computer. As the output order of the projection light 2a, there are mentioned: an order of outputting plural pieces of the projection light 2a based on the projection light data 11a; a projection time and update interval of each piece of the projection light 2a; and the like. Moreover, as the output condition of the projection light 2a, for example, there are mentioned: that the projection light data 11a is read out by the projection light data output update unit 112 to then start the projection of the projection light 2a when a button provided on a controller 114 that composes the personal computer is operated; the next projection light data 11a is read out to then update the projection light 2a at the time of operating the button; and the like.

In the lighting system as described above, by the operation of the user, the projection light 2a desired to be projected is selected in advance, whereby the projection light data 11a for use is selected in advance, and an update order and an update condition are set in advance. Then, at the time of starting the projection of the projection light 2a, the projection light data output update unit 112 reads out the projection light data 11a from the projection light data storage unit 111 in accordance with the update order and update condition of the projection light 2a, which are set by the projection light data update setting unit 113, and then supplies the projection light data 11a thus read out to the projection light data correction unit 13. In such a way, the lighting system can project the projection light 2a, which is set by the user, in desired order and interval, and can instantaneously change the characteristics (color, brightness, contrast) of the light in the projection range projected by the projection light 2a.

Figure 54:
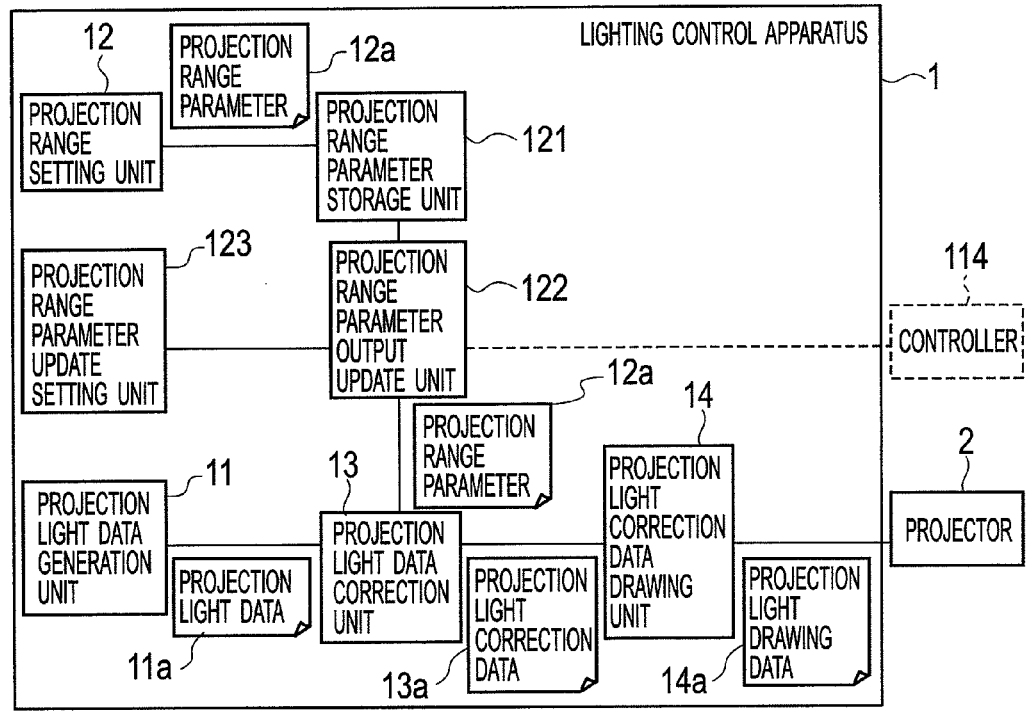
FIG. 54 is a block diagram showing a functional configuration of a lighting system shown as the eleventh embodiment of the present invention.

Moreover, by a configuration as shown in FIG. 54, this lighting system may store the projection range parameter 12a in advance to then perform output control in accordance therewith, and may thereby update the projection range and the non-projection range among the projection light 2a projected from the projector 2.

This lighting system includes: a projection range parameter storage unit 121 as projection range parameter storing means for storing the projection range parameter 12a as a projection range parameter for correcting the projection range by the projection light data correction unit 13; a projection range parameter update setting unit 123 as projection range output setting means for setting at least either of an output order and output condition of the projection range parameter 12a stored in the projection range parameter storage unit 121; and a projection range parameter output update unit 122 as projection range parameter updating means for outputting the projection range parameter 12a, which is stored in the projection range parameter storage unit 121, in accordance with the at least either of the output order and the output condition, which is set by the projection range parameter update setting unit 123.

The projection range parameter storage unit 121 is composed of the hard disk device in the personal computer, the external storage device, or the like. This projection range parameter storage unit 121 is supplied with a plurality of the projection range parameters 12a generated by the projection range setting unit 12. As the plurality of projection range parameters 12a, there are included patterns of the projection ranges and the non-projection ranges, which have various shapes.

The projection range parameter update setting unit 123 sets update information, which indicates the output order and output condition of the projection range parameter 12a, by the keyboard operation of the user to the personal computer. Specifically, the order and condition of the projection range desired to be changed are the update information. As the output order of the projection range parameter 12a, there are mentioned: an order of changing a plurality of the projection ranges; a projection time and update interval of each of the projection ranges; and the like. Moreover, as the output condition of the projection range parameter 12a, for example, there are mentioned: that the projection range parameter 12a is read out by the projection range parameter output update unit 122 to then update the projection range to a new one when the button provided on the controller 114 that composes the personal computer is operated; and the like.

In the lighting system as described above, by the operation of the user, the desired projection range is selected in advance, whereby the projection range parameter 12a for use is selected in advance, and the update order and the update condition are set in advance. Then, at the time of starting the projection of the projection light 2a, the projection range parameter output update unit 122 reads out the projection range parameter 12a from the projection range parameter storage unit 121 in accordance with the update order and update condition of the projection range, which are set by the projection range parameter update setting unit 123, and then supplies the projection range parameter 12a thus read out to the projection light data correction unit 13. In such a way, the lighting system can project the projection light 2a onto the projection range, which is selected by the user, in the desired order and interval, and can instantaneously change the projection range projected by the projection light 2a.

Figure 55:
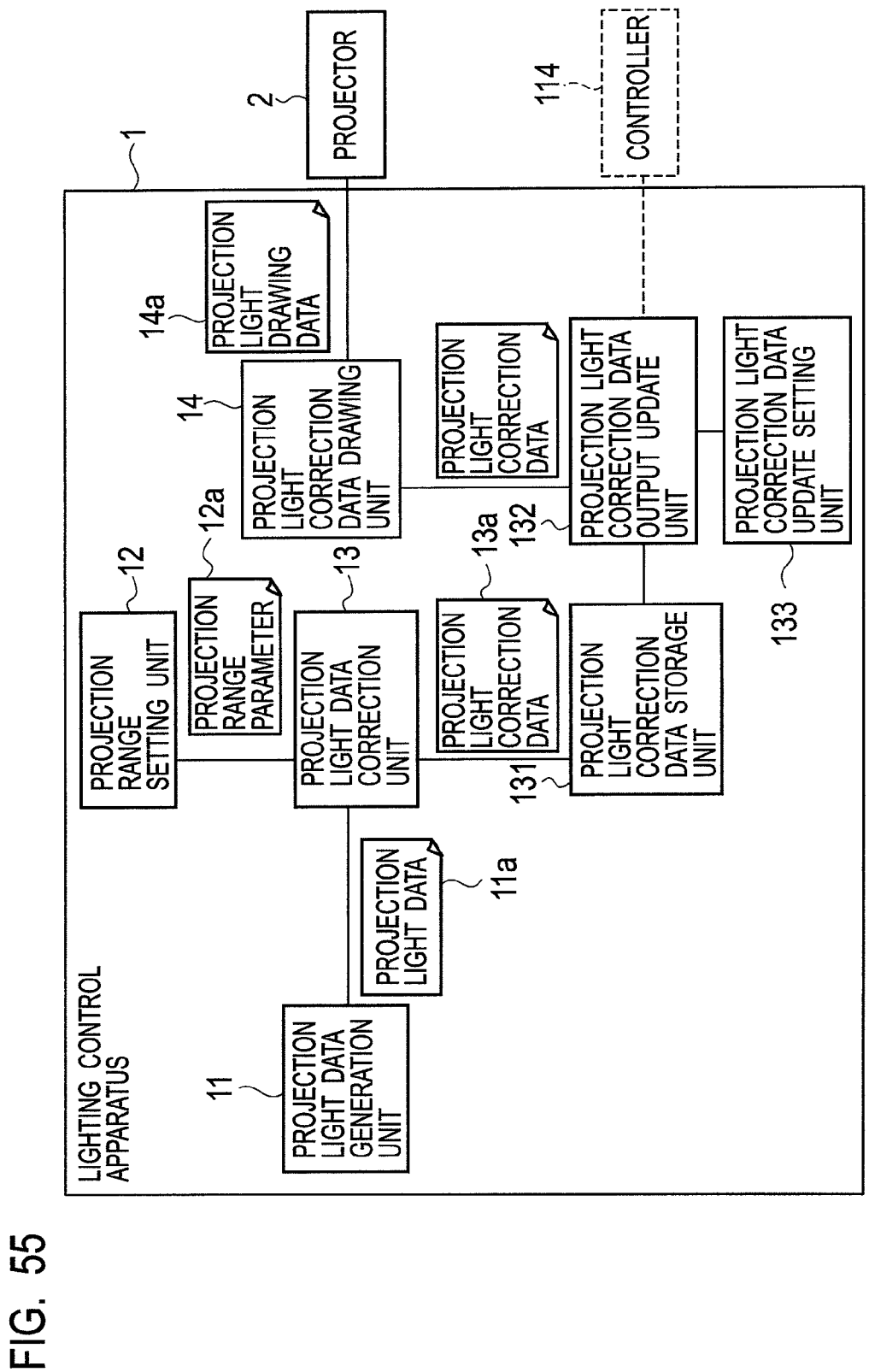
FIG. 55 is a block diagram showing a functional configuration of a lighting system shown as the eleventh embodiment of the present invention.

Moreover, by a configuration as shown in FIG. 55, this lighting system may store the projection light correction data 13a, which is obtained by correcting the projection light data 11a by the projection light data correction unit 13, in advance to then perform output control in accordance therewith. In such a way, the lighting system can update the projection range and the non-projection range among the projection light 2a projected from the projector 2.

This lighting system includes: a projection light correction data storage unit 131 as projection light correction data storing means for storing the projection light correction data 13a corrected by the projection light data correction unit 13; a projection light correction data update setting unit 133 as projection light correction data output setting means for setting at least either of an output order and output condition of the projection light correction data 13a stored in the projection light correction data storage unit 131; and a projection light correction data output update unit 132 as projection light data updating means for outputting the projection light data, which is stored in the projection light correction data storage unit 131, in accordance with the at least either of the output order and the output condition, which is set by the projection light correction data update setting unit 133.

The projection light correction data storage unit 131 is composed of the hard disk device in the personal computer, the external storage device, or the like. This projection light correction data storage unit 131 is supplied with the projection light correction data 13a in which the projection range is corrected by the projection light data correction unit 13. This projection light correction data 13a is accumulated in the projection light correction data storage unit 131 every time when new projection light correction data 13a is generated by the projection light data correction unit 13, and those in which the projection ranges and the non-projection ranges are formed into a variety of shapes are included therein.

The projection light correction data update setting unit 133 sets update information, which indicates the output order and output condition of the projection light correction data 13a, by the keyboard operation of the user to the personal computer. Specifically, the order and condition of the projection range desired to be changed are the update information. As the output order of the projection light correction data 13a, there are mentioned: an order of changing the projection ranges; a projection time and update interval of each of the projection ranges; and the like. Moreover, as the output condition of the projection light correction data 13a, for example, there are mentioned: that the projection light correction data 13a is read out by the projection light correction data output update unit 132 to then update the projection range to a new one when the button provided on the controller 114 that composes the personal computer is operated; and the like.

In the lighting system as described above, by the operation of the user, the desired projection range is selected in advance, whereby the projection light correction data 13a is selected in advance, and the update order and the update condition are set in advance. Then, at the time of starting the projection of the projection light 2a, the projection light correction data output update unit 132 reads out the projection light correction data 13a from the projection light correction data storage unit 131 in accordance with the update order and update condition of the projection range, which are set by the projection light correction data update setting unit 133, and then supplies the projection light correction data 13a thus read out to the projection light correction data drawing unit 14. In such a way, the lighting system can project the projection light 2a onto the projection range, which is selected by the user, in the desired order and interval, and can instantaneously change the projection range projected by the projection light 2a.

In addition, in accordance with this lighting system, it is not necessary to perform the trimming processing every time when the projection range is switched, and accordingly, a processing load for switching the projection range can be reduced. Particularly, even in the case of switching the projection range at an interval as short as several seconds as in a slide show, the processing load in this lighting system is not increased.

Figure 56:
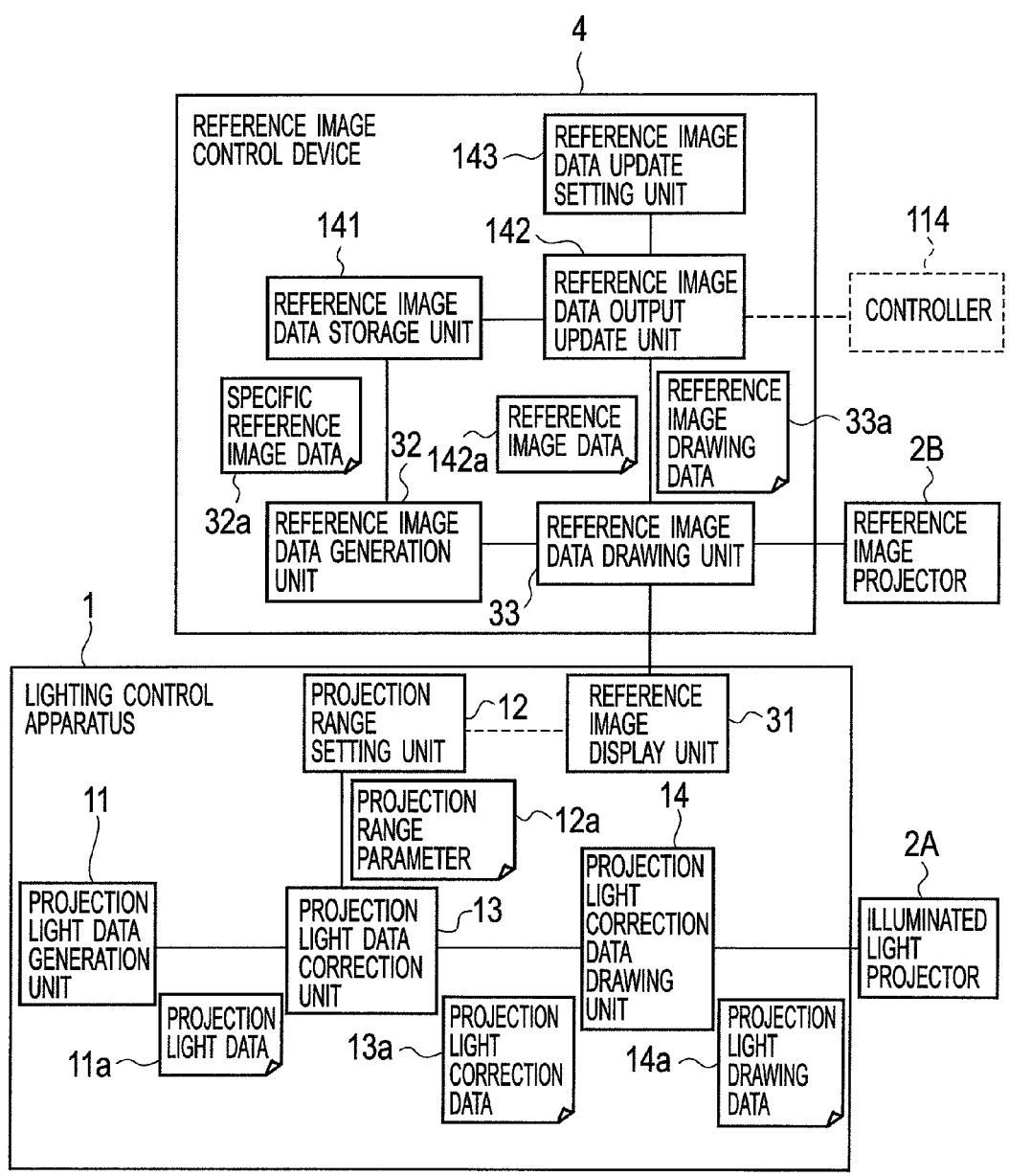
FIG. 56 is a block diagram showing a functional configuration of a lighting system shown as the eleventh embodiment of the present invention.

Moreover, by a configuration as shown in FIG. 56, this lighting system may store the reference image data 32a in advance to then perform output control in accordance therewith, and may thereby update the reference image 2e projected by the reference image projector 2B and the reference image 23c displayed on the liquid crystal panel 21a.

This lighting system includes: a reference image data storage unit 141 as reference image data storing means for storing the reference image data 32a generated by the reference image data generation unit 32; a reference image data update setting unit 143 as reference image data output setting means for setting at least either of an output order and output condition of the reference image data 32a stored in the reference image data storage unit 141; and a reference image data output update unit 142 as reference image updating means for outputting the reference image data 32a, which is stored in the reference image data storage unit 141, in accordance with the at least either of the output order and the output condition, which is set by the reference image data update setting unit 143.

The reference image data storage unit 141 is composed of the hard disk device in the personal computer, the external storage device, or the like. This reference image data storage unit 141 is supplied with the reference image data 32a generated by the reference image data generation unit 32. This reference image data 32a includes those of grid patterns and grid dots, which have a variety of dimensions.

The reference image data update setting unit 143 sets update information, which indicates the output order and output condition of the reference image data 32a, by the keyboard operation of the user to the personal computer. Specifically, the order and condition of the reference image desired to be changed are the update information. As the output order of the reference image data 32a, there are mentioned: an order of changing the reference image; a projection time and update interval of the reference image; and the like. Moreover, as the output condition of the reference image data 32a, for example, there are mentioned: that the reference image data 32a is read out by the reference image data output update unit 142 to then update the reference image to a new one when the button provided on the controller 114 that composes the personal computer is operated; and the like.

In the lighting system as described above, by the operation of the user, the desired reference image is selected in advance, whereby the reference image data 32*a* is selected in advance, and the update order and the update condition are set in advance. Then, at the time of starting the projection of the projection light 2*a*, the reference image data output update unit 142 reads out the reference image data 32*a* from the reference image data storage unit 141 in accordance with the update order and update condition of the reference image, which are set by the reference image data update setting unit 143, and then supplies the reference image data 32*a* thus read out to the reference image data drawing unit 33. In such a way, the lighting system can project the reference image, which is selected by the user, in the desired order and interval by the reference image projector 2B, and at the same time, can switch the reference image on the liquid crystal panel 21*a* by the reference image display unit 31.

Hence, in accordance with this lighting system, the desired reference image can be instantaneously projected only by the operation to the button of the controller 114, and the projection range can be set more simply.

Figure 57:
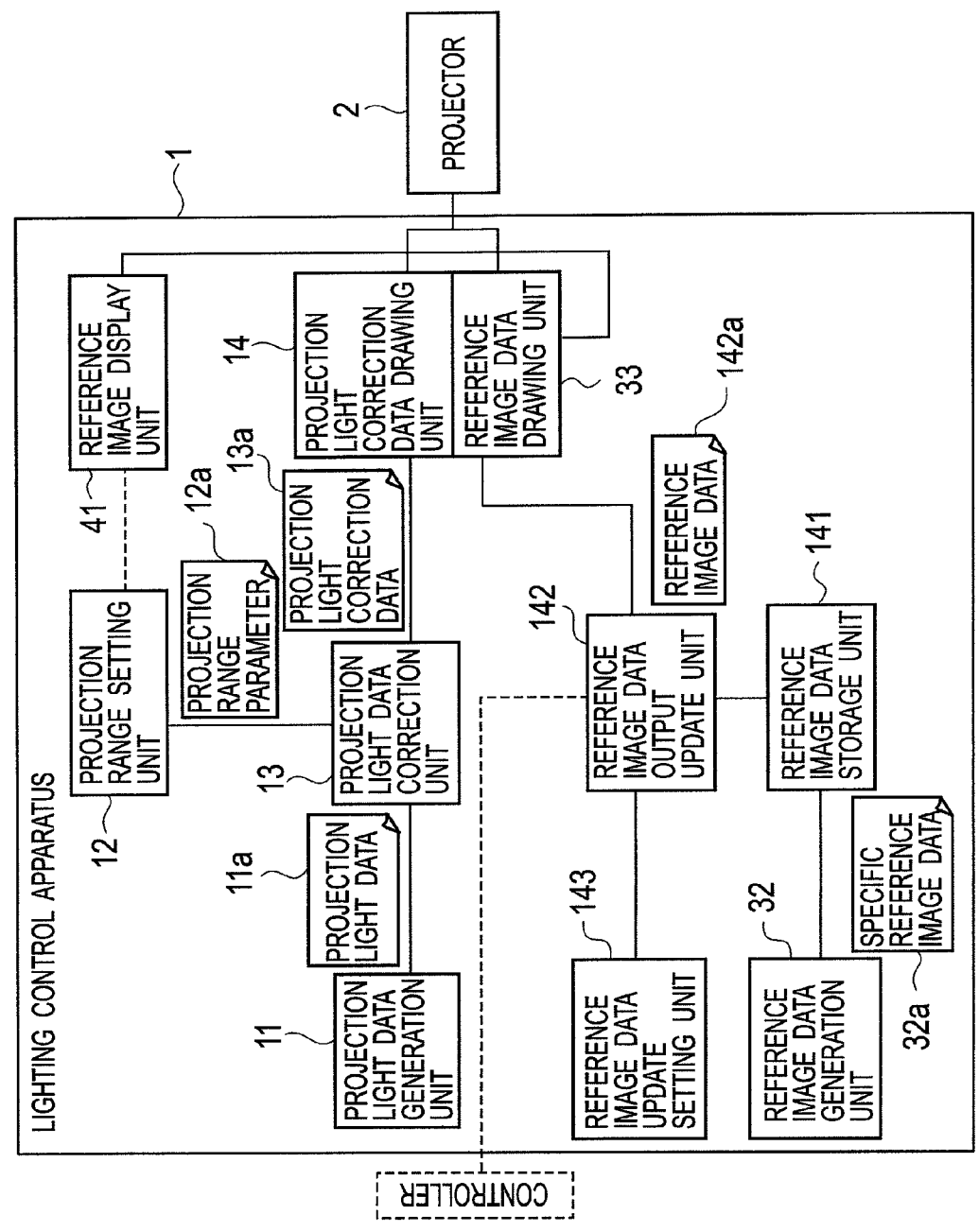
FIG. 57 is a block diagram showing a functional configuration of a lighting system shown as the eleventh embodiment of the present invention.

Moreover, by a configuration as shown in FIG. 57, this lighting system may store the reference image data 32*a* in advance to then perform output control in accordance therewith, and may thereby update the reference image 2*e* projected by the single projector 2 and the reference image 23*c* displayed on the liquid crystal panel 21*a*.

In the lighting control device 1, this lighting system includes: the reference image data storage unit 141; the reference image data output update unit 142; and the reference image data update setting unit 143. This lighting system supplies the reference image drawing data 33*a* to the projector 2 and the reference image display unit 41 from the reference image data drawing unit 33, and can thereby project the reference image 2*e* and display the reference image 2*e* on the liquid crystal panel 21*a*.

Figure 58:
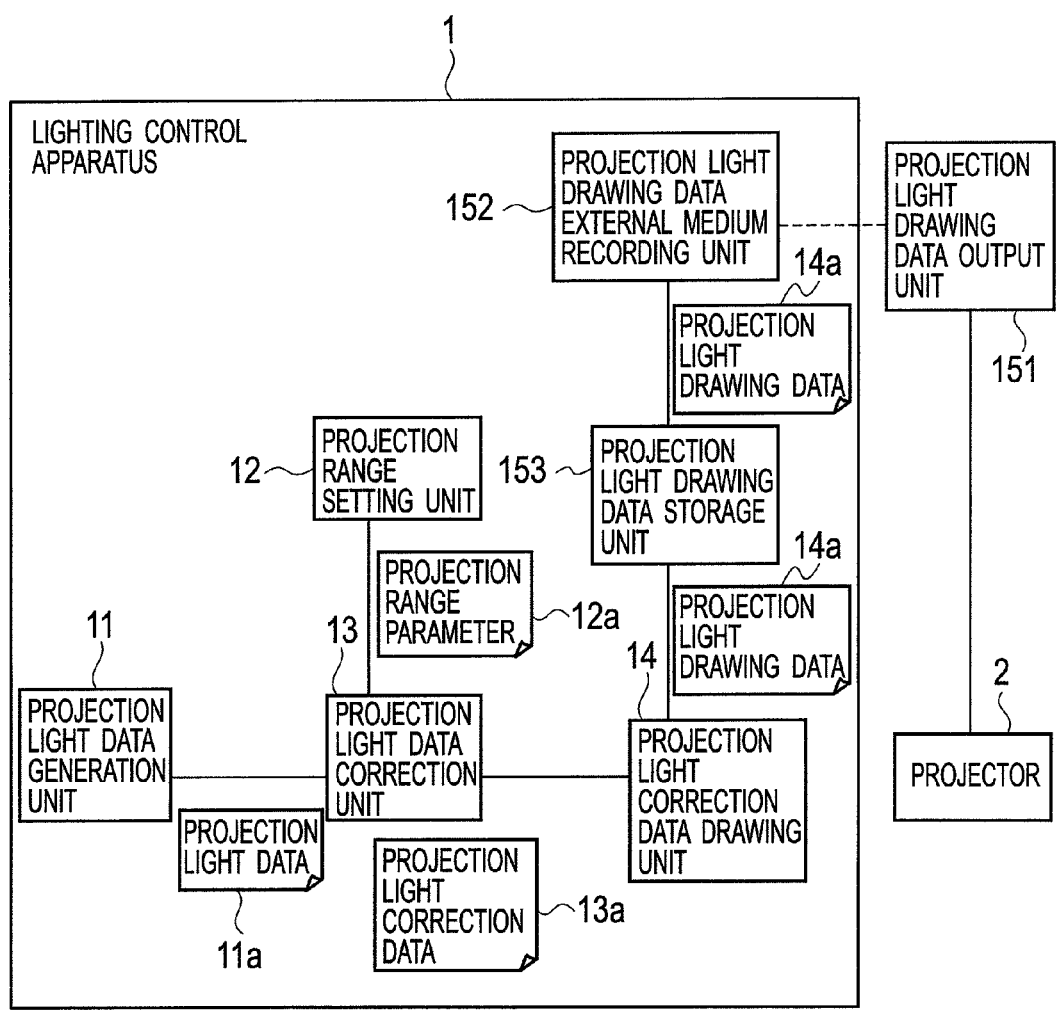
FIG. 58 is a block diagram showing a functional configuration of a lighting system shown as the eleventh embodiment of the present invention.

Moreover, by a configuration as shown in FIG. 58, this lighting system may store the projection light drawing data in advance to then output the projection light to the projector 2.

This lighting system includes: a projection light drawing data storage unit 153 as projection light drawing data storing means for storing the projection light drawing data 14*a* generated by the projection light correction data drawing unit 14; a projection light drawing data external medium recording unit 152 that records the projection light drawing data 14*a*, which is stored in the projection light drawing data storage unit 153, in an external recording medium; and a projection light drawing data output unit 151 that outputs the projection light drawing data 14*a*, which is stored in the external recording medium, to the projector 2.

When this lighting system stores the projection light drawing data 14*a*, which is subjected to the drawing processing in the projection light correction data drawing unit 14, by the projection light drawing data storage unit 153 corresponding to the hard disk device in the personal computer, the lighting system records the projection light drawing data 14*a* in the projection light drawing data external medium recording unit 152.

As the projection light drawing data external medium recording unit 152, there is mentioned a medium such as a general-purpose DVD. Moreover, as the projection light drawing data output unit 151, there is mentioned a DVD player that, when the DVD as the projection light drawing data external medium recording unit 152 is mounted thereon, plays back the projection light drawing data 14*a* recorded in the DVD concerned, and outputs the projection light drawing data 14*a* to the projector 2.

In accordance with the lighting system as described above, the projection light drawing data 14*a* is recorded in the external recording medium, whereby it is not necessary to perform the drawing processing in the projection light correction data drawing unit 14 every time of projecting the projection light 2*a*. In such a way, an apparatus configuration of the lighting system can be simplified.

Figure 59:
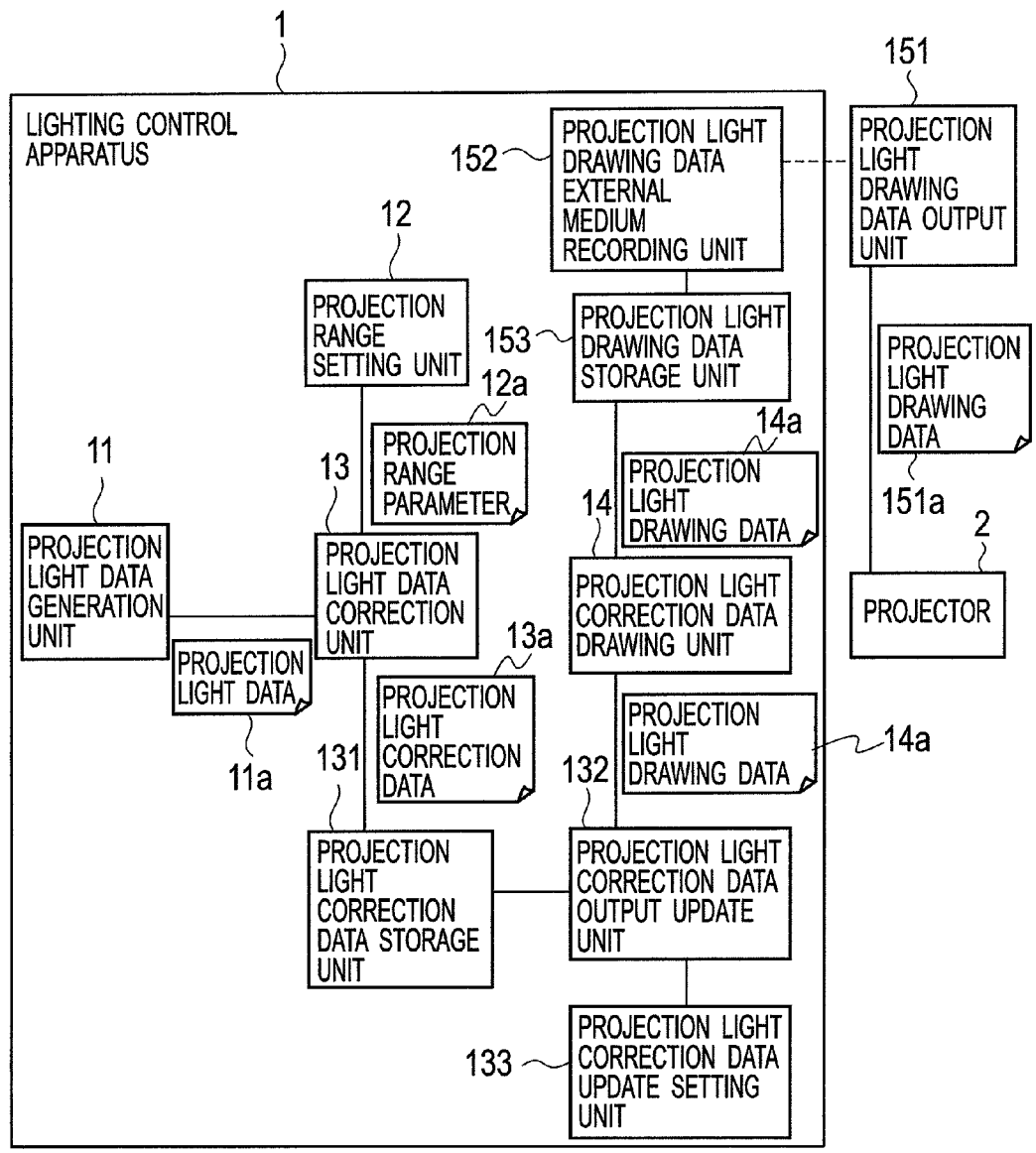
FIG. 59 is a block diagram showing a functional configuration of a lighting system shown as the eleventh embodiment of the present invention.

Moreover, in this lighting system, as shown in FIG. 59, the projection light correction data storage unit 131, the projection light correction data output update unit 132 and the projection light correction data update setting unit 133 are connected to the projection light correction data drawing unit 14, and the projection light correction data 13*a* is supplied to the projection light correction data drawing unit 14 based on the order or the condition, which is set by the user. In such a way, the lighting system can store the projection light drawing data 14*a*, which is drawn by the projection light correction data 13*a*, in the projection light drawing data storage unit 153, and can record the projection light drawing data 14*a* concerned in the projection light drawing data external medium recoding unit 152.

Even if the projection range parameter 12*a* and the projection light data 11*a* are switched as mentioned above without switching the projection light correction data 13*a* as described above, the projection light drawing data 14*a* can also be stored and recorded in a similar way, and can also be outputted to the projector 2 by the projection light drawing data output unit 151.

Moreover, as shown in FIG. 60 to FIG. 63, this lighting system may include a plurality of projectors 2_1, 2_2 and 2_3. Such a lighting system is called a multi-projection system.

Figure 60:
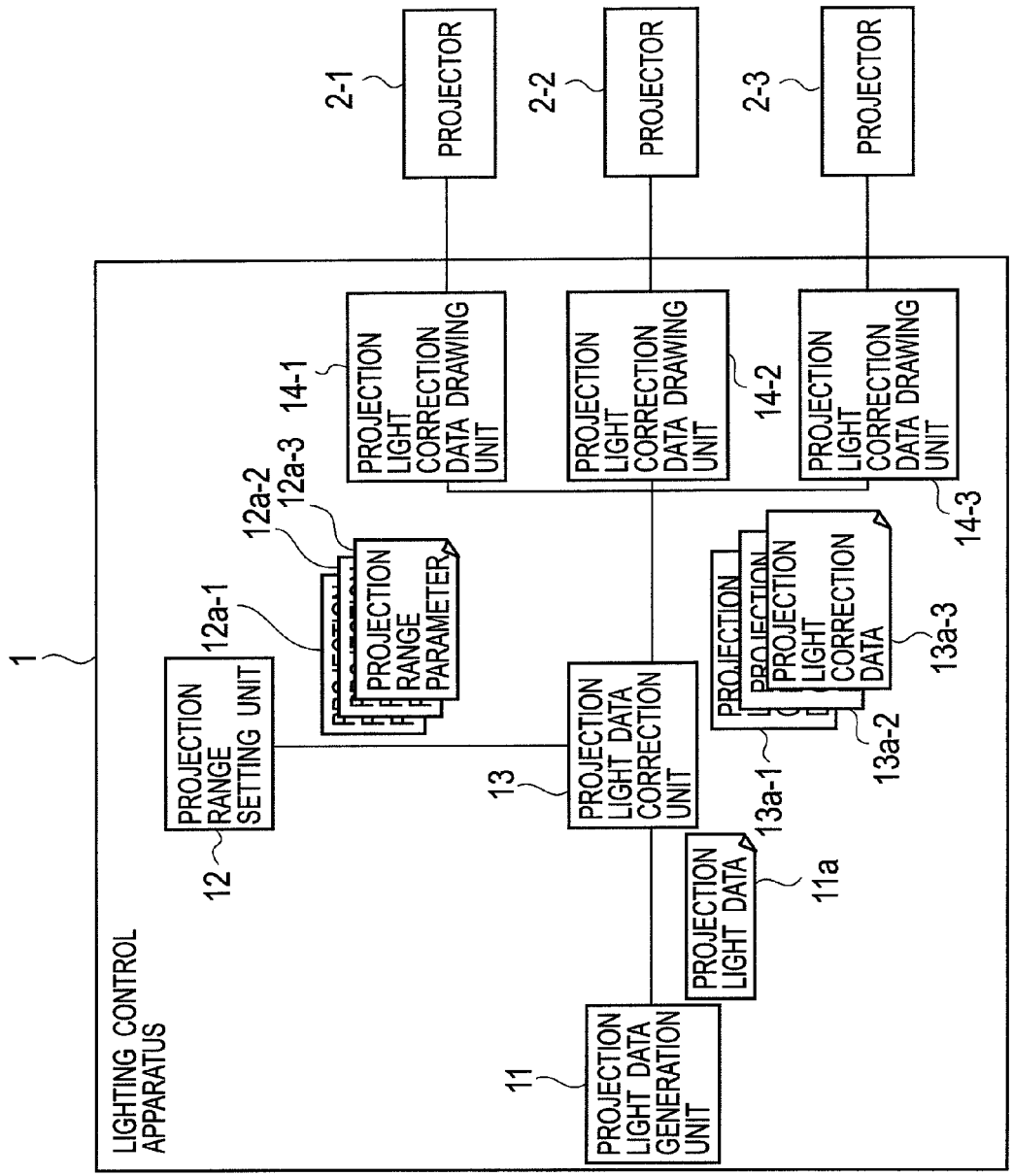
FIG. 60 is a block diagram showing a functional configuration of a lighting system shown as the eleventh embodiment of the present invention.

A lighting system shown in FIG. 60 generates projection range parameters 12*a*_1, 12*a*-2 and 12*a*_3, which correspond to the projectors 2_1, 2_2 and 2_3, respectively, by the projection range setting unit 12. These projection range parameters 12*a*_1, 12*a*-2 and 12*a*_3 are set for different projection ranges by the operations of the user.

Then, the projection light data correction unit 13 corrects the projection light data 11*a* for each of the projection range parameters 12*a*_1, 12*a*-2 and 12*a*_3, and converts the projection light data 11*a* into projection light correction data 13*a*_1, 13*a*_2 and 13*a*_3, which correspond to the projectors 2_1, 2_2 and 2_3, respectively. These projection light correction data 13*a*_1, 13*a*_2 and 13*a*_3 are supplied to projection light correction data drawing unit 14_1, 14_2 and 14_3 connected to the projectors 2_1, 2_2 and 2_3, respectively, and are supplied to the projectors 2_1, 2_2 and 2_3 after the drawing processing is performed thereby.

In accordance with the lighting system as described above, the projection light can be projected onto the plurality of projection ranges by the individual projectors 2_1, 2_2 and 2_3 different from one another.

Figure 61:
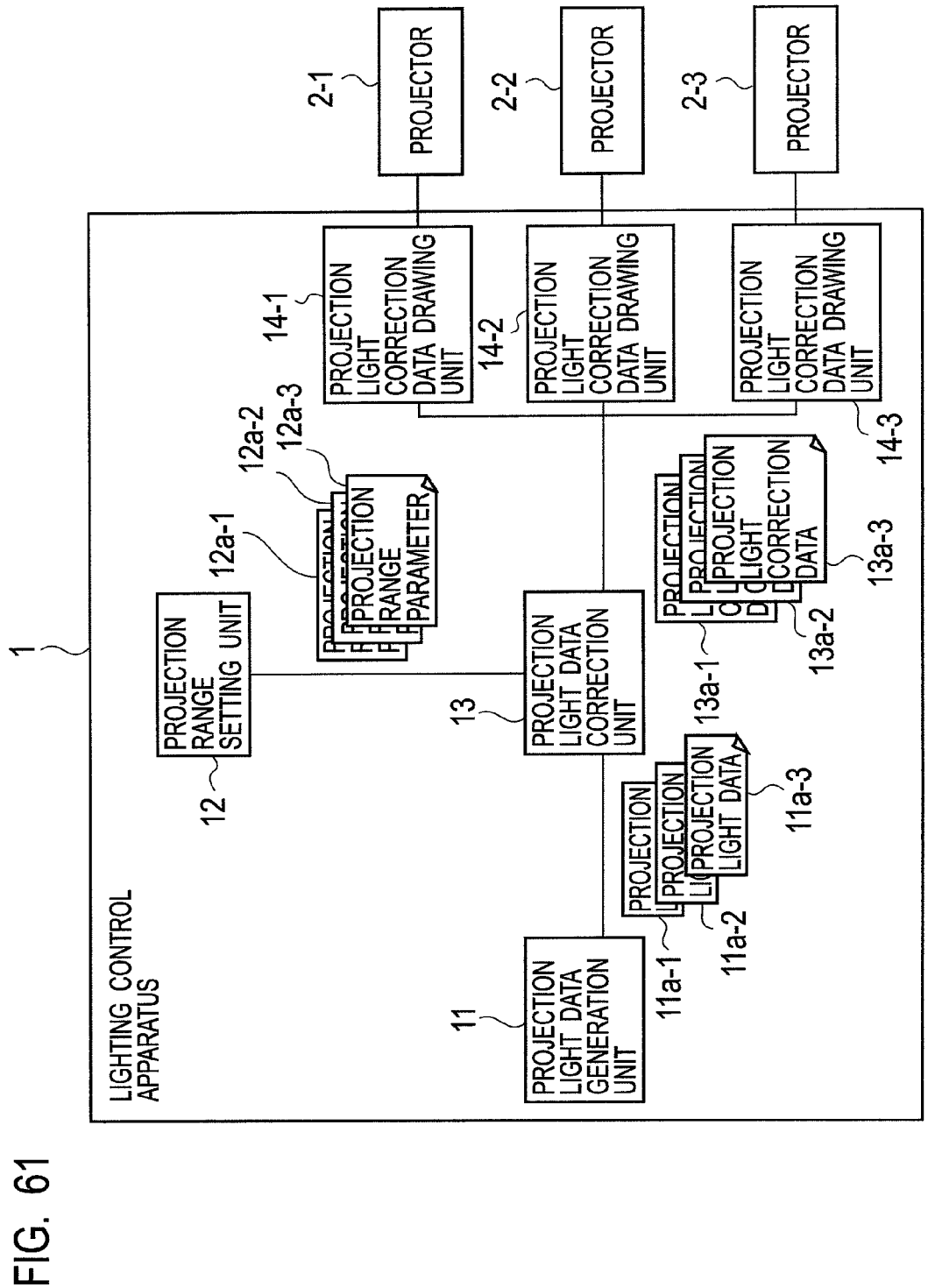
FIG. 61 is a block diagram showing a functional configuration of a lighting system shown as the eleventh embodiment of the present invention.

Moreover, a lighting system shown in FIG. 61 generates projection light data 11*a*_1, 11*a*_2 and 11*a*_3, which correspond to the projectors 2_1, 2_2 and 2_3, respectively, by the projection light data generation unit 11. The respective pieces of projection light data 11*a*_1, 11*a*_2 and 11*a*_3 exhibit different brightnesses and colors among the projectors 2_1, 2_2 and 2_3.

In this lighting system, the projection light data 11*a*_1, 11*a*_2 and 11*a*_3 are supplied to the projection light data correction unit 13. Then, the projection light data 11*a*_1 is corrected by the projection light data correction unit 13 by using the projection range parameter 12a_1, whereby the projection light correction data 13a_1 is generated, and is supplied to the projection light correction data drawing unit 14_1. At the same time, by the projection light data correction unit 13, the projection light data correction unit 13 corrects the projection light data 11a_2 by using the projection range parameter 12a_2, thereby generates the projection light correction data 13a_2, and supplies the he projection light correction data 13a_2 to the projection light data correction data drawing unit 14_2. At the same time, by the projection light data correction unit 13, the projection light data correction unit 13 corrects the projection light data 11a_3 by using the projection range parameter 12a_3, thereby generates the projection light correction data 13a_3, and supplies the projection light correction data 13a_3 to the projection light correction data drawing unit 14_3.

In accordance with the lighting system as described above, the projection data 11a_1, 11a_2 and 11a_3 different from one another are individually set, whereby the projection light can be projected onto the plurality of projection ranges by the individual projectors 2_1, 2_2 and 2_3.

Figure 62:
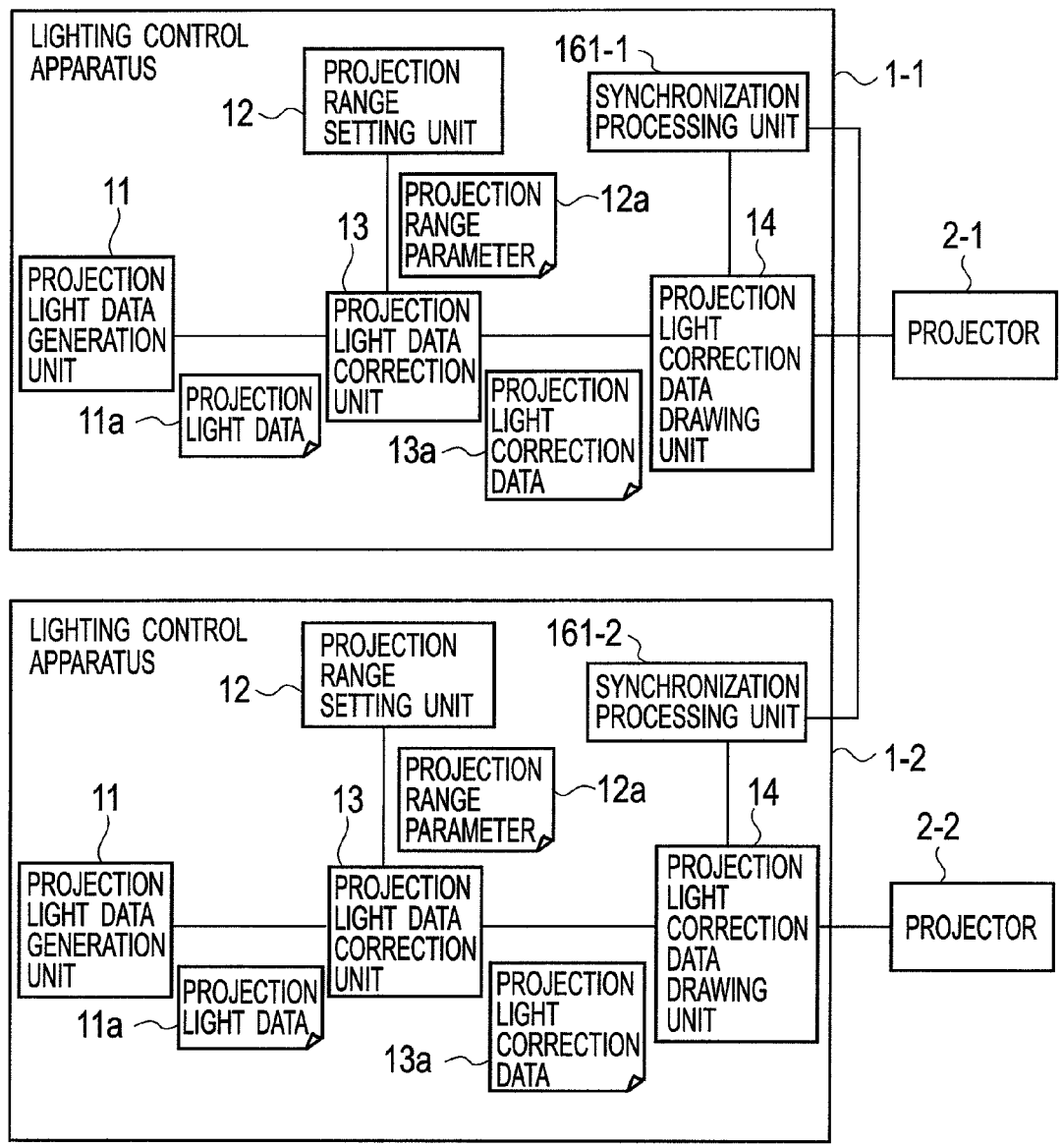
FIG. 62 is a block diagram showing a functional configuration of a lighting system shown as the eleventh embodiment of the present invention.

Moreover, in a lighting system shown in FIG. 62, lighting control apparatuses 1_1 and 1_2 as personal computers are provided so as to correspond to the projectors 2_1 and 2_2, respectively. Each of the lighting control apparatuses 1_1 and 1_2 as described above includes: the projection light data generation unit 11; the projection range setting unit 12; the projection light data correction unit 13; and the projection light correction data drawing unit 14. Moreover, the lighting control apparatuses 1_1 and 1_2 include synchronization processing units 161_1 and 161_2, respectively, the synchronization processing units 161_1 and 161_2 synchronizing, with each other, plural pieces of the projection light drawing data supplied from the projection light correction data drawing unit 14 to the projectors 2_1 and 2_2. These synchronization processing units 161_1 and 161_2 are connected to each other, and give output commands of the projection light drawing data to the projection light correction data drawing units 14_1 and 14_2 in accordance with the same clock signal. In such a way, the lighting control apparatuses 1_1 and 1_2 can individually output plural pieces of the synchronized projection light 2a to the projectors 2_1 and 2_2.

Figure 63:
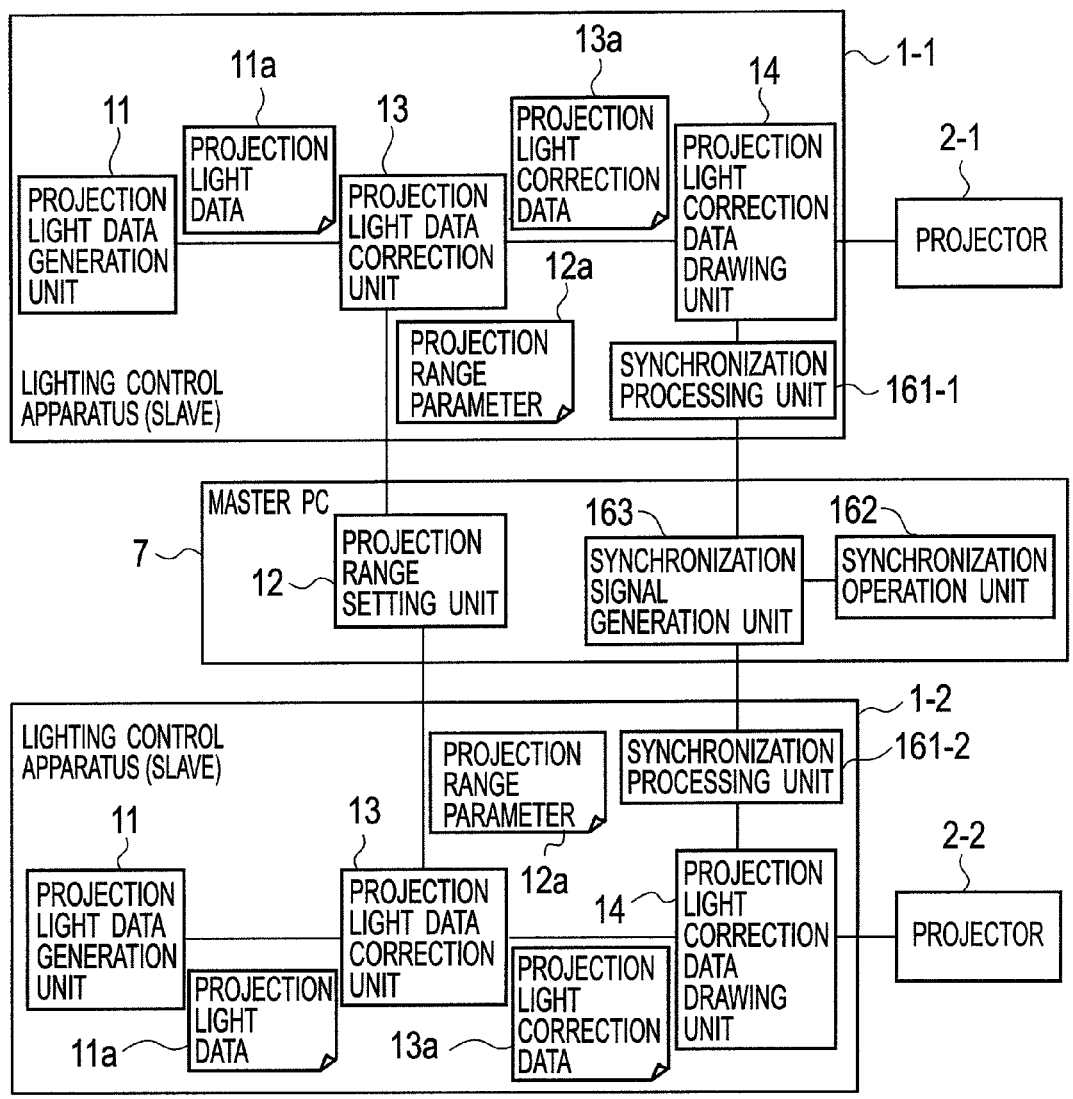
FIG. 63 is a block diagram showing a functional configuration of a lighting system shown as the eleventh embodiment of the present invention.

Moreover, a lighting system shown in FIG. 63 includes a master PC 7 as a personal computer connected to both of the lighting control apparatuses 1_1 and 1_2, from which the projection range setting units 12 are removed. This master PC 7 treats the lighting control apparatuses 1_1 and 1_2 as slaves, and controls the projection light data correction units 13 and synchronization processing units 161_1 and 161_2 of the lighting control apparatuses 1_1 and 1_2.

The master PC 7 includes the projection range setting unit 12. In this projection range setting unit 12, the projection range parameters 12a individually formed for the projectors 2_1 and 2_2 are set by the operation of the user. Moreover, the master PC 7 includes a synchronization operation unit 162 and a synchronization signal generation unit 163, which are for individually controlling the synchronization processing units 161_1 and 161_2. In this master PC 7, the synchronization operation unit 162 sets synchronization operations of the projection light correction data drawing units 14 in accordance with the operation of the user. In other words, in order to synchronize timing when the projector 2_1 projects the projection light 2a and timing when the projector 2_2 projects the projection light 2a with each other, the master PC 7 sets operation time intervals and the like of the individual projection light correction data drawing units 14. Then, in accordance with such a synchronization operation set by the synchronization operation unit 162, the synchronization signal generation unit 163 supplies a synchronization signal to the synchronization processing units 161_1 and 161_2, and synchronizes the individual projection light correction data drawing units 14 with each other.

By the projection range setting unit 12, the master PC 7 as described above supplies the projection range parameter 12a, which indicates the projection range desired to be formed by the projector 2_1, to the projection light data correction unit 13 of the lighting control apparatus 1_1, and supplies the projection range parameter 12a, which indicates the projection range formed by the projector 2_2, to the projection light data correction unit 13 of the lighting control apparatus 1_2. Then, when the master PC 7 outputs the projection parameters 12a to the lighting control apparatuses 1_1 and 1_2, the synchronization signal generation unit 163 controls the synchronization processing units 161_1 and 161_2, whereby the master PC 7 synchronizes the projection light correction data drawing units 14 with each other, and drives the projectors 2_1 and 2_2.

Figure 64:
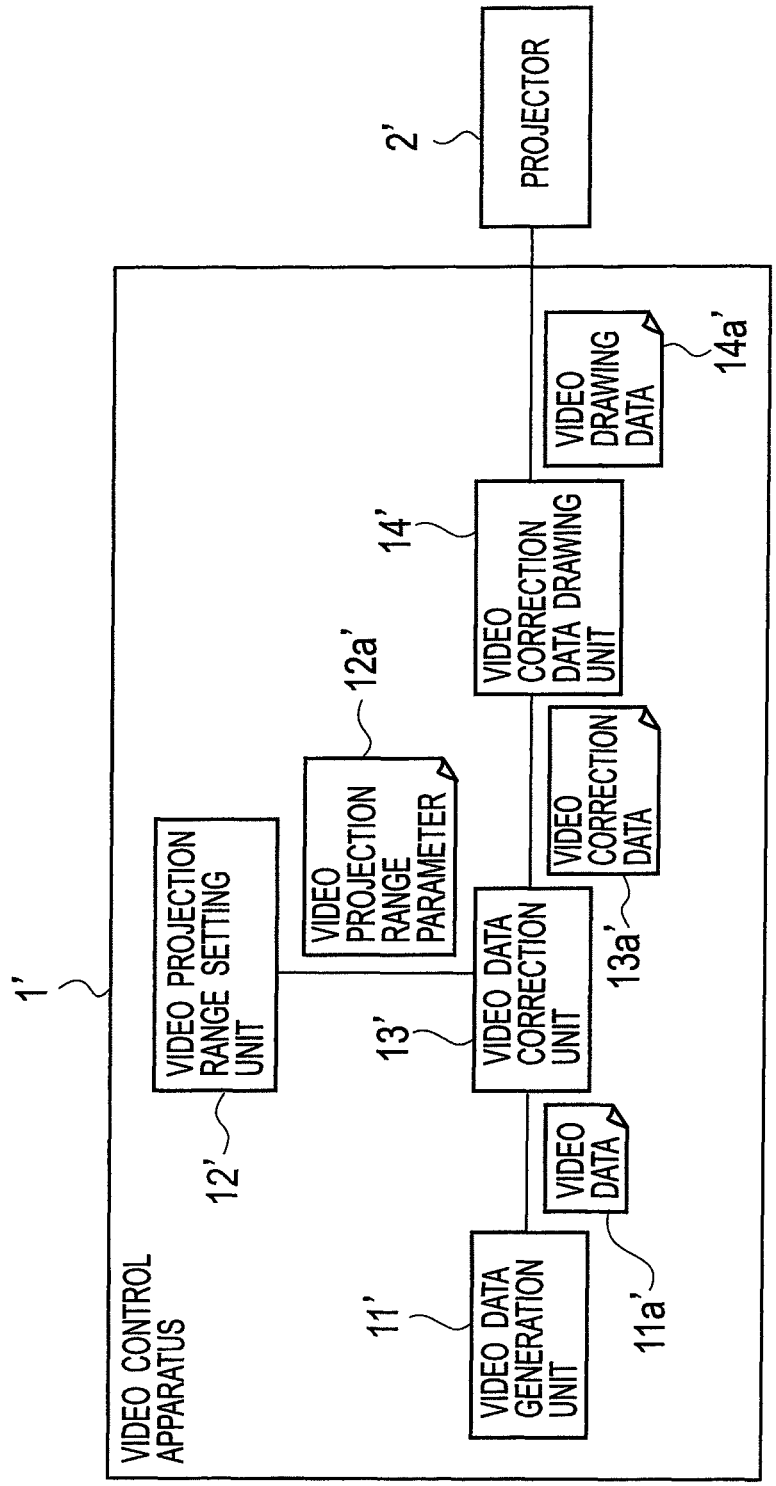
FIG. 64 is a block diagram showing a functional configuration of a lighting system shown as the eleventh embodiment of the present invention.
Figure 65:
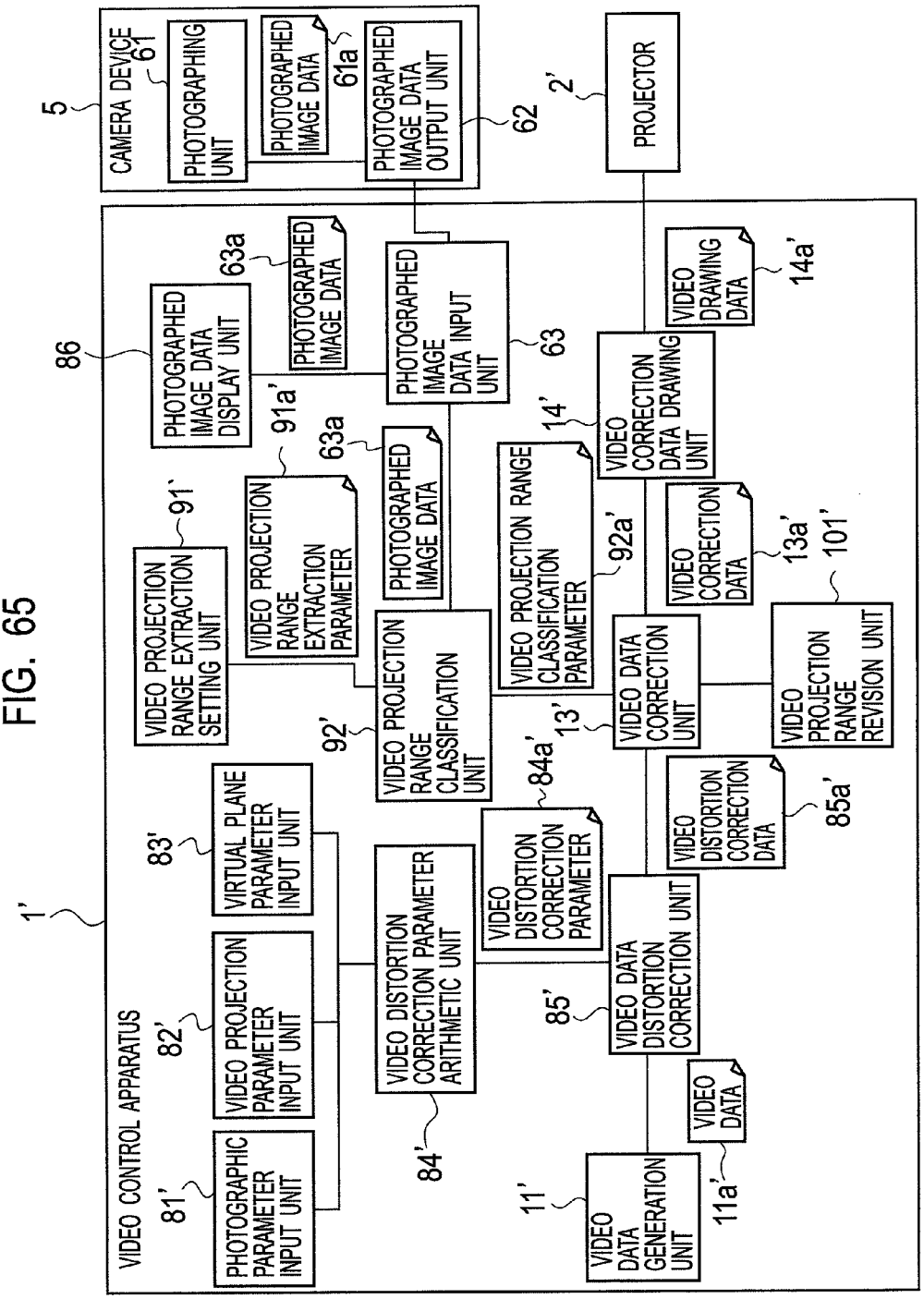
FIG. 65 is a block diagram showing a functional configuration of a lighting system shown as the eleventh embodiment of the present invention.

Moreover, this lighting system may project video light as the projection light. As shown in FIG. 64 and FIG. 65, a portion configured to treat a video though having the same configuration as that of the lighting control apparatus 1 is illustrated while a symbol "'" is being assigned thereto like "video control apparatus 1'".

The lighting system shown in FIG. 64 generates video data 11a' by a video data generation unit 11', and sets a projection range parameter 12a' by a video projection range setting unit 12'. In response to this, the lighting system generates video data correction data 13', which indicates a predetermined video range (video trimming region), by a video data correction unit 13'. In such a way, by using the video correction data 13a', a video drawing unit 14' generates video drawing data 14a', and drives a projector 2'. In such a way, from the projector 2', the lighting system can project video light in which the video range is set.

The lighting system shown in FIG. 65 is a system in which the lighting system shown in FIG. 48 is applied to the video. In this lighting system, based on a photographic parameter, a video projection parameter and a virtual plane parameter, a video distortion correction parameter arithmetic unit 84' arithmetically operates a video distortion correction parameter 84a', and a video data distortion correction unit 85' performs video distortion correction processing (texture mapping processing) for the video data 11a'. Moreover, this lighting system displays the photographed image data 61a, which is photographed by the camera device 5, by the photographed image data display unit 86, and in addition, classifies a video range and a non-video range with each other based on the photographed image data 61a in accordance with an extraction condition of a video projection range extraction setting unit 91', and gives a projection range parameter 82a' to the video data correction unit 13'. By a video projection range revision unit 101', it is possible to revise the video range and the non-video range in response to the operation of the user. Then, in the lighting system, the video data distortion correction unit 85' performs trimming (correction) processing for the video distortion correction data 75a', which is corrected by the video data distortion correction unit 85', in accordance with the projection range parameter 82a', and can thereby generate the video correction data 13a' indicating the video range.

Note that the above-mentioned embodiments are merely examples of the present invention. Therefore, the present invention is not limited to the above-mentioned embodiments, and it is a matter of course that, besides the above-mentioned embodiments, a variety of alterations are possible in response to design and the like within the scope without departing from the technical spirit of the present invention.

The invention claimed is:

1. A light projection apparatus that projects light onto an arbitrary space and an object set in the space, comprising:
a projection light data generator that generates projection light data for specifying the projection light;
a projection range setter that sets, without reference to an image taken of the arbitrary space, a projection range onto which the light is projected and a non-projection range onto which the light is not projected in accordance with an operation of a user, and using a projection range parameter that represents the projection range or the non-projection range by coordinates on a projection-enabled range onto which projection light can be projected by the light projection apparatus;
a projection light data corrector that corrects the projection light data so as to project the light onto the projection range set by the projection range setter, the projection light data corrector performing trimming processing for the projection light data using the projection range parameter that represents the projection range or the non-projection range by coordinates on the projection-enabled range of the projection apparatus;
a projection light correction data drawer that performs drawing processing for projection light correction data obtained by correcting the projection light data by the projection light data corrector;
a light projector that projects the light by using projection light drawing data generated by the projection light correction data drawer;
a reference image data generator for generating reference image data for generating a reference image formed into a grid shape;
a reference image drawer that performs drawing processing for the reference image data generated by the reference image data generator;
a reference image projector that projects the light by using reference image drawing data drawn by the reference image drawer;
a displayer that displays the reference image drawing data drawn by the reference image drawer, wherein the reference image is projected onto the space and the object, which are light projection targets;
a reference image projection parameter inputter that inputs a parameter including position, attitude and specifications of the reference image projector;
an operation position parameter inputter that inputs a parameter including an operation position of the user who sets the projection range by the projection range setter;
a virtual plane parameter inputter that, in order to grasp a display state of the reference image projected from the reference image projector, receives a parameter including a position, attitude and size of a virtual planar region virtually set on a projection region of the reference image projector; and
a reference image distortion corrector that corrects, based on the parameter including the position, attitude and specifications of the reference image projector, the parameter including the operation position and the parameter including the position, attitude and size of the virtual planar region, the reference image data so as to distort the reference image, which is projected from the reference image projector, in order to allow the reference image to be observed free from distortion in a case where the user visually recognizes the reference image.

2. The light projection apparatus according to claim 1, wherein the projection light data generator specifies elements including illuminance, brightness, luminosity, luminous flux, color temperature and color rendering of the projection light.

3. The light projection apparatus according to claim 1, wherein the projection light data generator further divides the projection range set by the projection range setter, and generates projection light data in which characteristics of the light are designated for each of the divided projection ranges.

4. The light projection apparatus according to claim 1, further comprising:
a shape drawer and inputter that draws and inputs an arbitrary shape in accordance with the operation of the user,
wherein the projection range setter defines, as the projection range, the shape inputted by the shape drawer and inputter.

5. The light projection apparatus according to claim 1, further comprising:
a flat screen for displaying the reference image projected from the reference image projector; and
a photographer that photographs the reference image displayed on the flat screen,
wherein the reference image distortion corrector distorts the reference image, which is projected from the reference image projector, so as to make coincidence between photographic data photographed by the photographer and the reference image generated by the reference image data generator.

6. The light projection apparatus according to claim 1, further comprising:
a projection range identification condition setter that receives conditions for specifying the projection range; and
a projection range identifier that identifies the projection range in accordance with the conditions received by the projection range identification condition setter,
wherein the projection light data is corrected so as to correspond to the projection range identified by the projection range identifier, and the light is projected from the light projector.

7. A light projection apparatus that projects light onto an arbitrary space and an object set in the space, comprising:
a projection light data generator that generates projection light data for specifying the projection light;
a projection range setter that sets, without reference to an image taken of the arbitrary space, a projection range onto which the light is projected and a non-projection range onto which the light is not projected in accordance with an operation of a user, and using a projection range parameter that represents the projection range or the non-projection range by coordinates on a projection-enabled range onto which projection light can be projected by the light projection apparatus;
a projection light data corrector that corrects the projection light data so as to project the light onto the projection range set by the projection range setter, the projection light data corrector performing trimming processing for the projection light data using the projection range parameter that represents the projection range or the non-projection range by coordinates on the projection-enabled range of the projection apparatus;
a projection light correction data drawer that performs drawing processing for projection light correction data obtained by correcting the projection light data by the projection light data corrector;

a light projector that projects the light by using projection light drawing data generated by the projection light correction data drawer;

a photographer that photographs, as a photographic range, a space including the projection range of the light projector;

a photographic data displayer that displays the photographic data photographed by the photographer;

a photographic parameter inputter that inputs a parameter including a position, attitude and specifications of the photographer;

a light projection parameter inputter that inputs a parameter including a position, attitude and specifications of the light projector; and a virtual plane inputter that inputs a parameter including a position, attitude and size of a virtually set virtual planar region in order to grasp a state of the projection range of the light projector; and wherein the projection light data corrector corrects the projection light data so as to allow the projection light to coincide with the photographic range of the photographer on the virtual plane based on the parameter including the position, attitude and specifications of the photographer, the parameter including the position attitude and specifications of the light projector and the parameter including the position, attitude and size of the virtual planar region.

8. The light projection apparatus according to claim 7, further comprising:
a projection range extraction setter that sets conditions for extracting the projection range; and
a classifier that classifies the projection range and the non-projection range other than the projection range with each other by analyzing the photographic data, which is generated by the photographer, in accordance with the conditions set by the projection range extraction setter,
wherein the projection light data corrector corrects the projection light data based on the projection range and the non-projection range, which are classified with each other by the classifier.

9. The light projection apparatus according to claim 1, further comprising:
a projection range reviser that revises a boundary of the projection range in accordance with the operation of the user.

10. The light projection apparatus according to claim 1, further comprising:
a projection light data storage that stores the projection light data;
a projection light data output setter that sets at least either of an output order and output condition of the projection light data stored in the projection light data storage; and
a projection light data updater that outputs the projection light data, which is stored in the projection light data storage, in accordance with the at least either of the output order and the output condition, the at least either one being set by the projection light data output setter.

11. The light projection apparatus according to claim 1, further comprising:
a projection range parameter storage that stores the projection range parameter for correcting the projection light data by the projection light data corrector;
a projection range output setter that sets at least either of an output order and output condition of the projection range parameter stored in the projection range parameter storage; and
a projection range parameter updater that outputs the projection range parameter, which is stored in the projection range parameter storage, in accordance with the at least either of the output order and the output condition, the at least either one being set by the projection range output setter.

12. The light projection apparatus according to claim 1, further comprising:
a projection light correction data storage that stores the projection light correction data corrected by the projection light data corrector;
a projection light correction data output setter that sets at least either of an output order and output condition of the projection light data stored in the projection light correction data storage; and
a projection light data updater that outputs the projection light data, which is stored in the projection light correction data storage, in accordance with the at least either of the output order and the output condition, the at least either one being set by the projection light correction data output setter.

13. The light projection apparatus according to claim 1, further comprising:
a reference image data storage for storing the reference image data;
a reference image data output setter that sets at least either of an output order and output condition of the reference image data stored in the reference image data storage; and
a reference image updater that outputs the reference image data, which is stored in the reference image data storage, in accordance with the at least either of the output order and the output condition, the at least either one being set by the reference image data output setter.

14. The light projection apparatus according to claim 1, further comprising:
a projection light drawing data storage that stores the projection light drawing data generated by the projection light correction data drawer; and
an external recorder that records the projection light drawing data, which is stored in the projection light drawing data storage, in an external recording medium, and outputting the projection light drawing data, which is recorded in the external recording medium, to the light projector.

15. The light projection apparatus according to claim 1, wherein plural pieces of the light projector are provided.

16. The light projection apparatus according to claim 1, wherein the projection light data is video data indicating a video,
the projection range setter sets a video projection range onto which the video is projected, and sets a non-projection range,
the projection light data corrector corrects the video data so as to project the video onto the video projection range,
the projection light correction data drawer performs drawing processing for the corrected video data, and
the light projector projects the video onto the video projection range.

17. A lighting apparatus,
wherein the configuration according to claim 1 is provided.

18. The light projection apparatus according to claim 4,
wherein, when the shape drawer and inputter comprises a pen tablet system, the shape drawer and inputter generates orbit information based on writing pressure applied to a display panel by a pen, and the orbit information is converted by the light projection apparatus into the projection range parameter indicating an outline of the projection range as a trimming region, and wherein, when the shape drawer and inputter comprises a mouse, the projection light is actually projected onto a projection target object to form the projection range which can be changed while moving the mouse.

\* \* \* \* \*